United States Patent
Terao et al.

(10) Patent No.: US 6,690,794 B1
(45) Date of Patent: Feb. 10, 2004

(54) ELECTRONIC TICKET SYSTEM

(75) Inventors: Taro Terao, Nakai-machi (JP);
Mitsuhisa Kamei, Nakai-machi (JP);
Hisashi Nakatsuyama, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/113,170

(22) Filed: Jul. 10, 1998

(30) Foreign Application Priority Data

Jul. 14, 1997 (JP) .............................. 9-188064

(51) Int. Cl.$^7$ ................................ H04K 1/00
(52) U.S. Cl. ..................... 380/22; 380/51; 713/185; 713/194; 235/375
(58) Field of Search ............................ 705/75–77, 5, 705/65–66; 713/185, 186, 189, 194; 235/384, 375, 380, 382; 380/51, 22

(56) References Cited

U.S. PATENT DOCUMENTS

| | | | | |
|---|---|---|---|---|
| 5,237,499 A | * | 8/1993 | Garback | 705/5 |
| 5,694,471 A | * | 12/1997 | Chen et al. | 705/76 |
| 5,754,654 A | * | 5/1998 | Hiroya et al. | 705/76 |
| 6,085,976 A | * | 7/2000 | Sehr | 235/384 |

OTHER PUBLICATIONS

Lisimaque, Workshop on ID Cards,Carnegie Mellon University,Nov. 28, 2001,pp. 1–19.*
Menezes,Oorschot,Vanstone,Handbook of Applied Cryptography,1997,CRC Press.pp. 6–9,327–333.*
Applied Crytography by Bruce Schneier, econd edition 1996.*

* cited by examiner

*Primary Examiner*—Ayaz Sheikh
*Assistant Examiner*—Hosuk Song
(74) *Attorney, Agent, or Firm*—Oliff & Berridge, PLC

(57) ABSTRACT

An electronic ticket system for virtually preventing forgery, copying and other unauthorized uses of electronic tickets; for proving to a third party the contents of an electronic ticket contested between a user and an issuing party; and for protecting users' anonymity upon ticket use. The system comprises a ticket creating and issuing device, a ticket proving device, and a ticket verification device. A ticket creating unit in the ticket creating and issuing device creates specifications of a ticket representing a predetermined service or product in response to a ticket creating request. A ticket issuing unit of the ticket creating and issuing device, in reply to a ticket issuing request, issues the corresponding ticket using as input a ticket identifier, a proving identifier, a ticket specification identifier, and ticket added information. The ticket proving device gets a ticket issued by the ticket issuing unit and communicates with the ticket verification device to prove the possession of the ticket. The ticket verification device has a ticket verifying procedure and, on getting the ticket identifier created by the ticket creating unit, communicates with the ticket proving device to verify the ticket.

54 Claims, 31 Drawing Sheets

ELECTRONIC TICKET SYSTEM

BACKGROUND OF THE PRESENT INVENTION

1. Field of the Present Invention

The present invention relates to techniques for creating, issuing, and using tickets and cards electronically.

2. Description of the Related Art

Tickets come in diverse kinds: boarding pass, transit pass, admission tickets, reserved seat tickets, reservation tickets, coupon tickets, commuter passes, gift voucher, prepaid cards, point-accumulating cards, membership cards, transit passes, permits, and others. They are generically called tickets and proves that those who possess them (called users hereunder) are entitled to specific rights represented by each ticket. Tickets are generally issued either by those wishing to grant definite rights to users for a consideration or by their agents (called the issuing party hereunder). The users acquire and manage the tickets thus issued. Conventionally, tickets are implemented in physical form by printing and/or embossing markings on paper or plastic.

Physically implemented tickets are called paper tickets hereunder. In recent years, efforts have been made to implement electronic tickets that allow the issuing party to check the rights granted to ticket users and to verify tickets. Electronic information is easy to create and transmit over communication lines. But it is also easy to make perfect copies of such information. Thus to implement electronic tickets requires taking measures against forgery and unauthorized duplication. Forgery may be prevented by resorting to digital signatures, but they are not sufficient to forestall copying. How to prevent unauthorized duplication is, therefore, the biggest challenge facing the implementation of electronic tickets.

Conventionally, three kinds of techniques have been used to implement electronic tickets. The first technique is one which verifies whether a user bearing a ticket is the legitimate holder of the ticket when the ticket is about to be used. The second technique involves depriving anyone other than the issuing party of any chance of copying tickets. The third technique, a variation of the second technique, is to let communications be made public at the time of verification.

Each of these conventional techniques will be described below.

The first conventional technique involves checking to see whether a ticket holder is the legitimate user of the ticket when the ticket is on the point of being used. According to this technique, each issued ticket is given information for matching its specific rights with information necessary for verifying the identity of its user (i.e., user identification information). The matching information is recorded and managed by the user. The issuing party puts a digital signature on each ticket so that no other party can forge the ticket. Any ticket not bearing the electronic signature is considered a forged ticket.

In order to prevent the use of illegally duplicated tickets, the user needs to prove that he or she is a legitimate ticket holder complying with the user identification information borne by the ticket in question at the time of ticket use. When the user identification information is complied with, the rights specified by the ticket are allowed to be exercised; without the compliance, the use of the ticket is rejected. The user identification information may comprise illustratively the user's identity, his/her physical features such as a face photo, and possession of a specific knowledge such as a password. The user's identity may be proved by the user submitting his/her identification card or the like. Similarly, a face photo showing physical features of the user may be presented for user identification. Where passwords are utilized for identification, each user is asked to input the assigned password.

The second conventional technique involves depriving any other entity than the issuing party of any chance for making unauthorized copies of tickets. Because this technique has no need for user identification information, tickets may be issued and used while their users may remain anonymous. However, if a ticket is copied illegitimately, there is no means to prevent unauthorized use of the copied ticket. This requires forestalling duplication of tickets. It requires two schemes described below: a first scheme involves suitably preventing user-held tickets from getting copied, and a second scheme entails halting any leak of ticket data at the time of ticket issuance or during communication for ticket verification. The first scheme is implemented by having each user furnished with a device to which a ticket is recorded, the device being so designed that its contents may be modified only by the issuing party. The second scheme is realized by taking necessary communication measures against wiretapping.

An example of the second conventional technique is disclosed illustratively in Japanese Published Unexamined Patent Application No. Hei 8-147500. The disclosed method implements an electronic ticket system using a ticket storage device carried by each user. A ticket bearing an electronic signature is confined by the issuing party to each device. The electronic signature makes forgery difficult. Attempts to make an unauthorized copy of the ticket are countered by resorting to special instructions for retrieving the ticket from each ticket storage device. With the disclosed method in use, different issuing parties utilize different signature keys. This makes it possible for a single storage device to accommodate a plurality of tickets issued by a plurality of issuing parties. Because no information is needed about user identity, the legitimacy of tickets is proved by simply verifying the signature on each ticket.

The third conventional technique, a modified version of the second technique, is intended to let communications be made public at the time of ticket verification.

The third technique is functionally the same as the second technique in that each ticket is recorded as secret information to a device (proving device) carried by a user. The difference lies in how verification is carried out. A ticket verification device sends an unreproducible value such as a random number (called a challenge) to the proving device. The proving device performs on the challenge an arithmetic operation utilizing the secret information constituting the ticket, and sends the obtained value (called a response) back to the verification device. The verification device ascertains the legitimacy of the user by checking the response acquired by use of the secret information and challenge. It is difficult to complete within a reasonable time frame as the huge amount of calculations for acquiring the secret information from the challenge and the response. That difficulty makes it unnecessary to conceal communications between the verification device and the proving device.

A method functionally similar to the third conventional technique is disclosed in Japanese Published Examined Patent Application No. Hei 6-52518, although the purpose of the method is limited to the verification of controls for access to secured facilities. The disclosed method supplements the third technique with a feature relieving the verifier of the need to manage the secret information destined for each user and contained in his/her proving device. Specifically, the user carries a portable device equivalent to the proving device of the third conventional technique. During communication for verification, verification facility (i.e., verification device) receives an identification number from the user or from his/her portable device and calculates, based on the received number, secret information called a secret code unique to the portable device in question. The secret code thus acquired is used to carry out challenge-response protocols for user verification. This eliminates the need for the verification device to hold and manage secret information.

If electronic tickets are to take over the role currently assumed by paper tickets, it is necessary but not sufficient for the issuing party to verify the rights granted by each ticket to users and to ascertain that the ticket in question is authentic. In case of a dispute between the issuing party and a user, mediation by a third party is necessary. This requires that the traditional function of paper tickets for proving their rights be incorporated in electronic tickets as well.

It follows that electronic tickets must have three mandatory functions. A first function involves preventing unscrupulous persons from making unauthorized use of tickets. A second function entails allowing users to check the legitimacy of the tickets they possess. A third function is one which proves to a third party the rights conferred to a given ticket when necessary. The third function in fact includes the second function, so that the indispensable functions of electronic tickets are implemented if the first and third functions above are realized. An additional fourth function may also be required to ensure anonymity of ticket users.

The conventional techniques have a number of disadvantages. First of all, the first conventional technique can lose some of its functions depending on the user identification information utilized.

Where identification cards or similar means attesting to users' identity are used as user identification information, the identity of each user is revealed at the time of ticket issuance and verification. Where physical features of users represented illustratively by face photos are used as user identification information, anonymity is lost although a given user's identity is not immediately known. In any case, the loss of anonymity is inevitable and there is no way of implementing anonymously available tickets (i.e., fourth function is not realized).

In a remote environment where communication lines are used for identity verification, there is no secure means for proving the user's identity. Such an environment hampers the first function above from getting implemented.

Where passwords are used within the framework of the first conventional technique, the problem of keeping anonymity is alleviated but users are burdened with the need to memorize their passwords. Obviously, no user is prevented from voluntarily divulging his or her password. This adds to the possibility of tickets being used illegitimately. Thus the first function required for tickets is not achieved.

According to the second conventional technique, each ticket held by the user is protected against duplication, and communications effected by the issuing party at the time of verifying the legitimacy of tickets are kept confidential. Such features pose two problems. One problem is that no other entity than the issuing party can copy tickets, which makes it difficult to prove the legitimacy of any ticket to a third party. That means the third function above is not implemented. Another problem is that the confidentiality of communications at the time of ticket issuance or verification makes it impossible to prove that privacy and other rights of the user are not violated upon ticket issuance or verification.

The method disclosed in Japanese Published Unexamined Patent Application No. Hei 8-147500 is an example of the second conventional technique and is thus subject to the above disadvantages.

The third conventional technique is utilized for verification and is not intended to transmit information other than which proves the legitimacy of the ticket held by a given user. With the period of such legitimacy and other information not included, this technique can only be used to represent unsophisticated tickets. Furthermore, it is necessary to transmit tickets to the proving device in the same confidential manner as with the second conventional technique. This makes it impossible to prove that a given user's rights are not violated by unauthorized disclosure of his or her information.

The method disclosed in Japanese Published Examined Patent Application No. Hei 6-52518 is an example of the third conventional technique and is thus subject to the above disadvantages.

As described, the conventional techniques are flawed in that they attempt to implement the first function required of tickets (i.e., prevention of unauthorized ticket use) at the expense of the second and third functions (proving of ticket contents to a third party) or the fourth function (guaranty of users' anonymity).

SUMMARY OF THE PRESENT INVENTION

It is therefore an object of the present invention to provide an electronic ticket system for creating, issuing and using tickets, the system being arranged so that it will make forging or copying of tickets virtually impossible (first function); that it can prove the contents of tickets to a third party (second and third functions); and that it will ensure users' anonymity at the time of ticket use (fourth function).

In carrying out the present invention and according to one aspect thereof, there is provided an electronic ticket system comprising a ticket issuing device, a ticket proving device and a ticket verification device. The ticket issuing device includes: means for holding ticket characteristic information, means for holding information unique to the ticket proving device, and means for performing ticket calculations based on the ticket characteristic information and on the information unique to the ticket proving device. The ticket proving device comprises: ticket hold means, ticket retrieval means, unique identifying information hold means, internal state hold means, proving procedure execution means, and means for communicating with the ticket verification device. The ticket verification device has verifying procedure execution means and means for communicating with the ticket proving device.

The ticket issuing device issues a ticket based on the ticket characteristic information and on the information unique to the ticket proving device. The ticket proving device holds the ticket issued by the ticket issuing device. The communication means connects the ticket verification device with the ticket proving devices. Executing the proving procedure corresponding to the ticket held by the ticket proving device initiates interaction between the verification and proving devices. When the proving procedure is successfully completed, the ticket in question is allowed to be used. At the time of execution, the proving procedure execution means causes the ticket retrieval means to retrieve a ticket corresponding to a ticket identifier transmitted from the ticket verification device. If the corresponding ticket is found, that ticket is used to execute the proving procedure. In executing the proving procedure, two kinds of information may be utilized: unique identifying information held by the unique identifying information hold means, and internal state information held by the internal state hold means. Where a ticket is to be used, the proving device proves the validity of the ticket on the basis of the matching characteristic information, and updates and/or transmits the information corresponding to the ticket in question. The verification device is connected to the proving device through the communication means for communication therebetween. With the verifying procedure executed, the two devices communicate with each other to verify that the proving device holds a valid ticket. In verifying tickets, the verification device checks the validity of each ticket in accordance with the characteristic information. The verification device also gives instructions to update and/or acquire information corresponding to the ticket held by the proving device.

These and other objects, features and advantages of the present invention will become more apparent upon a reading of the following description and appended drawings.

DESCRIPTION OF THE PREFERRED EMBODIMENTS

Figure 18:
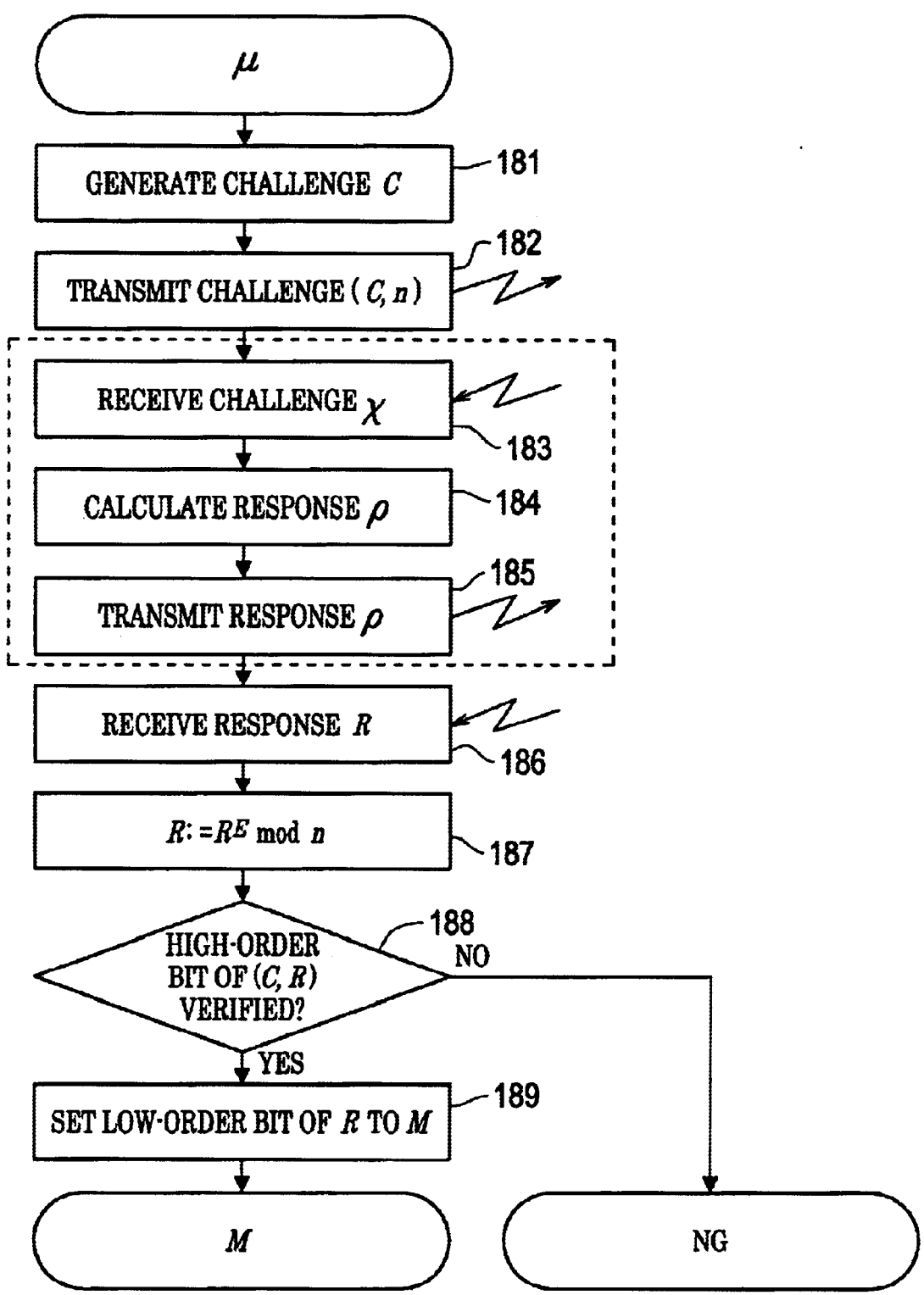
FIG. 18 is another flowchart of steps describing the ticket verifying procedure.
Figure 19:
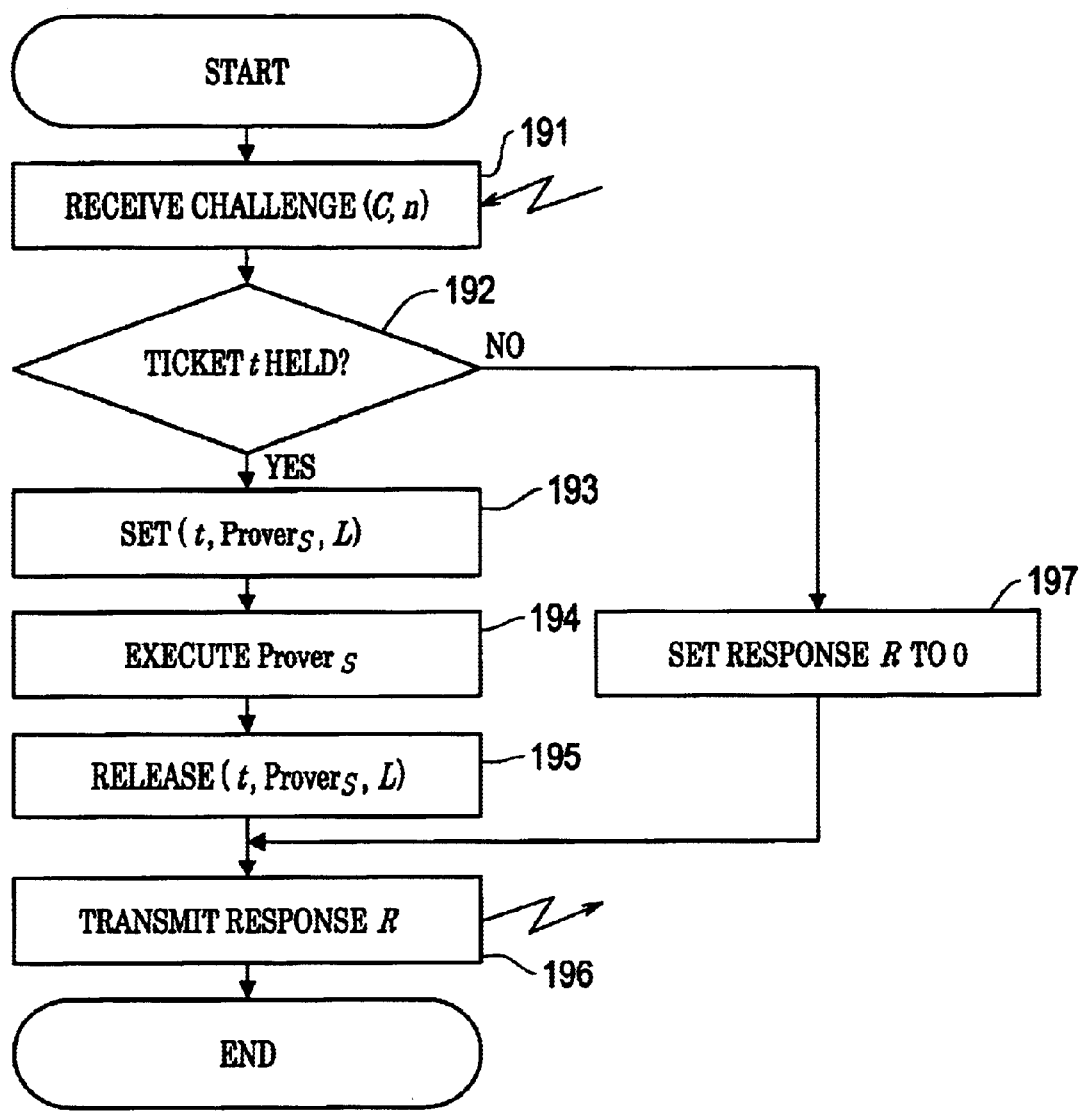
FIG. 19 is a flowchart of steps describing a ticket proving procedure.
Figure 23:
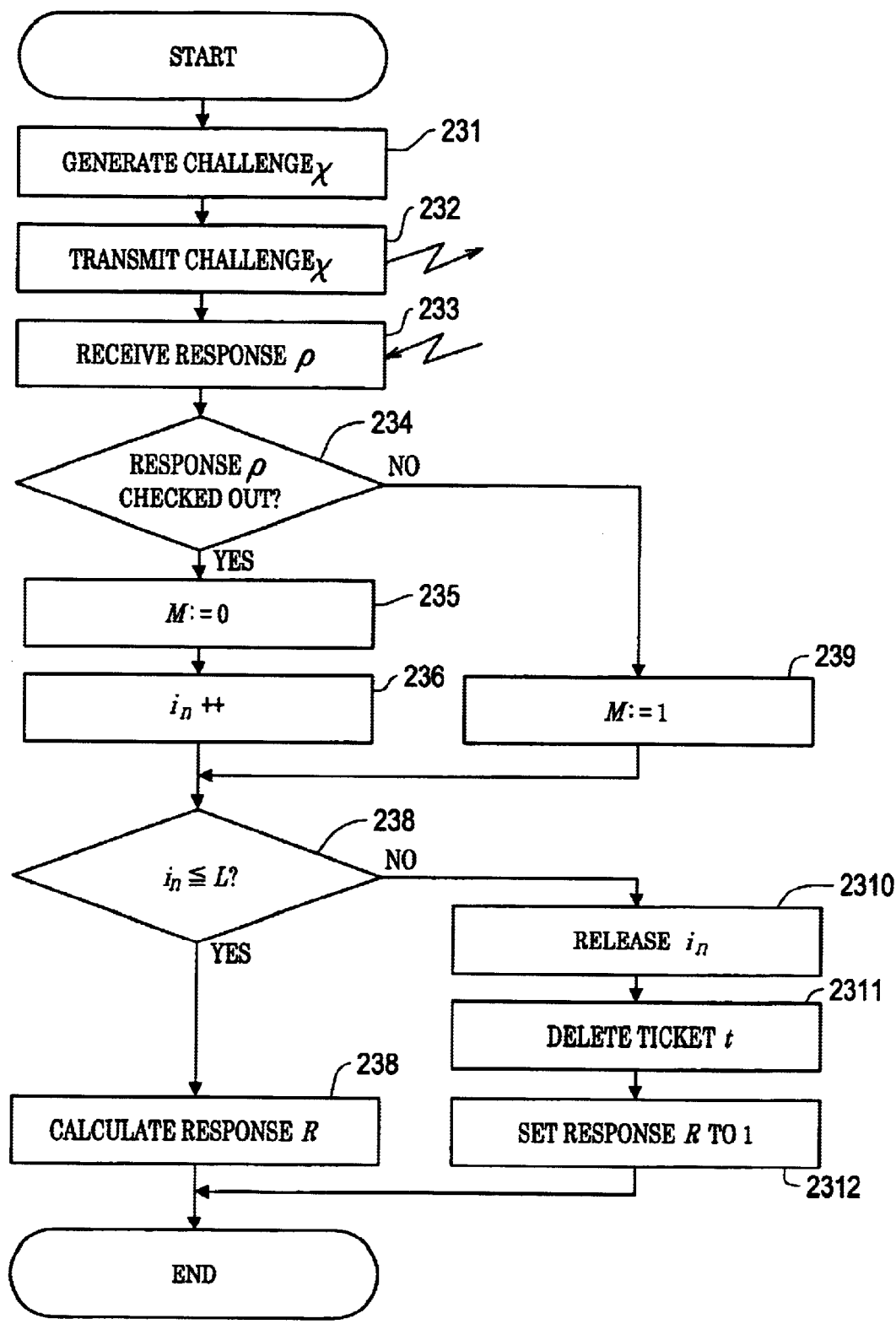
FIG. 23 is another flowchart of steps describing part of the ticket proving procedure.
Figure 24:
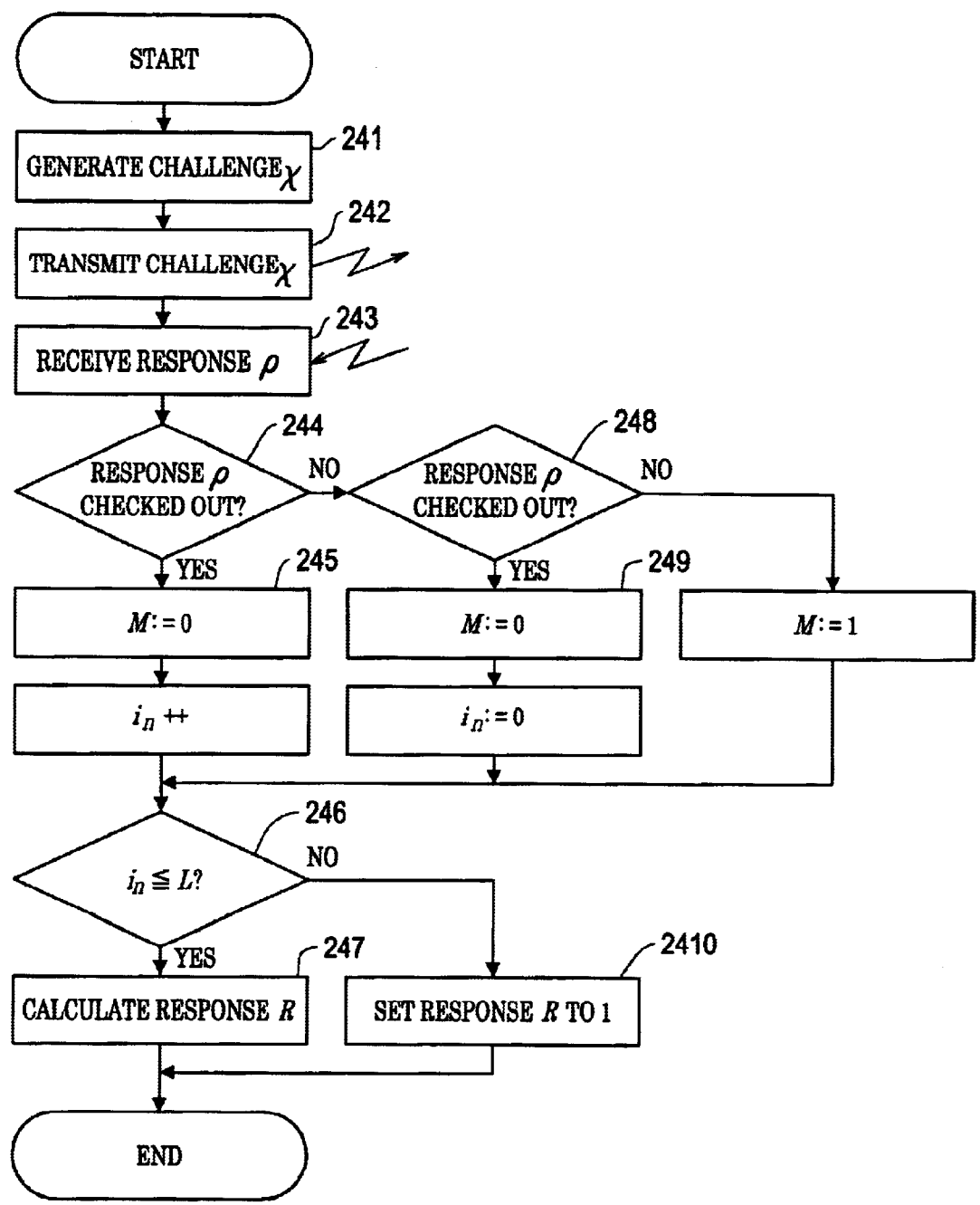
FIG. 24 is another flowchart of steps describing part of the ticket proving procedure.
Figure 26:
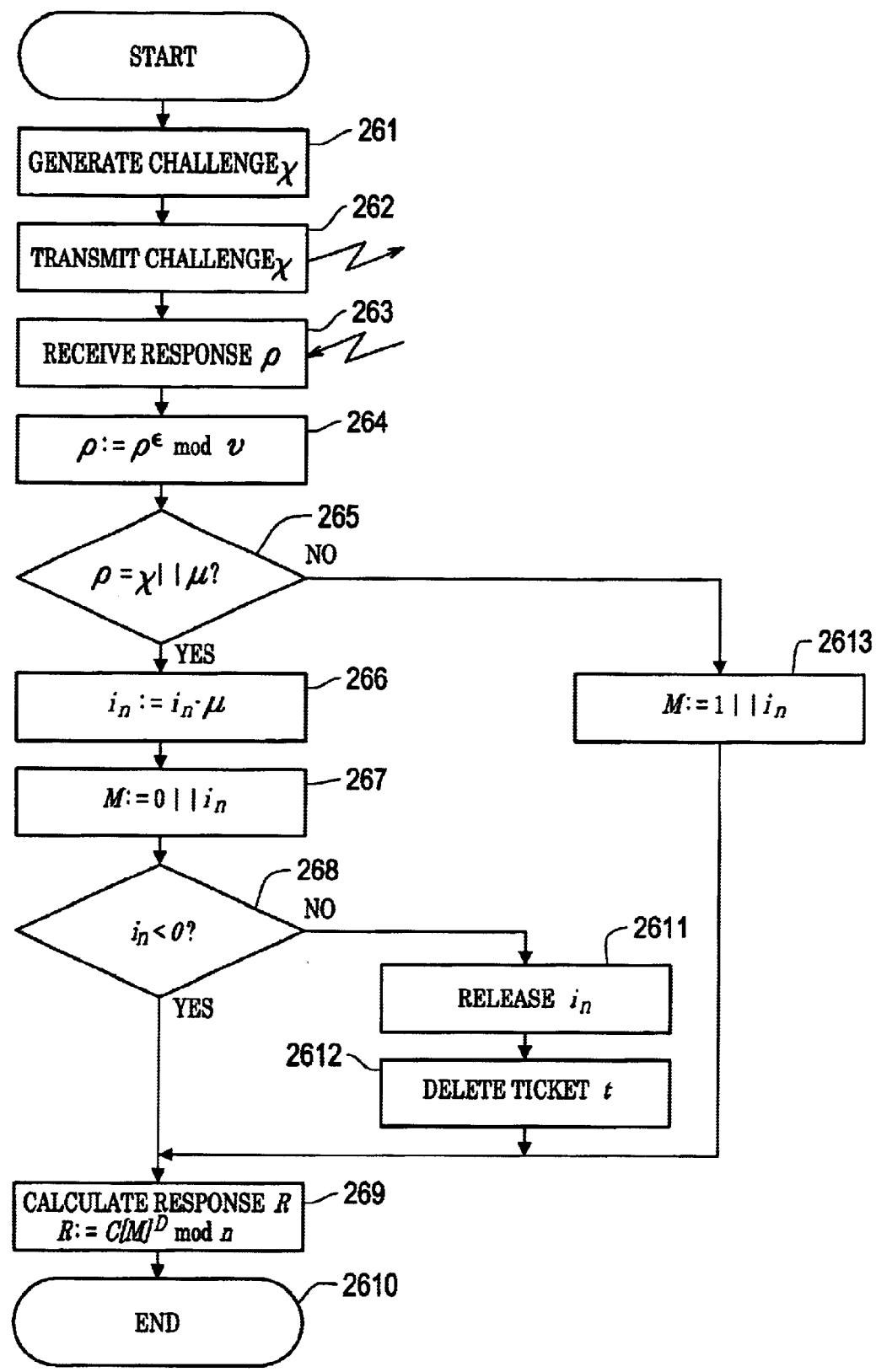
FIG. 26 is another flowchart of steps describing part of the ticket proving procedure.
Figure 27:
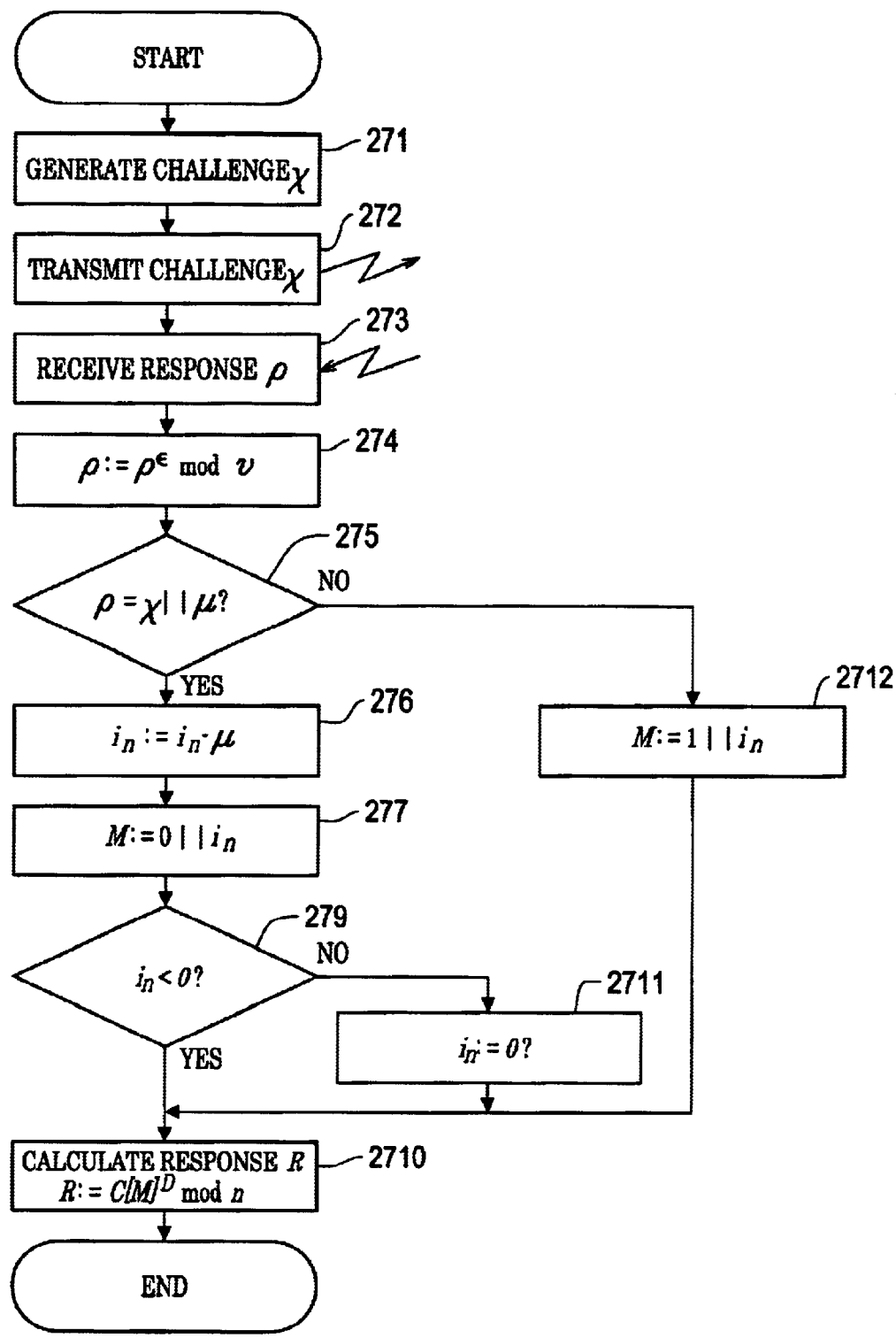
FIG. 27 is another flowchart of steps describing part of the ticket proving procedure.
Figure 31:
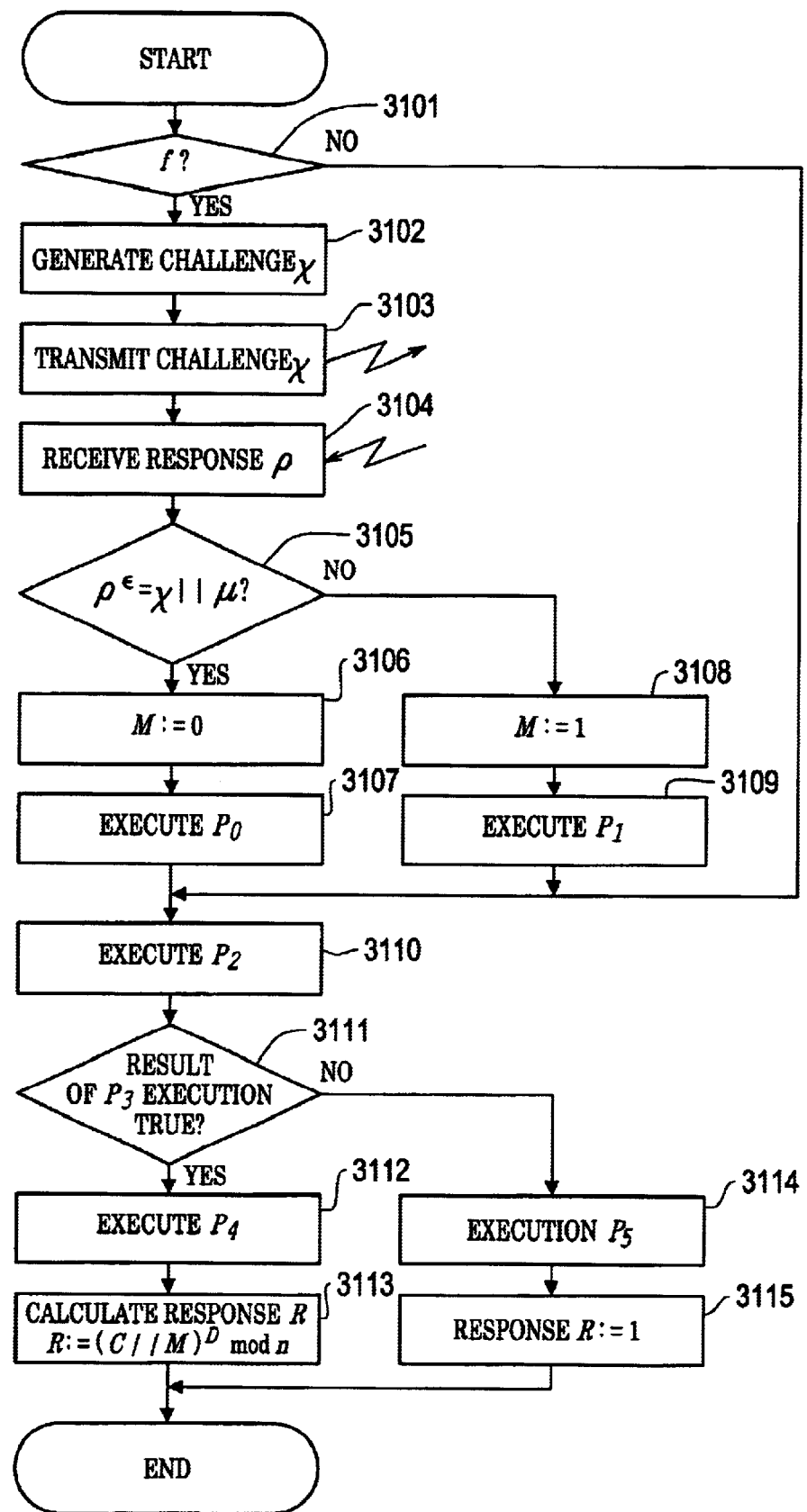
FIG. 31 is a flowchart of steps describing the ticket proving procedure.

Preferred embodiments of the present invention will be described under the following headings:

1. Overview of the Embodiments (FIGS. 12, 28, 29)
2. First Embodiment
   2.1 Authentication technique
   2.2 Simple Interactive Protocol: for Commuter Pass Type Ticket (FIGS. 13, 19, 20)
   2.3 First Interactive Protocol: for Commuter Pass Type Ticket (with a clock in the proving device; FIGS. 14, 19, 21)
   2.4 Second Interactive Protocol: for Membership Card Type Ticket (FIGS. 15, 19, 22)
   2.5 Third Interactive Protocol: for Coupon Type Ticket (of throwaway type; FIGS. 16, 19, 23)
   2.6 Fourth Interactive Protocol: for Coupon Type Ticket (of reusable type; FIGS. 16, 19, 24)
   2.7 Fifth Interactive Protocol: for Stamp Collecting Card Type Ticket (FIGS. 17, 19, 25)
   2.8 Sixth Interactive Protocol: for Prepaid Card Type Ticket (of throwaway type; FIGS. 18, 19, 26)
   2.9 Seventh Interactive Protocol: for Prepaid Card Type Ticket (of reusable type; FIGS. 18, 19, 27)
   2.10 Eighth Interactive Protocol: for Coupon Type Ticket (FIGS. 16, 19, 24)
   2.11 Ninth Interactive Protocol: For Prepaid Card Type Ticket (FIG. 18)
   2.12 Tenth Interactive Protocol: for Prepaid Card Type Ticket (FIGS. 18, 19, 27)
   2.13 Eleventh Interactive Protocol: Selected from Multiple Protocols Furnished
   2.14 Twelfth Interactive Protocol: Provision of Protocol Based on Ticket Added Information (FIGS. 19, 31)

Figure 4:
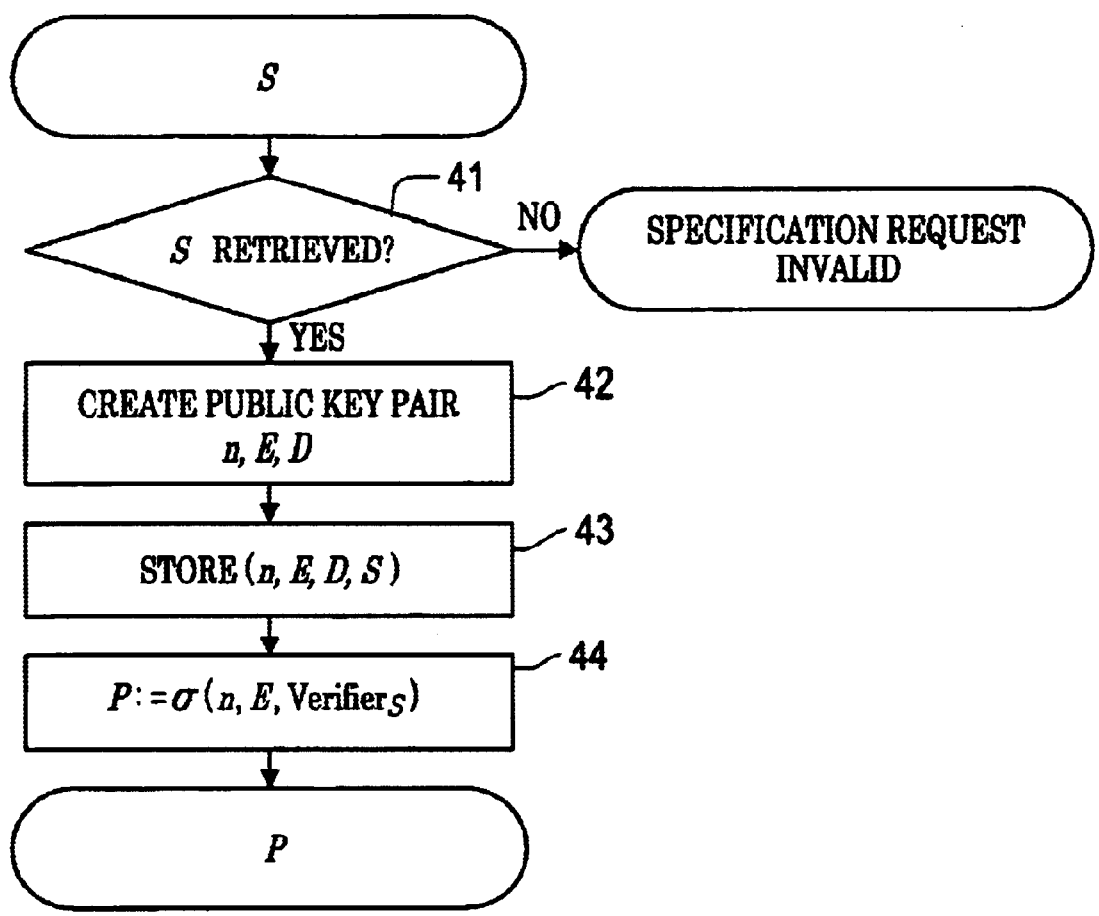
FIG. 4 is a flowchart of steps describing how the ticket creating and issuing device works.
Figure 5:
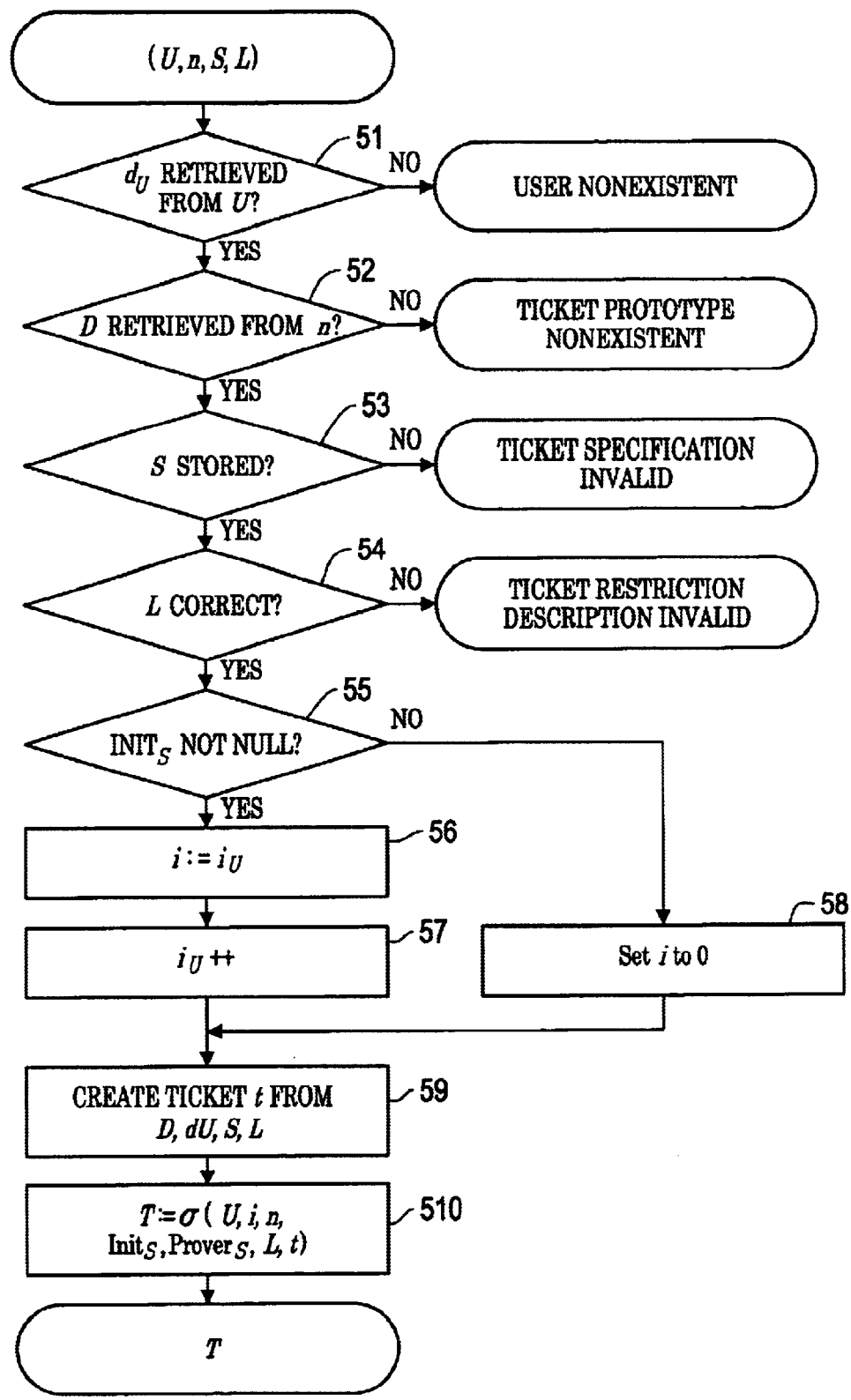
FIG. 5 is another flowchart of steps describing how the ticket creating and issuing device works.

2.15 Thirteenth Interactive Protocol: Constitution of the Verification device (FIG. 30)
3. Second Embodiment
   3.1 Authentication technique
   3.2 Fourteenth Interactive Protocol: for Commuter Pass Type Ticket (FIGS. 13, 19, 20)
   3.3 Fifteenth Interactive Protocol: for Commuter Pass Type Ticket (FIGS. 32, 19, 33)
4. Third Embodiment (FIGS. 5 to 9)
5. Fourth Embodiment (FIGS. 4, 5)

1. Overview of the Embodiments (FIGS. 1, 2, 3, 12, 28, 29)

Figure 1:
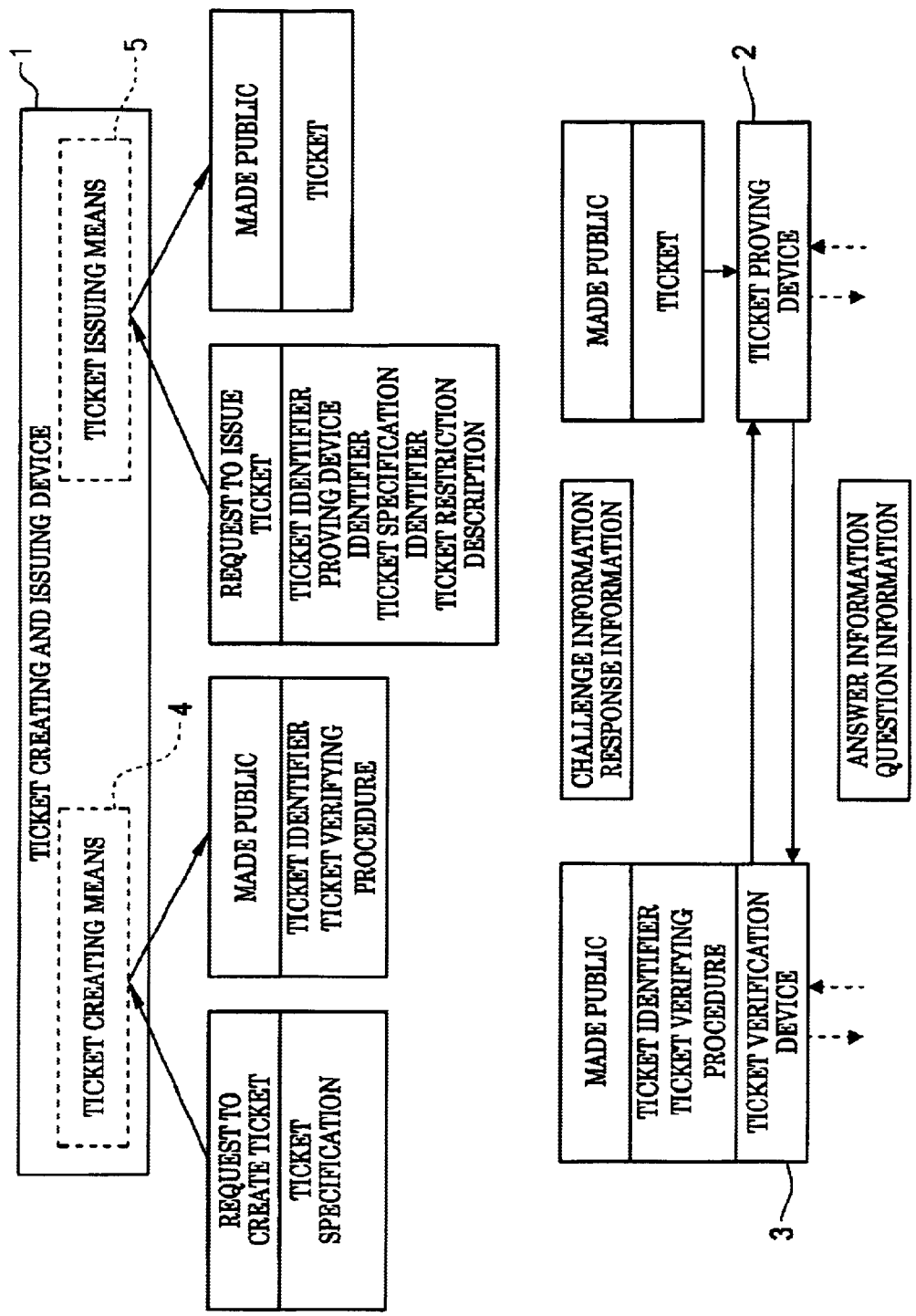
FIG. 1 is a block diagram showing a typical constitution representing the principle of the present invention.

FIG. 1 is a block diagram showing a conceptual constitution of an electronic ticket system according to the present invention. In FIG. 1, the electronic ticket system comprises a ticket creating and issuing device 1, a ticket proving device 2, and a ticket verification device 3. The ticket creating and issuing device 1 has ticket creation means 4 and ticket issuing means 5. The ticket creation means 4 creates specifications of a ticket representing the rights for a particular service or a product based on a request to create that ticket. The ticket creating request is made by an entity or its agent wishing to receive a compensation for each ticket representing the service or product offered. The ticket issuing means 5 issues a matching ticket based on a ticket issuing request from an entity or its agent wishing to receive the service or product by presenting the ticket. In issuing the ticket, the ticket issuing means 5 receives as its input a ticket identifier, a proving device identifier, a ticket specification identifier and ticket added information.

The ticket proving device 2 holds a ticket issued by the ticket issuing means 5 and communicates with the ticket verification device 3 to prove the possession of the ticket. The ticket verification device 3 holds the ticket identifier prepared by the ticket creation means 4 and a ticket verifying procedure, and communicates with the ticket proving device 2 to verify ticket. In the description that follows, the ticket creating and issuing device 1 may be abbreviated where appropriate as the creating/issuing device, the ticket proving device 2 as the proving device, and the ticket verification device as the verification device.

Figure 2:
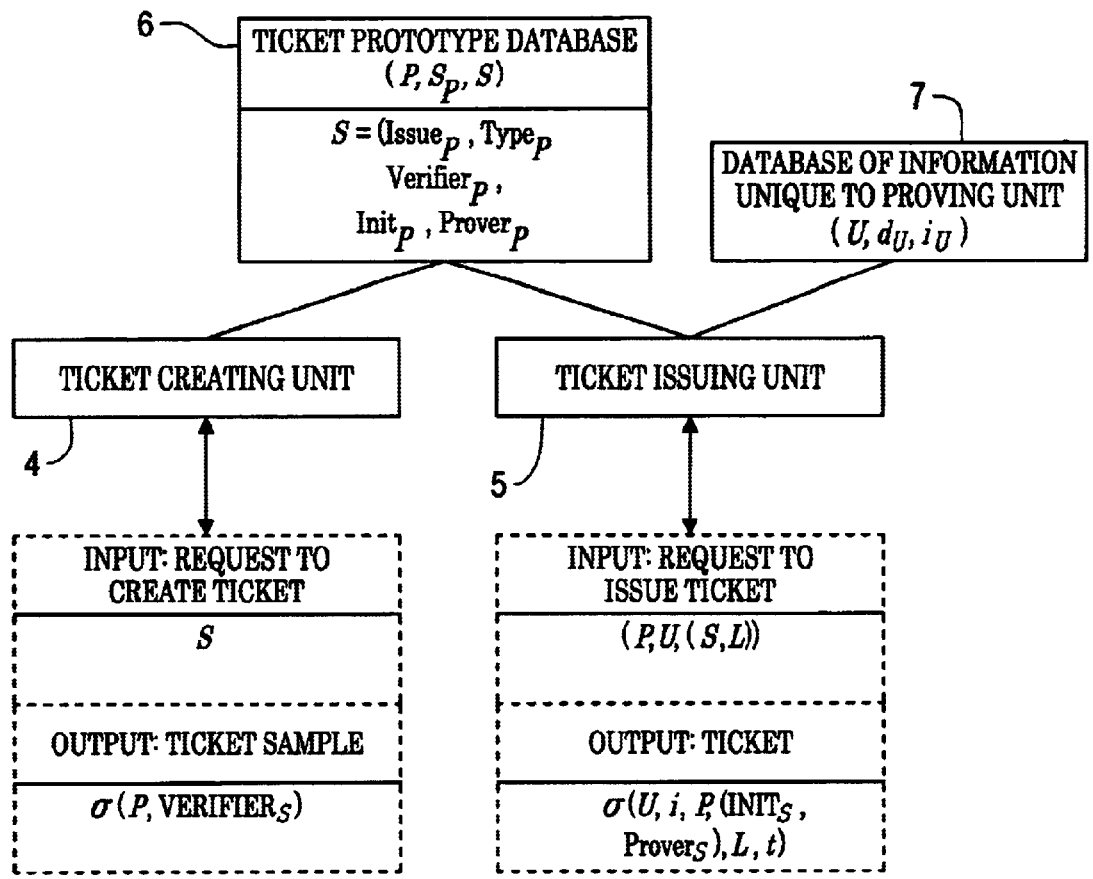
FIG. 2 is a block diagram showing a typical constitution of a ticket creating and issuing device.
Figure 3:
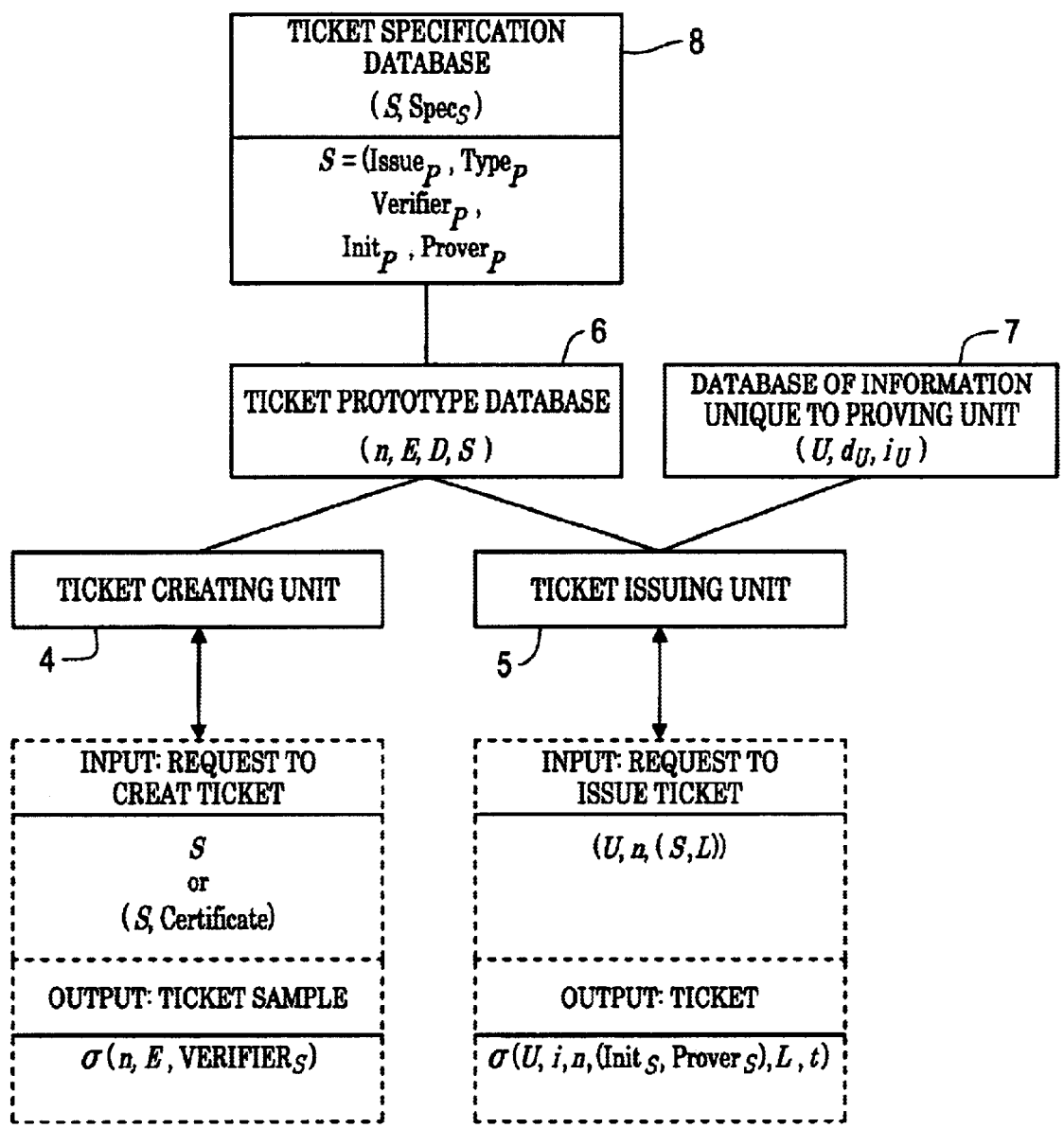
FIG. 3 is a block diagram showing another constitution of the ticket creating and issuing device.
Figure 12:
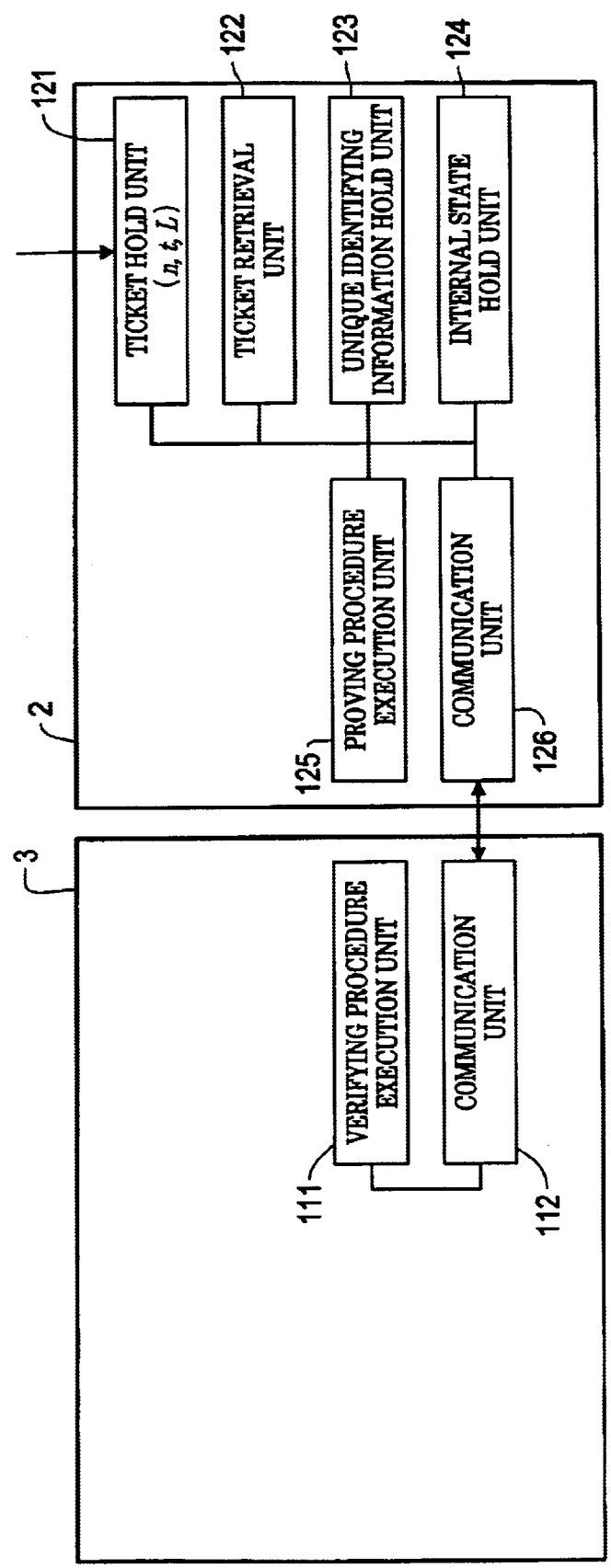
FIG. 12 is a block diagram showing typical constitutions of a ticket verification device and a ticket proving device.

FIGS. 2 and 3 are block diagrams showing typical overall constitutions of the ticket creating and issuing device 1. FIG. 12 is a block diagram showing typical overall constitutions of the ticket verification device 2 and the ticket proving device 3. FIGS. 2 and 3 depict basically the same structure, except that FIG. 2 gives an example in which a common public key cryptosystem is used for authentication while FIG. 3 shows an example where the Rivets, Shimmer, Alderman (RSA) public key system is utilized for authentication.

In FIG. 2, the ticket creating and issuing device 1 comprises a ticket creating unit (means) 4, a ticket issuing unit(means) 5, a ticket prototype database 6, and a database 7 of the proving device unique identifying information. In FIG. 3, the ticket creating and issuing device 1 further includes a ticket specification database 8. Details (i.e., operations) of the ticket creating and issuing device 1 will be described later with reference to the third and fourth embodiments of the present invention.

In FIG. 12, the ticket verification device 3 has a verifying procedure execution unit 111 and a communication unit 112. The ticket proving device 2 comprises a ticket hold unit 121, a ticket retrieval unit 122, a unique identifying information hold unit 123, an internal state hold unit 124, a proving procedure execution unit 125, and a communication unit 126.

Figure 28:
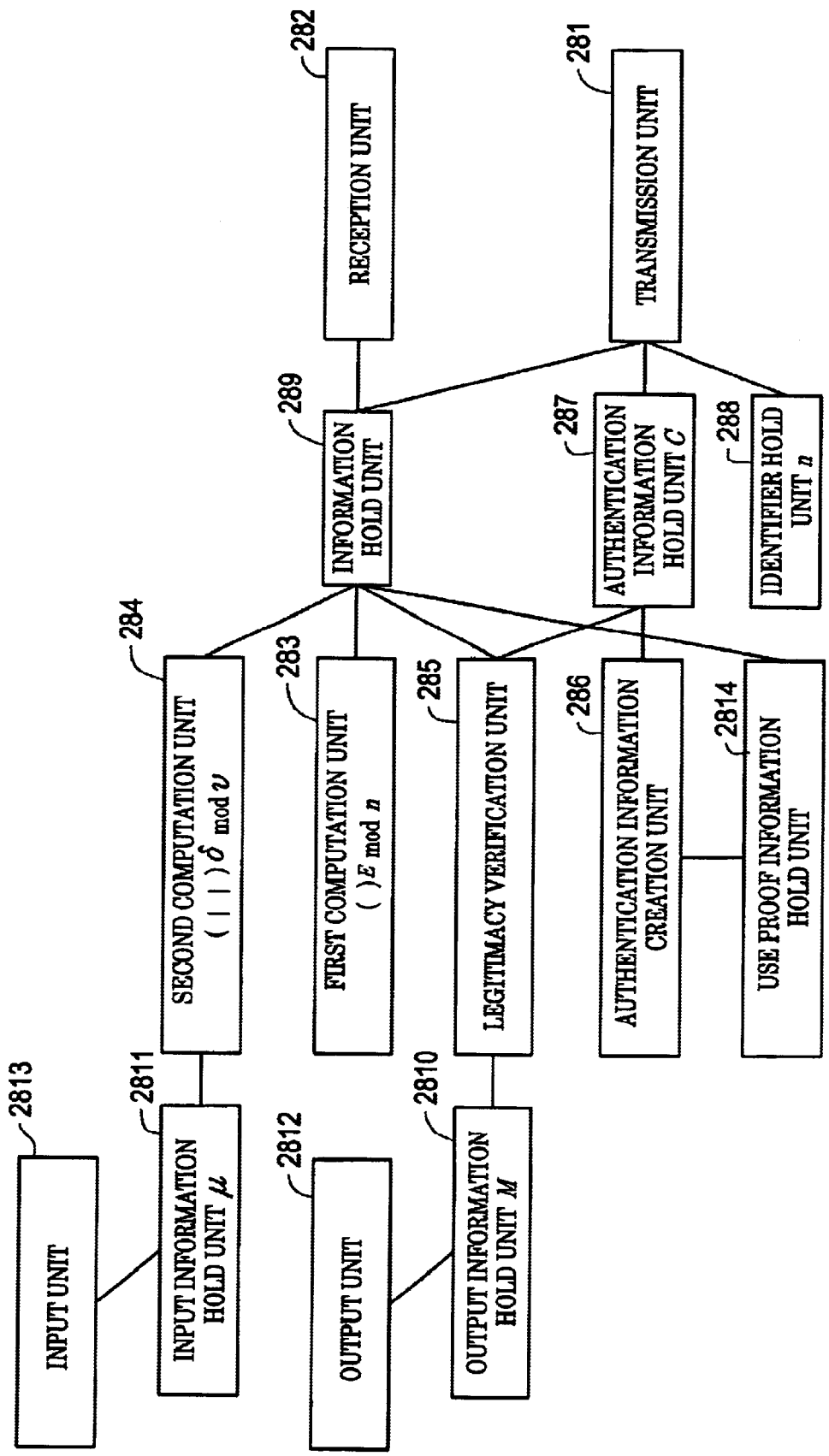
FIG. 28 is a block diagram showing a typical constitution of verifying procedure execution means.
Figure 29:
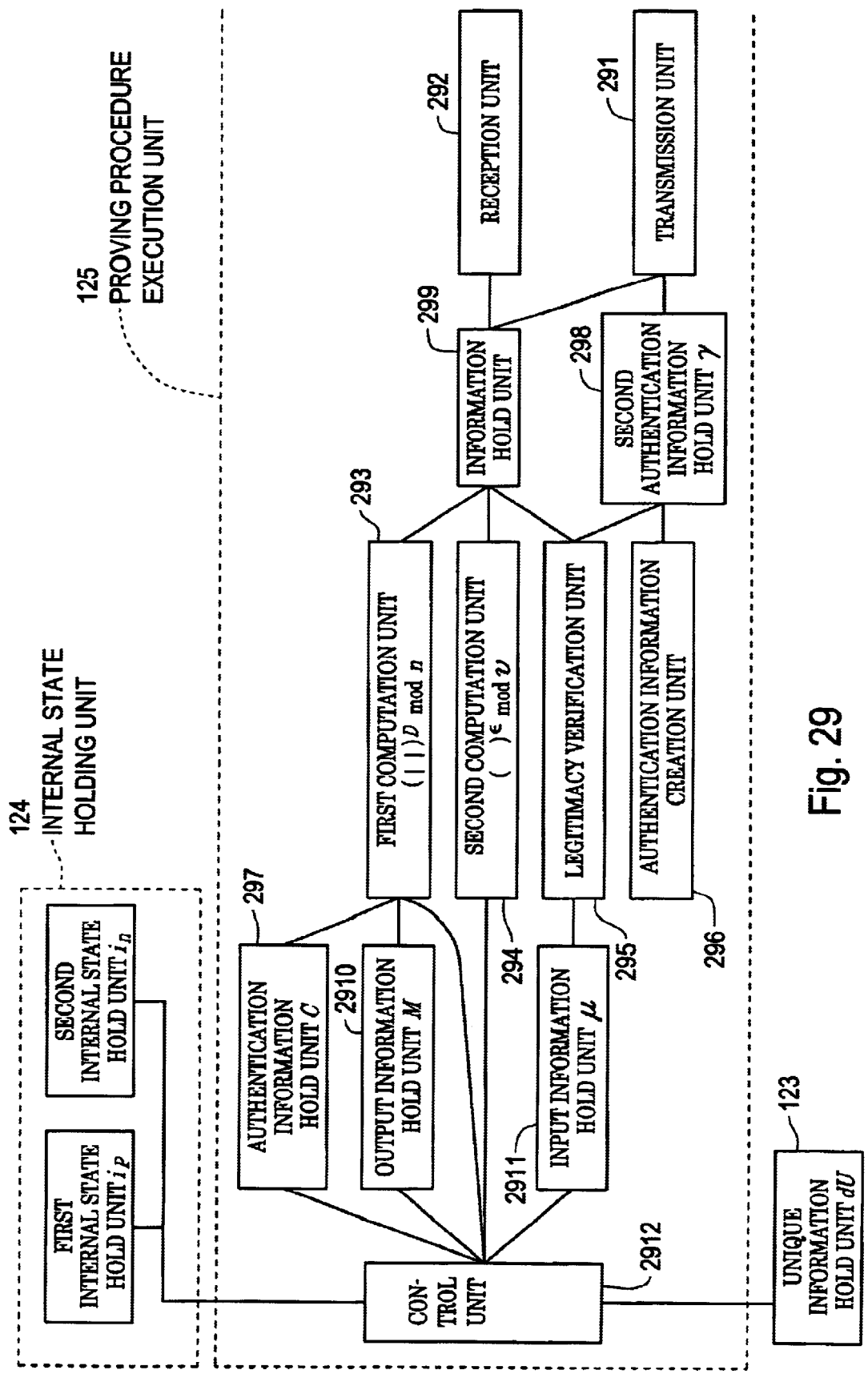
FIG. 29 is a block diagram showing a typical constitution of proving procedure execution means.

FIG. 29 is a block diagram showing a detailed constitution of the proving procedure execution means 125 in the ticket proving device 2. FIG. 28 is a block diagram showing a detailed constitution of the verifying procedure execution means 111 in the ticket verification device 3. In the first embodiment, as shown in FIGS. 28 and 29, the proving procedure execution unit 125 in the proving device 2 comprises: a transmission unit 291, a reception unit 292, a first computation unit 293, a second computation unit 294, a legitimacy verification unit 295, an authentication information generation unit 296, an authentication information hold unit 297, a second authentication information hold unit 298, an information hold unit 299, an output information hold unit 2910, an input information hold unit 2911, and a controlling unit 2912.

The verifying procedure execution unit 111 in the verification device 3 includes: a transmission unit 281, a reception unit 282, a first computation unit 283, a second computation unit 284, a legitimacy verification unit 285, an authentication information generation unit 286, an authentication information hold unit 287, a ticket identifier hold unit 288, an information hold unit 289, an output information hold unit 2810, an input information hold unit 2811, an outputting unit 2812, an inputting unit 2813, and a use proof information hold unit 2814.

It is assumed that of the means constituting various procedure execution units, those necessary for each specific proving or verifying procedure will be selected and discussed in the examples that follow.

2. First Embodiment

The first embodiment of the present invention will now be described.
2.1 Authentication Technique A ticket is calculated by the ticket issuing device using ticket characteristic information and unique identifying information about the proving device 2. Below is a detailed description of a method for proving a ticket that is implemented when the ticket characteristic information is made up of public and secret information according to the RSA public key system. Suppose that p and q are two different odd prime numbers and that they are used in expressions as follows:

$$n=pq, \lambda(n)=\text{lcm}(p-1, q-1) \qquad \text{[Expression 1]}$$

$$ED \equiv 1 \bmod \lambda(n) \qquad \text{[Expression 2]}$$

where, 1 cm stands for a least common multiple, (n, E) for the public information and D for the corresponding secret information.

The ticket is composed of data calculated on the basis of the ticket characteristic information D, the proving device unique identifying information $d_U$, and ticket added information L. The proving device 2 is arranged so that using its unique identifying information $d_U$ and given an input (C, n, t, L), the unit may calculate $\tau(C, n, t, L) = C^D \bmod n$.

For example, suppose that $d_U$ stands for a decryption key of a cryptosystem, $E_U$ for an encryption key corresponding to the key $d_U$, and H for a one-way function. In such a case, the ticket may be given as $$t := (E_U(D), H(d_U \| D \| L)) \qquad \text{[Expression 3]}$$

where, $\|$ represents a concatenation of bit strings.

If the ticket is defined here as (1), the proving device may calculate a code "$C^D \bmod n$" based on the ticket characteristic information D as follows: given the input (C, n, t, L), the proving device decodes $E_U(D)$ using the unique identifying information $d_U$ to restore D. Using the value D thus acquired, the proving device compares the value of the one-way function with the ticket so as to check the legitimacy of the value L. The proving device then calculates "$C^D$ mod n" using the restored value D.

Alternatively, $d_U$ can be a one-way function to define the ticket as $$t:=D-d_U(L, n) \quad \text{[Expression 4]}$$

When the ticket is defined by the above expression, the code "$C^D$ mod n" based on the value D with respect to the input (C, n, t, L) may also be obtained by computing: $C^t C^{dU(L, n)}$ mod n. In the case of this ticket, the integrity of the value L or the value D cannot be ascertained by that part of the proving device 2 which performs secret calculations unless the ticket t or public information E is input. The code corresponding to the secret information may be calculated without the ticket t being input to that part of the proving device 2 which carries out secret calculations.

At least part of the means for calculating "$C^D$ mod n" given the unique identifying information $d_U$ about the proving device 2 and the input (C, n, t, L) should preferably be contained in and protected by a tamperproof enclosure.

In the examples below of authentication procedures, all steps except for step 194 in FIG. 19 are common. Thus detailed stages of steps 194 (as indicated by "Prover") will be given emphasis in the description that follows.

Figure 13:
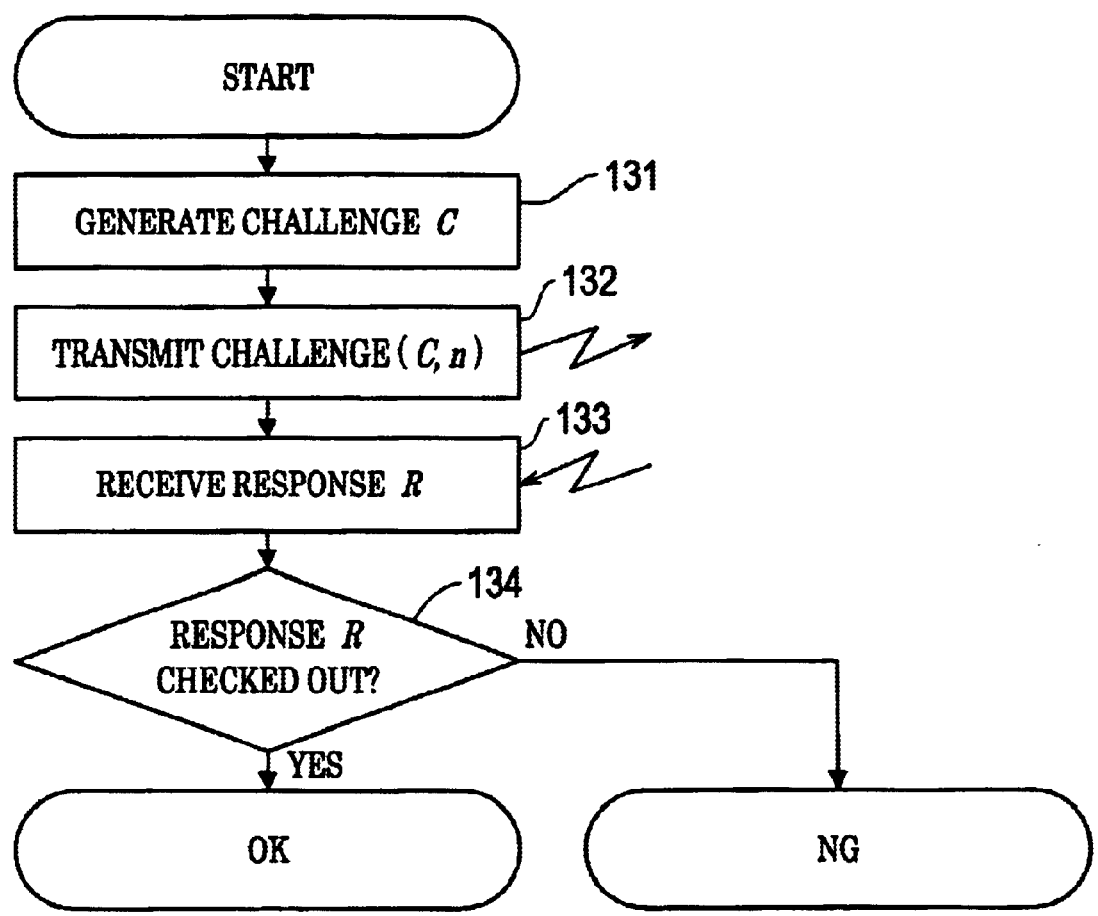
FIG. 13 is a flowchart of steps describing a ticket verifying procedure.
Figure 14:
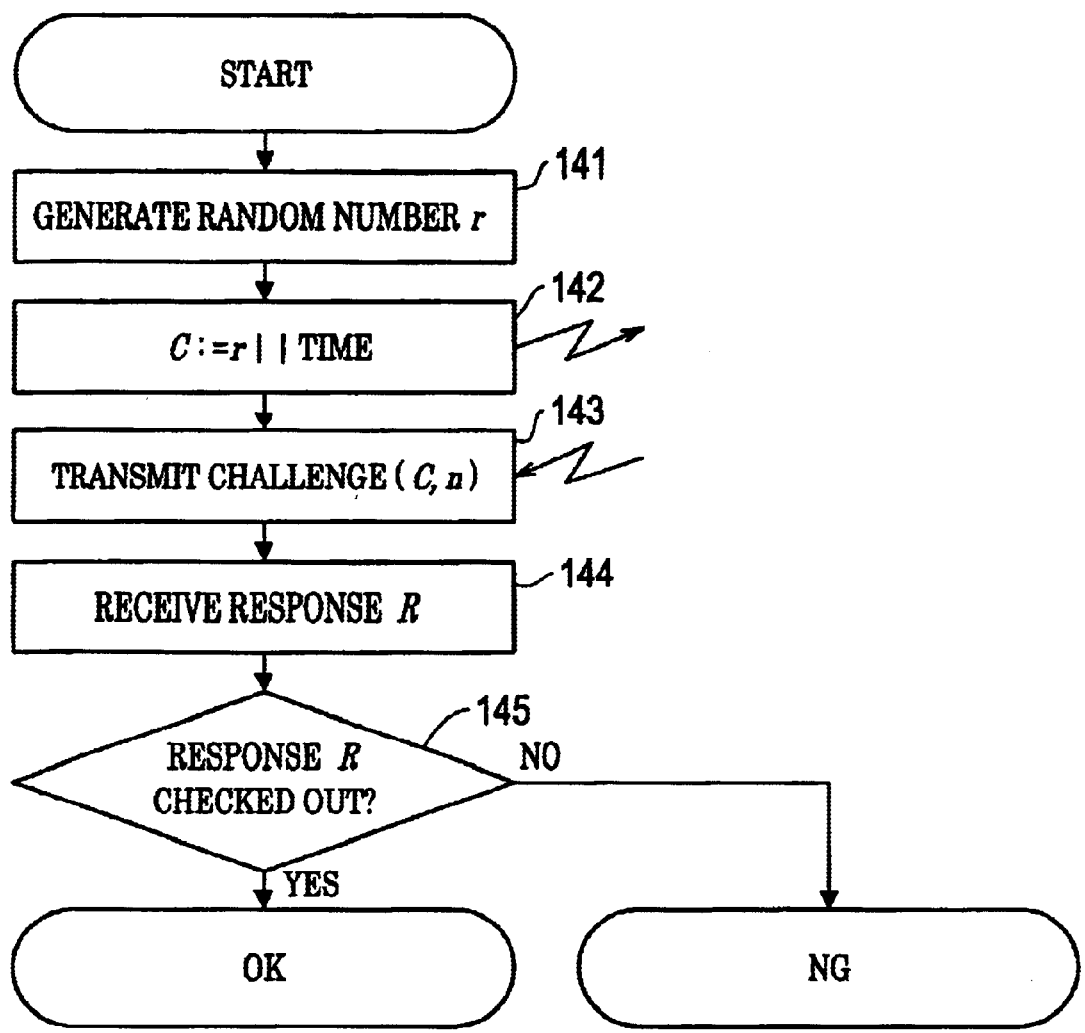
FIG. 14 is another flowchart of steps describing the ticket verifying procedure.
Figure 20:
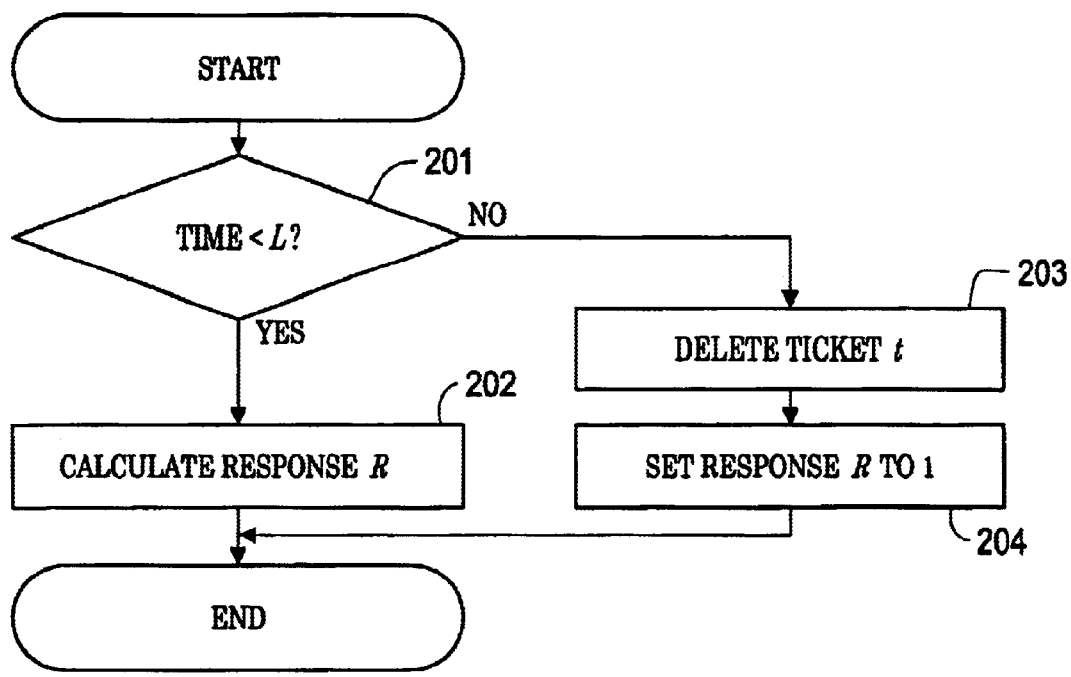
FIG. 20 is a flowchart of steps describing part of the ticket proving procedure.
Figure 21:
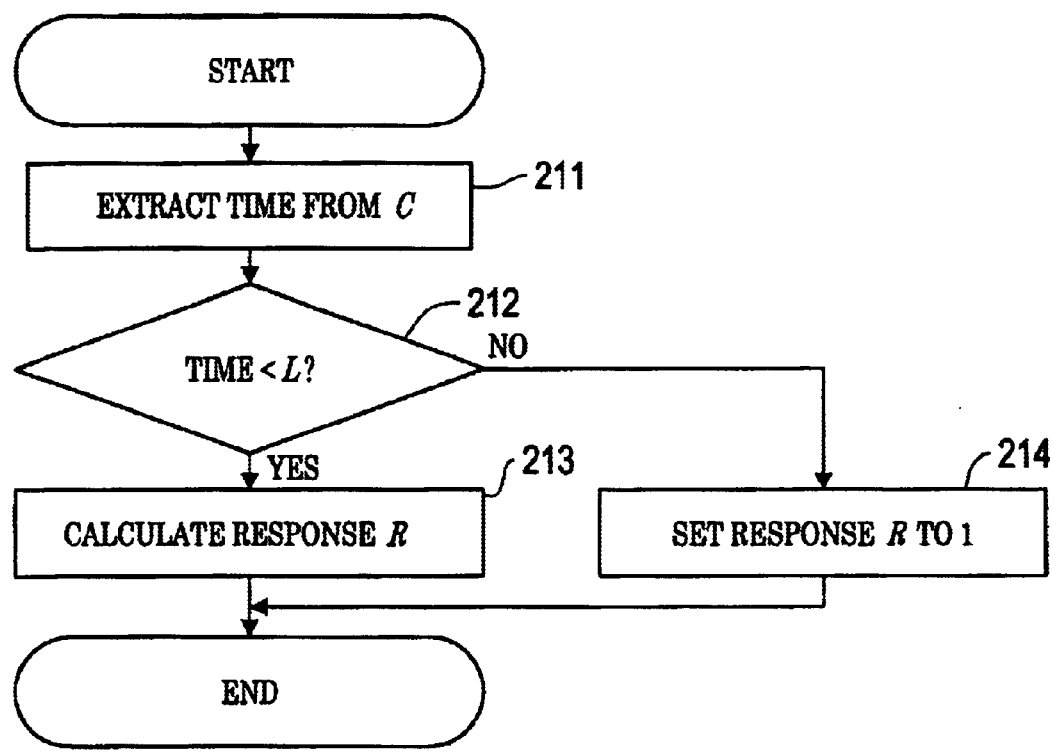
FIG. 21 is another flowchart of steps describing part of the ticket proving procedure.

2.2 Simple Interactive Protocol (for Commuter Pass Type Tickets, With a Clock Held by the Proving Device 1; see FIGS. 13, 19, 20)

A simple example of interaction between the verification device 3 and the proving device 2 will now be described. It is assumed here that the proving device 2 has time-of-day information as its internal information. The verifying procedure and the proving procedure will be generically called the interactive protocol hereunder.

FIGS. 12 and 28 show typical constitutions of the verification device 3 for this simple interaction example, with the protocol for the verification device described in reference to FIG. 13. FIGS. 12 and 29 illustrate typical constitutions of the proving device 2, with the protocol of the proving device discussed in reference to FIG. 19.

In the verification device 3, the authentication information generation unit 286 generates a challenge C and records it to the authentication information hold unit 287 (step 131 in FIG. 13). It is preferred that the challenge C be a value different from any challenge values that have been used already. In particular, the challenge C should preferably be a random number. The challenge C recorded to the authentication information hold means 287 and that identifier n of the ticket to be verified which is held in the identifier hold unit 288 are sent in combination to the proving device 2 through the transmission unit 281 (step 132).

In the proving device 2, the reception unit 292 receives (C, n) from the verification device 3 and records the received information to the information hold unit 299 (step 191 in FIG. 19). The ticket retrieval unit 122 retrieves from the ticket hold unit 121 the ticket corresponding to the received identifier n, to see whether the ticket in question is being held (step 192). It should be noted that where only one type of tickets is handled as in this example, the step to retrieve the ticket corresponding to the identifier n is not needed; whether or not the ticket is being held need only be judged. In this case, there is no need in step 132 to send (C, n) from the verification device 3; the challenge C need only be transmitted. If it is guaranteed that the ticket exists, the step to check the possession of the ticket (i.e., step 192) and step 197 are both unnecessary. If it is found as the result of step 192 that the corresponding ticket does not exist, a value signifying the absence of the ticket (value 0 in this example) is set to a response R which is recorded to the information holding unit 299 (step 197). If the corresponding ticket is found to exist as the result of step 192, then the ticket t, the procedure "Prover$_s$" of the proving device 2, and the ticket added information L are set within the controlling unit 2912 (step 193).

After step 193 has been executed, step 194 is carried out. Detailed stages of step 194 in this interaction example will now be described with reference to FIG. 20. The time of day "time" read from the second internal state hold unit of the internal state hold unit 124 is compared with the period of validity in the information L to see whether the ticket is valid at that point of time (step 201 in FIG. 20). The ticket is judged to be invalid if the "time" has reached or exceeded the end of the period of validity; the ticket is deemed valid if the "time" has yet to reach the end of the period of validity. If the period of validity is represented by a start time and an end time, the "time" is valid when it comes therebetween and invalid when exceeding the period. When the ticket is judged to be valid, the first computation unit 293 computes the response R as $$R:=C^D \bmod n$$

and records the calculated value to the information hold unit 299 (step 202). The response R may be calculated entirely by the first computation unit 293 in the proving device 2. Alternatively, if the ticket t is formed as $$t=D-d_U(L, n)$$

then the calculation of "$C^D$ mod n" may also be carried out as $$C^t C^{dU(L, n)} \bmod n.$$

This makes it possible to compute "$C^t$ mod n" outside the proving device 2 and to multiply, also outside, the result of "$C^t$ mod n" by "$C^{dU(L, n)}$ mod n" calculated by the first computation unit 293 inside the proving device 2. This scheme is effective if the speed of calculations by the proving device 2 is low.

If the ticket is judged to be invalid in step 201, the ticket is deleted from the ticket hold unit 121 as needed (step 203). A value signifying the failure of the ticket to fall within the period of validity (value 1 in this case) is set to the response R which is recorded to the information hold unit 299 (step 204). The foregoing has been a description of the detailed stages of step 194 in this interaction example.

After the execution of step 194, the ticket t, procedure Prover$_s$ and information L are released from the controlling unit 2912 (step 195 in FIG. 19). With step 195 or 197 carried out, the response R is transmitted from the transmission unit 291 to the verification device 3 (step 196).

The reception unit 282 in the verification unit 3 receives the response R from the proving device 2 and records the response to the information hold unit 289 (step 133 in FIG. 13). The first computation unit 283 calculates $R:=R^E$ mod n. The legitimacy verification unit 285 checks to see whether the result of the calculation by the first computation unit 283 matches the value C held in the authentication information hold unit 287 (step 134). A match indicates that the proving device 2 has a valid ticket. In that case, the outputting unit 2812 issues an output proving the validness of the ticket. A mismatch shows that the proving device 2 does not have a valid ticket, whereupon the outputting unit 2812 issues an output signifying the invalidness of the ticket.

The foregoing has been a description of the simple interaction example.

The interactive protocol of this example is summarized in Table 1 below.

TABLE 1

Verifier
Public information: (n, E)
Output: 'valid' or 'invalid'
C := rand
send (C, n)
receive R
R := $R^E$ mod n
if C = R
   output 'valid'
else
   output 'invalid'
Prover
if time < L
   R := $C^D$ mod n
else
   R := 1

2.3 First Interactive Protocol (for Commuter Pass Type Tickets, With a Clock Held by the Verification Device 3; see FIGS. 14, 19, 21)

Various interactions between the verification device 3 and the proving device 2 will be discussed below in succession. While the above-described constitutions of the devices remain unchanged, the procedures for verification and proving may be varied so as to implement tickets having different functions.

A first interactive protocol will now be described. With this protocol, the authentication information of the verification device 3 is not a simple random number. The condition for the proving device 2 to generate proof information is dependent on the relation between the received authentication information and the information L fixed upon issuance of each ticket.

For example, suppose that the verification device 3 has means for issuing time-of-day information to be embedded in authentication information and adopts information L signifying the period of validity. This makes it possible to implement time-limited type tickets without having the proving device 2 equipped with a clock function. The bit length of the information L is given as $\|L\|$.

The first interactive protocol applicable to the verification device 3 will be described below with reference to FIG. 14, and the same protocol in effect for the proving device 2 will be discussed by referring to FIG. 19.

The authentication information generation unit 286 in the verification device 3 generates a random number r (step 141 in FIG. 14). The number r and the time of day "time" are concatenated to generate a challenge C. The challenge value thus generated is recorded to the authentication information hold unit 287 (step 142). The combination of the number r with the "time" may be expressed illustratively as C:=r∥time.

The identifier n of the ticket to be verified which is held in the identifier hold unit 288 and the challenge C are sent in combination to the proving device 2 through the transmission unit 281 (step 143).

The flow of processing by the proving device 2 is the same as in the earlier simple example of interaction up to step 193. The reception unit 292 receives the data (C, n) from the verification device 3 and records what is received to the information hold unit 299 (step 191 in FIG. 19). The ticket retrieval unit 122 retrieves from the ticket hold unit 121 the ticket corresponding to the received identifier n, to see whether the ticket in question is being held (step 192). If the matching ticket is not found, a value 0 is set to the response R which is recorded to the information hold unit 299 (step 197). If the matching ticket is found to exist, then the ticket t, the procedure "$Prover_s$" of the proving device 2 and the ticket added information L are set (step 193).

After step 193 has been executed, step 194 is carried out. Detailed stages of step 194 according to the first interactive protocol are shown in FIG. 21. The "time" is first extracted from the challenge C (step 211). A predetermined length of low-order bitss may be extracted from the value C.

Illustratively, if the value C is a binary value and if the length of the "time" is expressed as $\|L\|$ bits, then the "time" may be extracted as $$\text{time}:=C \bmod 2^{\|L\|}.$$

After the "time" has been extracted in step 211, a check is made to see whether the ticket is valid at that point of time in comparison with the period of validity, a constraint described in the information L (step 212). The check is the same in nature as that of step 201 in the preceding simple example of interaction. If the check in step 212 reveals the ticket to be valid, the first computation unit 293 in the proving device 2 calculates $$R:=C^D \bmod n$$

as the response R and records the result of the calculation to the information hold unit 299 (step 213). If the check in step 212 reveals the ticket to be invalid, the ticket is deleted from the ticket hold unit 121 if necessary, sets a value in the response R signifying that the ticket has reached or exceeded the end of the period of validity (value 1 in this case), and records the response to the information holding unit 299 (step 214). The foregoing has been a description of the detailed stages constituting step 194 of the first interactive protocol.

After step 194 has been carried out, the ticket t, procedure "$Prover_s$" and ticket added information L which were set in step 193 are all released (step 195 in FIG. 19). With step 195 or 197 executed, the response R is transmitted by the transmission unit 291 to the verification device 3 (step 196).

The reception unit 282 in the verification device 3 receives the response R from the proving device 2 and records the received response to the information hold unit 289 (step 144 in FIG. 14). The first computation unit 283 calculates R:=$R^E$ mod n. The legitimacy verification unit 285 checks to see whether the result of the calculation by the first computation unit 283 matches the value C held in the authentication information hold unit 287 (step 145). A match reveals the proving device 2 to have a valid ticket. In that case, the outputting unit 2812 issues an output proving the validness of the ticket. A mismatch reveals the proving device 2 to have no valid ticket, whereupon the outputting unit 2812 issues an output signifying the invalidness the ticket.

The foregoing has been a description of the first interactive protocol. This protocol implements the same functions as those of the preceding simple example of interaction, with the proving device 2 having no clock function. The first interactive protocol may be adapted illustratively to toll tickets and commuter passes with a limited period of validity. That is, with the first interactive protocol in effect, a gate may be opened if the verification device issues a "valid" output on verifying a ticket; the gate is closed if the verification device issues an "invalid" output.

The first interactive protocol is summarized in Table 2 below.

TABLE 2

Verifier
Public information: (n, E)
Output: 'valid' or 'invalid'
C := rand || time
send (C, n)
receive R
R := $R^E$ mod n
if C = R
  output 'valid'
else
  output 'invalid'
Prover
if C mod $2^{||L||}$ < L
  R := $C^D$ mod n
else
  R := 1

Figure 15:
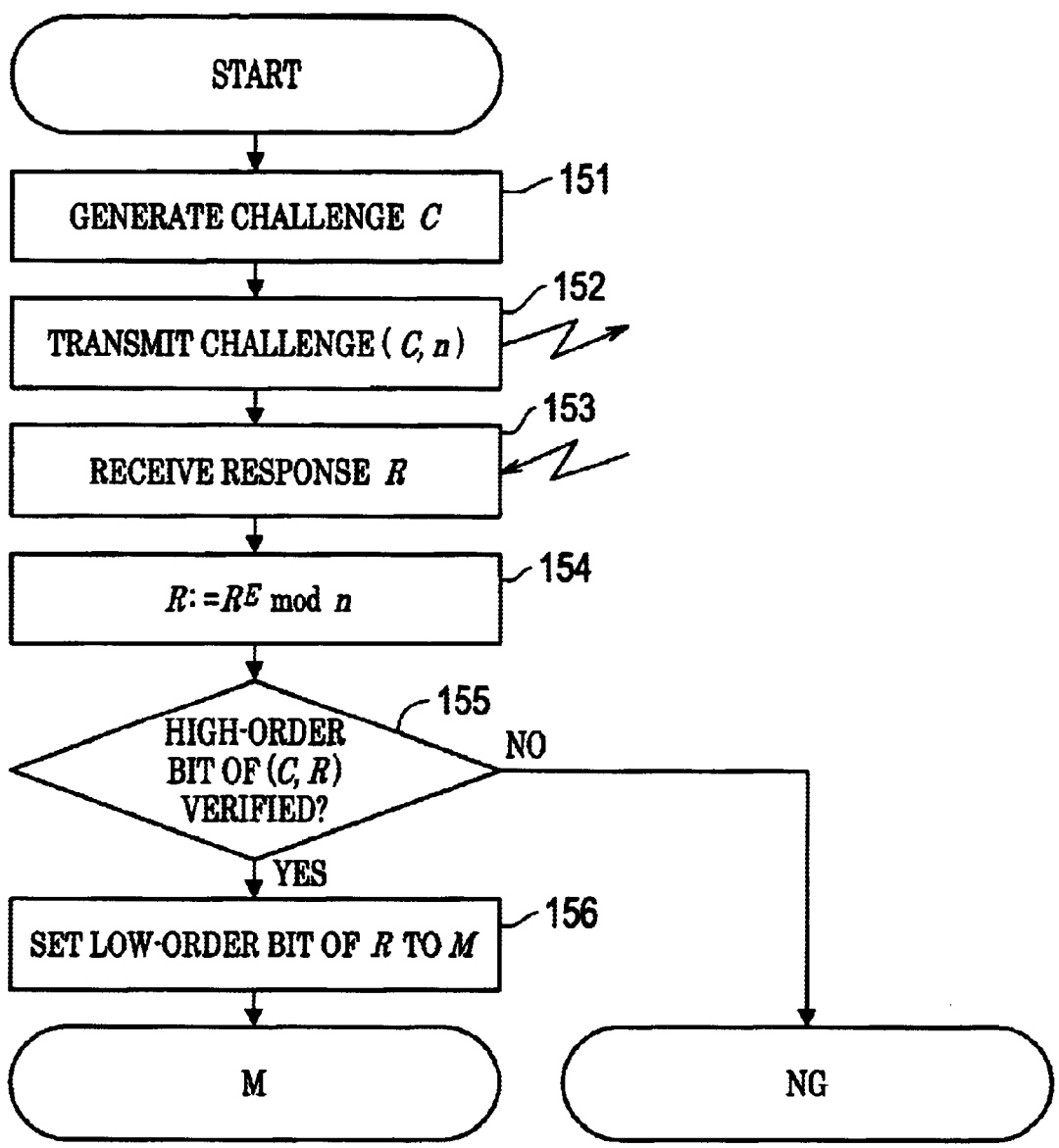
FIG. 15 is another flowchart of steps describing the ticket verifying procedure.
Figure 16:
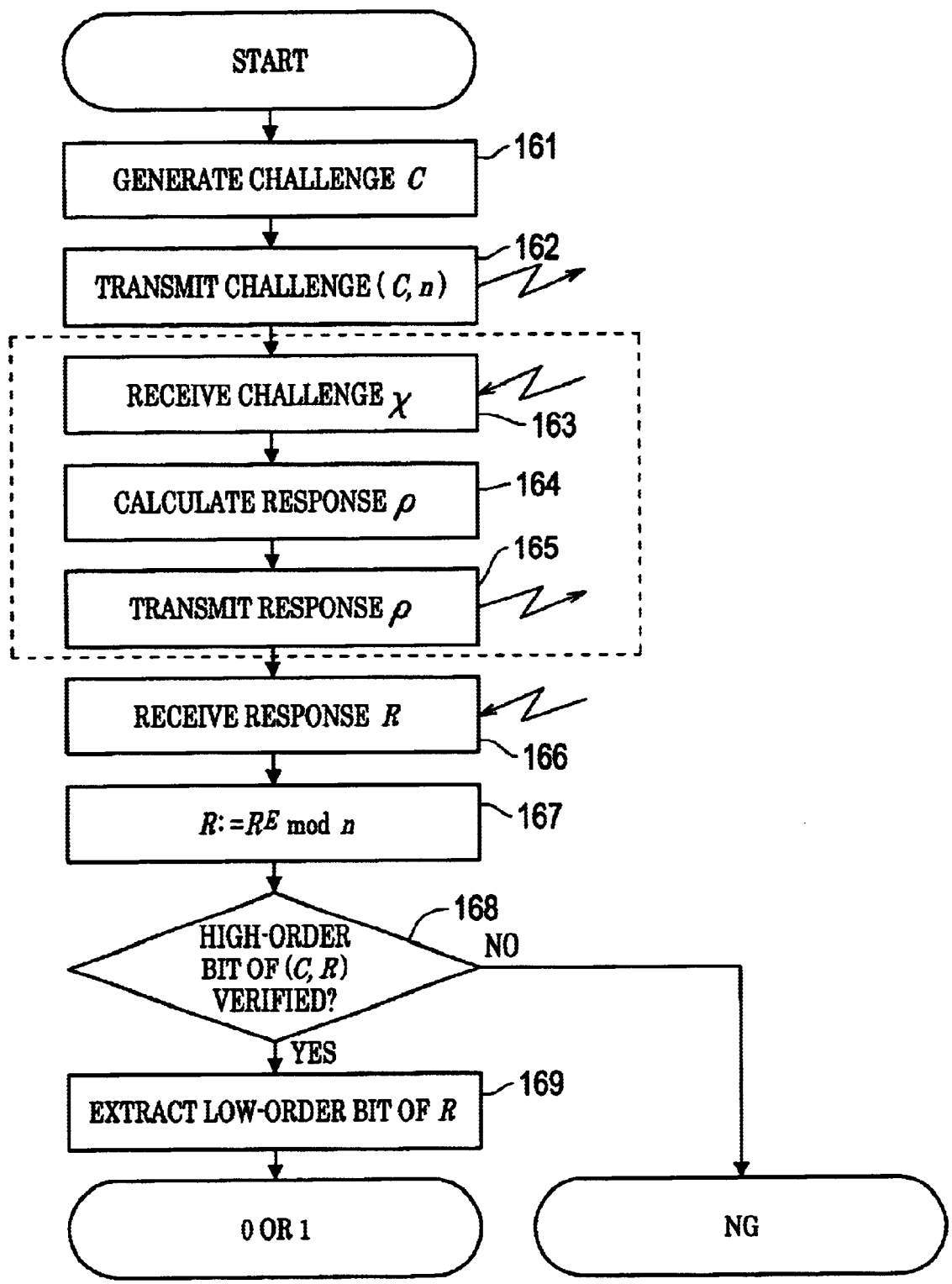
FIG. 16 is another flowchart of steps describing the ticket verifying procedure.
Figure 22:
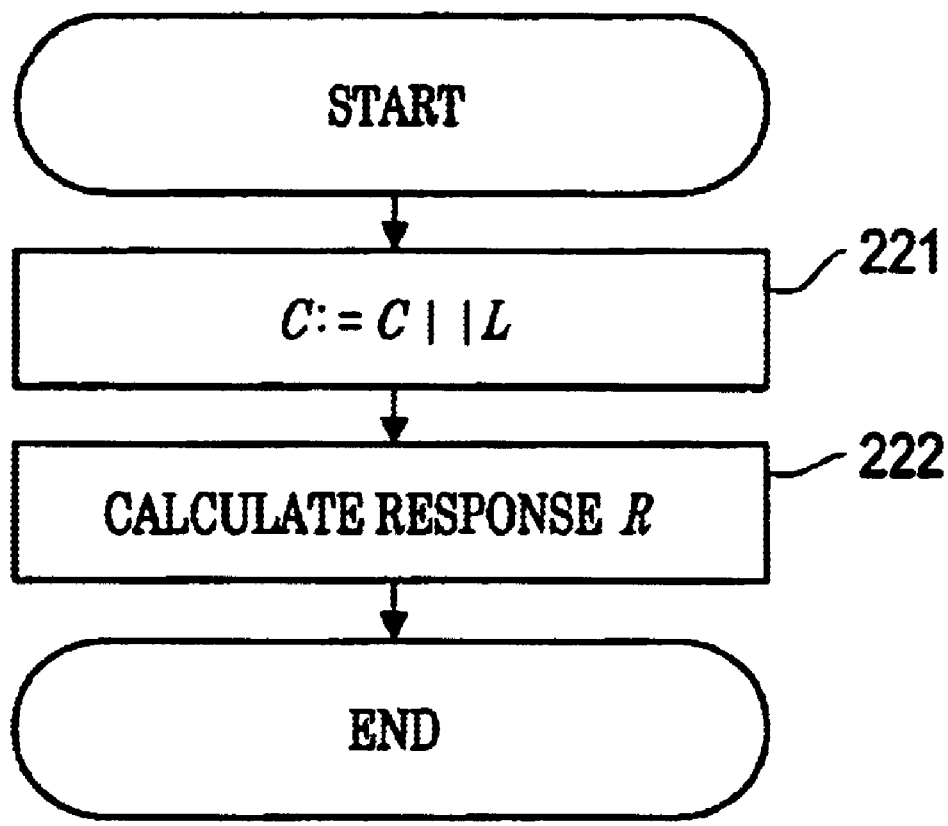
FIG. 22 is another flowchart of steps describing part of the ticket proving procedure.

2.4 Second Interactive Protocol (for Membership Card Type Tickets; see FIGS. 15, 19, 22)

A second interactive protocol is one under which proof information to be transmitted by the proving device 2 is obtained by supplementing authentication information with fixed information L linked at the time of issuing a ticket, the acquired information being coded on the basis of ticket characteristic information. During execution of the verifying procedure, a check is made to see whether the proof information corresponds to the authentication information, with the added information L extracted.

According to the second interactive protocol, a constant associated with the issuance of the ticket is transmitted from the proving device 2 to the verification device 3.

The second interactive protocol applicable to the verification device 3 will be described below with reference to FIG. 15, and the same protocol in effect for the proving device 2 will be discussed by referring to FIG. 19.

The authentication information generation unit 286 in the verification device 3 generates a challenge C and records it to the authentication information hold unit 287 (step 151 in FIG. 15). The identifier n of the ticket to be verified and the challenge C are combined and transmitted by the transmission unit 281 to the proving device 2 (step 152).

The flow of processing by the proving device 2 is the same as in the earlier simple example of interaction up to step 193. The reception unit 292 receives the data (C, n) from the verification device 3 and records what is received to the information hold unit 299 (step 191 in FIG. 19). The ticket retrieval unit 122 retrieves from the ticket hold unit 121 the ticket corresponding to the received identifier n, to see whether the ticket in question is being held (step 192). If the matching ticket is not found, a value 0 is set to the response R which is recorded to the information hold unit 299 (step 197). If the matching ticket is found to exist, then the ticket t, the procedure "Prover$_s$" of the proving device 2 and the ticket added information L are set (step 193).

With step 193 executed, step 194 is carried out next. Detailed stages of step 194 in the second interactive protocol will now be described with reference to FIG. 22. A message M extracted from the information L and destined for the verification device 3 is combined with the challenge C, and the combination is recorded to the information hold unit 299 (step 221 in FIG. 22). The challenge C and message M may be combined illustratively as $$C:=C||M.$$

Using the value C thus combined, the first computation unit 283 calculates $$R:=C^D \bmod n$$

and records the calculated value to the information hold unit 299 (step 222). The foregoing has been a description of the detailed stages constituting step 194 of the second interactive protocol.

After step 194 has been carried out, the ticket t, procedure Prover$_s$ and information L which were set in step 193 are released (step 195 in FIG. 19). With step 195 or 197 executed, the response R is transmitted from the transmission unit 291 to the verification device 3 (step 196).

The reception unit 282 in the verification unit 3 receives the response R from the proving device 2 and records the received response to the information hold unit 289 (step 153 in FIG. 15). The first computation unit 283 calculates R:=$R^E$ mod n (step 154). The legitimacy verification unit 285 checks to see whether the high-order bits of the calculated value R matches the value C held in the authentication information hold unit 287 (step 155). In case of a match, a message M is extracted from the low-order bits of the value R and is output from the outputting unit 2812. A mismatch shows that the proving device 2 does not have a valid ticket, whereupon the outputting unit 2812 issues an output signifying the invalidness of the ticket.

The foregoing has been a description of the second interactive protocol. This protocol allows the proving device 2 to prove that it has a valid ticket while simultaneously effecting transmission of a message to the verification device 3 so that falsifying attempts will be detected. For example, the second interactive protocol may be applied to membership cards, each card causing a membership number to be transmitted when checked while proving the membership simultaneously.

TABLE 3

Verifier
Public information: (n, E)
Output: M (= L) or 'invalid'
C := rand
send (C, n)
receive R
R := $R^E$ mod n
if R = C || M
  output M
else
  output 'invalid'
Prover
M := L
R := (C || M)$^D$ mod n 2.5 Third Interactive Protocol (for Coupon Type Tickets of Throwaway Type; see FIGS. 16, 19, 23)

According to a third interactive protocol, the proving device 2 retains a variable internal state with respect to a ticket. That internal state is updated by the verification device 3 at the time of ticket use. The verification device 3 capable of updating the internal state of the proving device has secret characteristic information proving its capability. The verification device 3 holding that characteristic information is called a privileged verification device 3.

In an interaction with a verification device 3 without the characteristic information, the proving device 2 can have the validity of its ticket verified without undergoing an internal state update.

Illustratively, the internal state of the proving device 2 is count information. It limits the number of interactions with the privileged verification device 3 without the latter grasping the interaction count of the 7 proving device.

Let $(\delta, v)$ be the characteristic information for ensuring the privilege of the verification device 3, and let $(\epsilon, v)$ be the public information corresponding to the characteristic information of the verification device 3, such that $\epsilon\delta \equiv 1 \bmod \lambda(v)$. Auxiliary information L of the ticket to be used includes the public information $(v, \epsilon)$ corresponding to the characteristic information of the verification device 3 and the upper limit value i of the counter, i.e., the internal state. The information L may be constituted illustratively as $L:=v\|\epsilon\|i$. If each of the different kinds of information has its specific length determined beforehand, each information may be extracted individually from the information L. The third interactive protocol applicable to the verification device 3 will be described below with reference to FIG. 16, and the same protocol in effect for the proving device 2 will be discussed by referring to FIG. 19.

The authentication information generation unit 286 in the verification device 3 generates a challenge C and records it to the authentication information hold unit 287 (step 161 in FIG. 16). The identifier n of the ticket to be verified and the challenge C are combined and transmitted by the transmission unit 281 to the proving device 2 (step 162).

The flow of processing by the proving device 2 is the same as in the earlier simple example of interaction up to step 193. The reception unit 292 in the proving device 2 receives the data (C, n) from the verification device 3 and records what is received to the information hold unit 299 (step 191 in FIG. 19). The ticket retrieval unit 122 retrieves from the ticket hold unit 121 the ticket corresponding to the received identifier n, to see whether the ticket in question is being held (step 192). If the matching ticket is not found, a value 0 is set to the response R which is recorded to the information hold unit 299 (step 197). If the matching ticket is found to exist, then the ticket t, the procedure "Prover$_s$" of the proving device 2 and the ticket added information L are set (step 193). Setting the procedure "Prover$_s$" allows i, v and $\epsilon$ to be extracted from the information L.

With step 193 executed, step 194 is carried out next. Detailed stages of step 194 in the third interactive protocol will now be described with reference to FIG. 23. The authentication information generation unit 296 generates a challenge $\chi$ and records it to the second authentication information hold unit 298 (step 231). The value $\chi$ may be generated in the same manner as the challenge C in the earlier simple example of interaction. The generated value $\chi$ is transmitted by the transmission unit 291 to the verification device 3 (step 232).

The reception unit 282 in the verification device 3 receives the challenge $\chi$ and records what is received to the information hold unit 289 (step 163 in FIG. 16). If the value 0 is received as the challenge $\chi$, that means the proving device 2 holds no valid ticket and has sent 0 as its response R. In that case, the outputting unit 2812 issues an output signifying the invalidity of the ticket, and the interactive protocol is terminated. The second computation unit 284 calculates (in step 164) a response $\rho$ as $$\rho\rho := \chi^\delta \bmod v \quad \text{[Expression 5]}$$

and transmits the calculated response $\rho$ to the proving device 2 through the transmission unit 281 (step 165).

In the proving device 2, the reception unit 292 receives the response $\rho$ and records what is received to the information hold unit 299 (step 233 in FIG. 23). The second computation unit 294 then calculates $$\rho := \rho^\epsilon \bmod v \quad \text{[Expression 6]}$$

A check is made to see whether the value $\rho$ matches the value $\chi$ recorded in the second authentication information hold unit 298 (step 234). In case of a mismatch, a value 1 is set to the message M which is recorded to the information hold unit 299 (step 239). If the two values match, then a value 0 is set to the message M which is recorded to the information hold unit 299 (step 235), and the value of a counter $i_n$ in the second internal state hold unit of the internal state hold unit 124 is incremented (step 236). After step 236 or 239 has been carried out, the value of the counter $i_n$ is compared with the upper limit value i acquired from the information L (step 237). If the check in step 237 reveals the value of the counter $i_n$ to be equal to or less than the value i, the first computation unit 293 calculates the response R as $R:=(C\|M)^D \bmod n$, and records the calculated response to the information hold unit 299 (step 238). If the check in step 237 reveals the counter value $i_n$ to be greater than the value i, then the storage area for the counter $i_n$ is released from the internal state hold unit 124 (step 2310), the ticket t is deleted from the ticket hold unit 121 (step 2311), and the response R is set to 1 which is recorded to the information hold unit 299 (step 2312). The foregoing has been a description of the detailed stages constituting step 194 of the third interactive protocol.

In the example described above, after the counter value $i_n$ was initialized to 0, that value is incremented upon every successful verification for comparison with the value i. Alternatively, the same function may be implemented by initializing $i_n$ to i and decrementing the counter value upon each successful verification to see whether a negative value is reached.

After the execution of step 194, the ticket t, Provers and information L which were set in step 193 are released (step 195 in FIG. 19). With step 195 or 197 carried out, the response R is transmitted from the transmission unit 291 to the verification device 3 (step 196).

In the verification device 3, the reception unit 282 receives the response R from the proving device 2 and records what is received to the information hold unit 289 (step 166 in FIG. 16). The first computation unit 283 then calculates $R:=R^E \bmod n$ (step 167). The legitimacy verification unit 285 checks to see whether the high-order bits of the calculated value R matches the value C held in the authentication information hold unit 287 (step 168). In case of a match, the message M is extracted from the low-order bits of the value R as the information received from the proving device 2 (step 169); the extracted message M is output from the outputting unit 2812. A mismatch shows that the proving device 2 does not have a valid ticket, whereupon the outputting unit 2812 issues an output signifying the invalidness of the ticket.

The foregoing has been a description of the third interactive protocol. According to this protocol, the privileged verification device 3 can verify tickets a predetermined number of times. The unprivileged verification device 3 can also verify the validity of the ticket by returning an appropriate value as the response $\rho$. Illustratively, coupon tickets may be implemented using the third interactive protocol when the service represented by each ticket is provided only if the verification device 3 outputs the value 0 and no other value.

TABLE 4

Verifier
Public information: (n, E)
Output: M ∈ {0 (valid: for privileged verification device),
1 (valid: for unprivileged verification device) }

TABLE 4-continued

```
or
    'invalid'
    Characteristic information for ensuring
privilege: (δ, v), such that εδ ≡ 1 mod λ(v)
    C := rand
    send (C, n)
    receive χ
    ρ := χ^δ mod v
    send ρ
    receive R
    R := R^E mod n
    if R = C || M
        output M
    else
        output 'invalid'
Prover
v || ε || i := L
χ := rand
send χ
receive ρ
ρ := ρ^ε mod v
if ρ = χ
    i_n := i_n + 1
    M := 0
else
    M := 1
    if i_n ≤ i
        R := (C || M)^D mod n
    else
        free i_n
        delete t
        R := 1
```

2.6 Fourth Interactive Protocol (for Coupon Type Tickets of Reusable Type; see FIGS. 16, 19, 24)

As with the third interactive protocol, a fourth interactive protocol implements a scheme that limits the number of times the response is generated. In addition, the fourth interactive protocol allows a privileged verifier to replenish an exhausted ticket use count.

According to the fourth interactive protocol, the verification device 3 informs the proving device 2 of the former's privileged status and transmits a single-bit instruction to the latter. The instruction causes the internal state of the proving device 2 to be selected from one of two updating alternatives: use count decrement and count replenishment.

A ticket, once issued by the ticket creating and issuing device, will eventually exhaust its valid use count but will regain its validness if the count is replenished through interaction with the privileged verifier. There is no need for the ticket creating and issuing device to issue a new ticket replacing the ticket already issued.

The characteristic information (δ, v) for ensuring the privilege of the verification device 3, the corresponding public information (ε, v), and the ticket auxiliary information L are the same as those for the third interactive protocol. The fourth interactive protocol applicable to the verification device 3 will be described below with reference to FIG. 16, and the same protocol in effect for the proving device 2 will be discussed by referring to FIG. 19. It is assumed that prior to the execution of the interactive protocol, the inputting unit 2813 of the verification device 3 has received information designating either decrement of the ticket use count or replenishment of the exhausted use count, the received information being recorded in the input information hold unit 2811.

The authentication information generation unit 286 in the verification device 3 generates a challenge C and records it to the authentication information hold unit 287 (step 161 in FIG. 16). The identifier n of the ticket to be verified and the challenge C are combined and transmitted by the transmission unit 281 to the proving device 2 (step 162).

The reception unit 292 in the proving device 2 receives the data (C, n) from the verification device 3 and records what is received to the information hold unit 299 (step 191 in FIG. 19). The ticket retrieval unit 122 retrieves from the ticket hold unit 121 the ticket corresponding to the received identifier n, to see whether the ticket in question is being held (step 192). If the matching ticket is not found, a value 0 is set to the response R which is recorded to the information hold unit 299 (step 197). If the matching ticket is found to exist, then the ticket t, the procedure "Prover$_s$" of the proving device 2 and the ticket added information L are set (step 193).

After step 193 has been executed, step 194 is carried out. Detailed stages of step 194 in the fourth interactive protocol will now be described with reference to FIG. 24. The authentication information generation unit 296 generates a challenge χ and records it to the second authentication information hold unit 298 (step 241). The generated value χ is transmitted by the transmission unit 291 to the verification device 3 (step 242).

The reception unit 282 in the verification device 3 receives the challenge χ and records what is received to the information hold unit 289 (step 163 in FIG. 16). If the value 0 is received as the challenge χ, that means the proving device 2 holds no valid ticket and has sent 0 as its response R. In that case, the outputting unit 2812 issues an output signifying the invalidness of the ticket, and the interactive protocol is terminated. Thereafter, the second computation unit 284 calculates (in step 164) a response ρ as $$\rho := \chi^\delta \bmod v \qquad \text{[Expression 7]}$$

If the ticket use count is desired to be replenished, the second computation unit 284 calculates the response ρ as $$\rho := \rho^\delta \bmod v \qquad \text{[Expression 8]}$$

The calculation of the response ρ in step 164 may alternatively be executed as $$\rho := \chi^{\delta\mu} \bmod v \qquad \text{[Expression 9]}$$

where, $\mu := 1$ if the ticket use count is to be decremented and $\mu := 2$ if the exhausted ticket use count is to be replenished. The calculated response ρ is transmitted to the proving device 2 through the transmission unit 281 (step 165).

In the proving device 2, the reception unit 292 receives the response ρ and records what is received to the information hold unit 299 (step 243 in FIG. 24). The second computation unit 294 then calculates $$\rho := \rho^\delta \bmod v \qquad \text{[Expression 10]}$$

A check is made to see whether the value ρ matches the value χ recorded in the second authentication information hold unit 298 (step 244). If the two values match in step 244, then a value 0 is set to the message M which is recorded to the information hold unit 299, and the value of the counter $i_n$ in the internal state hold unit 124 is incremented (step 245). In case of a mismatch in step 244, the second computation unit 294 calculates $$\rho := \rho^\epsilon \bmod v \qquad \text{[Expression 11]}$$

Another check is made to see whether the value ρ matches the value χ recorded in the second authentication information hold unit 298 (step 248). In case of a match in step 248, a value 0 is set to the message M which is recorded to the information hold unit 299, and the value of the counter $i_n$ in the second internal state hold unit of the internal state hold unit 124 is set to 0 (step 249). If the two values fail to match in step 248, a value 1 is set to the message M which is recorded to the information hold unit 299 (step 2411). After step 245, 249 or 2411 has been executed, the counter value $i_n$ is compared with the upper limit value i acquired from the information L (step 247). If the comparison in step 247 reveals the counter value $i_n$ to be equal to or less than the value i, the first computation unit 293 calculates R:=(C∥M)$^D$ mod n, and records the calculated value to the information hold unit 299 (step 248). If the comparison in step 247 reveals the counter value $i_n$ to be greater than the value i, the value R is set to 1 which is recorded to the information hold unit 299 (step 2410). The foregoing has been a description of the detailed stages constituting step 194 of the fourth interactive protocol.

After step 194 has been executed, the ticket t, Provers and information L which were set in step 193 are released (step 195 in FIG. 19). With step 195 or 197 carried out, the response R is transmitted from the transmission unit 291 to the verification device 3 (step 196).

In the verification device 3, the reception unit 282 receives the response R from the proving device 2 and records what is received to the information hold unit 289 (step 166 in FIG. 16). The first computation unit 283 then calculates R:=R$^E$ mod n (step 167). The legitimacy verification unit 285 checks to see whether the high-order bits of the calculated value R matches the value C held in the authentication information hold unit 287 (step 168). A match reveals the proving device 2 to have a valid ticket. In that case, the message M is extracted from the low-order bits of the value R as the information received from the proving device 2 (step 169); the extracted message M is output from the outputting unit 2812. A mismatch shows that the proving device 2 does not have a valid ticket, whereupon the outputting unit 2812 issues an output signifying the invalidness of the ticket.

The foregoing has been a description of the fourth interactive protocol. A modified protocol offering the same functions as those of the fourth interactive protocol may involve initializing the counter value $i_n$ to i, which is then decremented, not incremented, in step 245, the decremented result being checked in step 246 to see whether a negative value is reached. With this modification, the counter value $i_n$ is initialized to the value i in step 249, i.e., at the time of replenishing the exhausted use count. Another modification may involve adding the value i to the counter $i_n$ when the use count is replenished in step 249.

TABLE 5

Public information of verification device: (n, E)
Input: $\mu \in \{1$ (instruction for decrementing use count), 2 (instruction for replenishing use count)$\}$
Output: $M \in \{0$ (valid: for privileged verification device)
   1 (valid: for unprivileged verification device)
or
   'invalid'
Characteristic information for ensuring privilege: (δ, v)
C := rand
send (C, n)
receive χ
p := χ$^{δμ}$ mod v
send ρ
receive R
R := R$^E$ mod n
if R = C ∥ M TABLE 5-continued output M
else
   output 'invalid'
Prover
v ∥ ε ∥ i := L
χ := rand
send χ
receive ρ
ρ := ρ$^ε$ mod v
if ρ = χ
   $i_n$ := $i_n$ + 1
   M := 0
else
   ρ := ρ$^ε$ mod v
if ρ = χ
   $i_n$ := 0
   M := 0
else
   M := 1
if $i_n$ ≤ i
   R := (C ∥ M)$^D$ mod n
else
   R := 1

Figure 17:
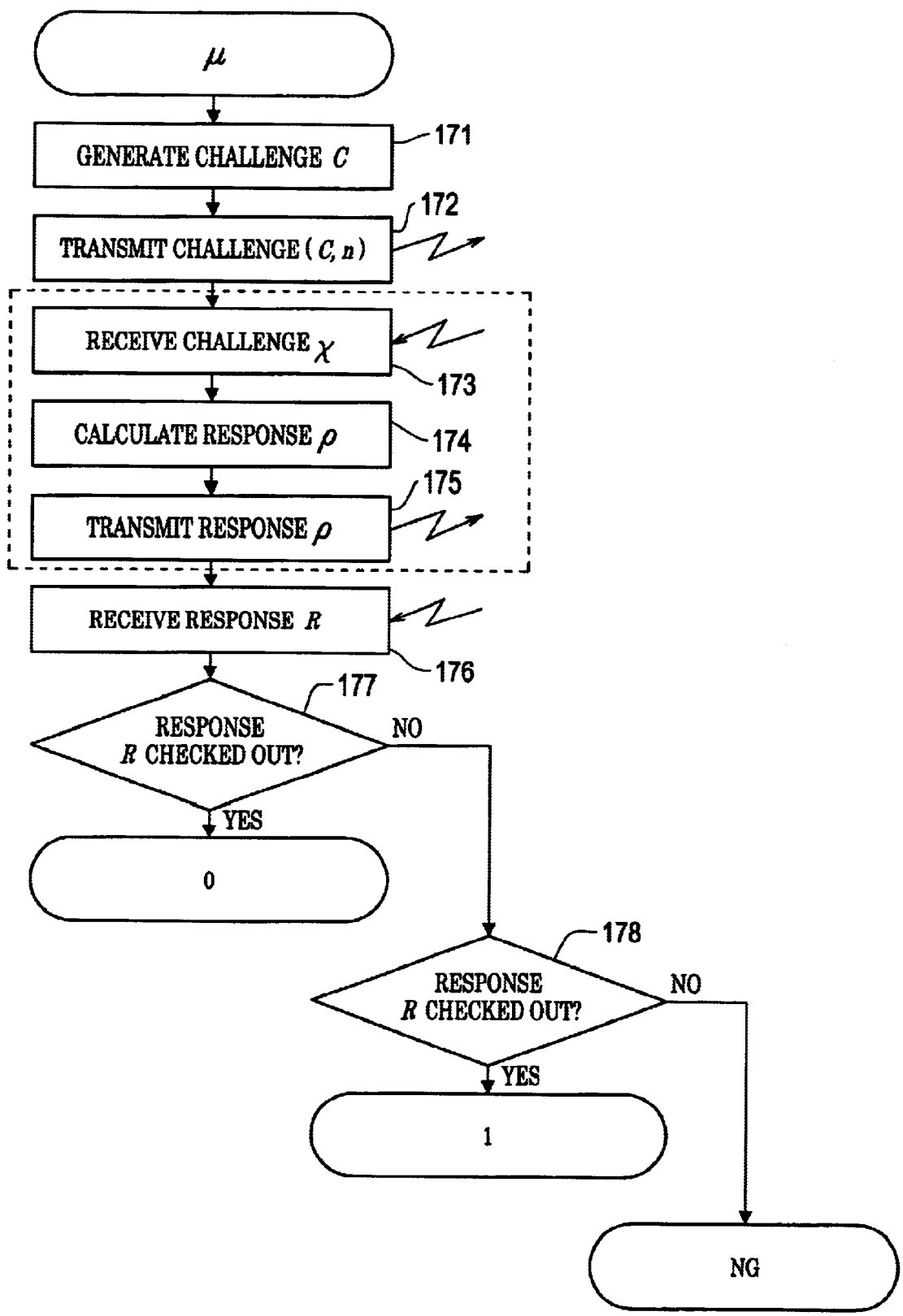
FIG. 17 is another flowchart of steps describing the ticket verifying procedure.
Figure 25:
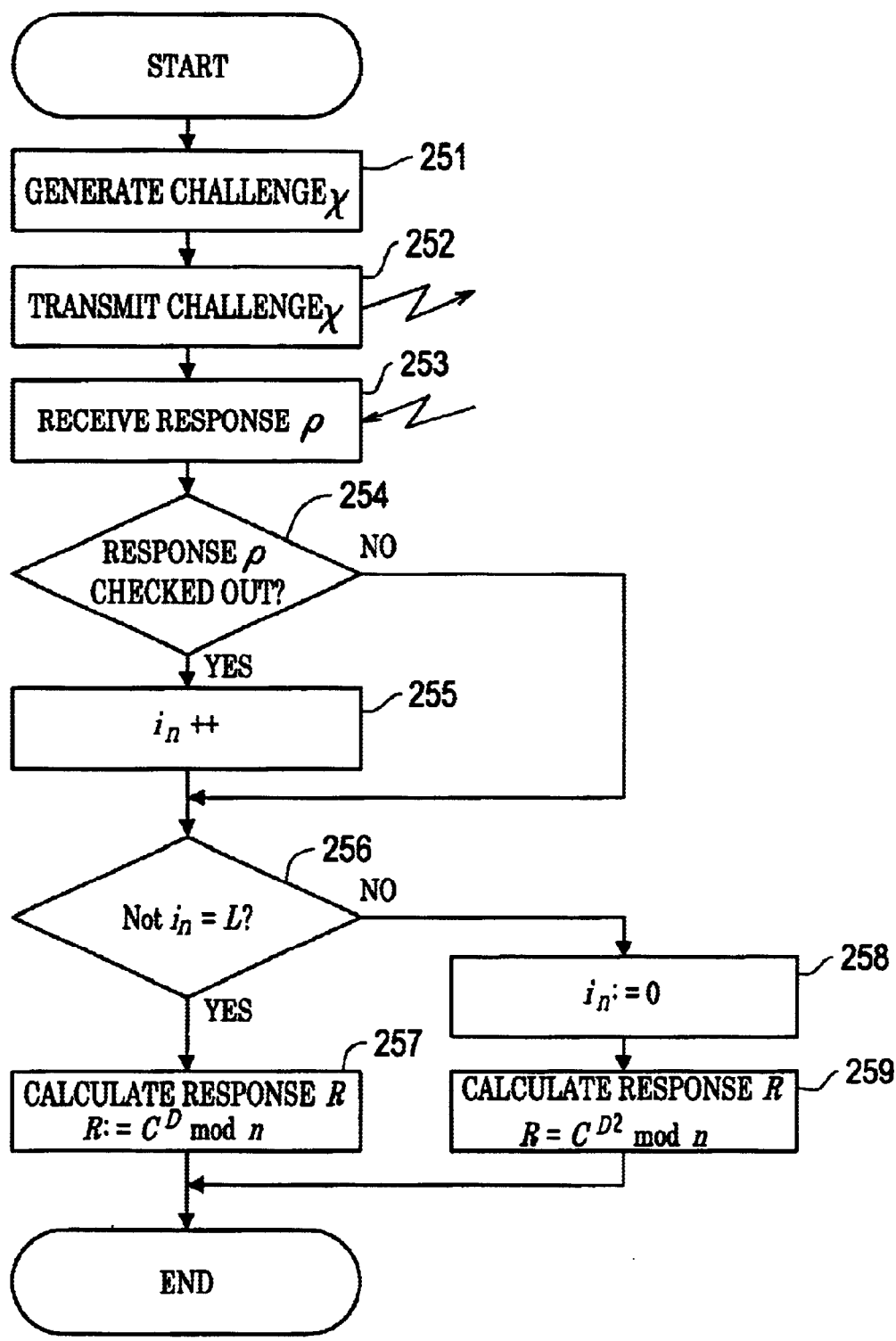
FIG. 25 is another flowchart of steps describing part of the ticket proving procedure.

2.7 Fifth Interactive Protocol (for Stamp Collecting Card Type Tickets; see FIGS. 17, 19, 25)

A fifth interactive protocol implements a scheme under which every time the number of responses generated for a privileged verifier has reached a predetermined count assigned to a ticket at the time of its issuance, the privileged verification unit is informed thereof.

In addition, the fifth interactive protocol allows the unprivileged verifier to ascertain the validness of tickets.

The characteristic information (δ, v) for ensuring the privilege of the verification device 3, the corresponding public information (ε, v), and the ticket auxiliary information L are the same as those for the third interactive protocol. It should be noted that the value i included in the information L signifies the predetermined count which, when reached, triggers a notice to the privileged verifier. The fifth interactive protocol applicable to the verification device 3 will be described below with reference to FIG. 17, and the same protocol in effect for the proving device 2 will be discussed by referring to FIG. 19.

The authentication information generation unit 286 in the verification device 3 generates a challenge C and records it to the authentication information hold unit 287 (step 171 in FIG. 17). The identifier n of the ticket to be verified and the challenge C are combined and transmitted by the transmission unit 281 to the proving device 2 (step 172).

The reception unit 292 in the proving device 2 receives the data (C, n) from the verification device 3 and records what is received to the information hold unit 299 (step 191 in FIG. 19). The ticket retrieval unit 122 retrieves from the ticket hold unit 121 the ticket corresponding to the received identifier n, to see whether the ticket in question is being held (step 192). If the matching ticket is not found, a value 0 is set to the response R which is recorded to the information hold unit 299 (step 197). If the matching ticket is found to exist, then the ticket t, the procedure "Prover$_s$" of the proving device 2 and the ticket added information L are set (step 193).

After step 193 has been executed, step 194 is carried out. Detailed stages of step 194 in the fifth interactive protocol are shown in FIG. 25. The authentication information generation unit 296 generates a challenge χ and records it to the second authentication information hold unit 298 (step 251). The generated value χ is transmitted by the transmission unit 291 to the verification device 3 (step 252).

The reception unit 282 in the verification device 3 receives the challenge χ and records what is received to the information hold unit 289 (step 173 in FIG. 17). If the value 0 is received as the challenge χ, that means the proving device 2 holds no valid ticket and has sent 0 as its response R. In that case, the outputting unit 2812 issues an output signifying the invalidness of the ticket, and the interactive protocol is terminated. The second computation unit 284 calculates (in step 174 in FIG. 17) a response ρ as $$\rho := \chi^\delta \bmod v \quad \text{[Expression 12]}$$

The transmission unit 281 transmits the calculated response ρ to the proving device 2 (step 175).

The reception unit 292 in the proving device 2 receives the response ρ and records what is received to the information hold unit 299 (step 253 in FIG. 25). The second computation unit 294 then calculates the response ρ as $$\rho := \rho^\epsilon \bmod v \quad \text{[Expression 13]}$$

A check is made to see whether the value ρ matches the value χ recorded in the second authentication information hold unit 298 (step 254). If the two values match in step 254, the value of the counter $i_n$ in the second internal state hold unit of the internal state hold unit 124 is incremented (step 255). If the values fail to match in step 254 or if step 255 is executed, the counter value $i_n$ in the internal state hold unit 124 is compared with the upper limit value i acquired from the information L (step 256). If the comparison in step 256 reveals the counter value $i_n$ to be unequal to the value i, the first computation unit 293 calculates R:=$C^D$ mod n, and records the calculated value to the information hold unit 299 (step 257). If the comparison in step 256 reveals the counter value $i_n$ to be equal to the value i, the counter value $i_n$ is set to 1 (step 258). The first computation unit 293 calculates the response R as $$R := C\hat{}D \bmod n \quad \text{[Expression 14]}$$

($C\hat{}D^2$ denotes C to the power of $D^2$) and the calculated value is recorded to the information hold unit 299 (step 2510). The foregoing has been a description of the detailed stages constituting step 194 of the fifth interactive protocol.

After step 194 has been executed, the ticket t, $Prover_s$ and information L which were set in step 193 are released (step 195 in FIG. 19). With step 195 or 197 carried out, the response R is transmitted from the transmission unit 291 to the verification device 3 (step 196).

In the verification device 3, the reception unit 282 receives the response R from the proving device and records what is received to the information hold unit 289 (step 176 in FIG. 17). The first computation unit 283 then calculates R:=$R^E$ mod n, and records the result of the calculation to the information hold unit 299. The legitimacy verification unit 285 checks to see whether the calculated value R matches the value C held in the authentication information hold unit 287 (step 177). In case of a match, a value 0 is output from the outputting unit 2812. If the values fail to match, the first computation unit 283 further calculates R:=$R^E$ mod n, and records the result of the calculation to the information hold unit 299. The legitimacy verification unit 285 checks to see whether the calculated value R matches the value C held in the authentication information hold unit 287 (step 178). A match detected in step 178 reveals the ticket of the proving device 2 to have reached the predetermined use count. In that case, a value 1 is output from the outputting unit 2812. In case of a mismatch in step 178, the outputting unit 2812 issues an output signifying the invalidness of the ticket.

The foregoing has been a description of the fifth interactive protocol. This protocol may be applied illustratively to a point-accumulating card scheme wherein a customer having used his/her card a certain number of times is awarded a prize.

TABLE 6

Verifier
Public information: (n, E)
Output: M ∈ {1(valid), 2(generated response count having reached a predetermined count i)} or 'invalid'
Characteristic information for ensuring privilege: (δ, v)
C := rand
send (C, n)
receive x
ρ := $x^\delta$ mod v
send ρ
receive R
R := $R^E$ mod n
if C = R
    output 1
else
    R := $R^E$ mod n
    if C = R
        output 2
    else
        output 'invalid'
Prover
v‖ε‖i := L
x := rand
send x
receive ρ
ρ := $\rho^\epsilon$ mod v
if ρ = x
    $i_n$ := $i_n$ + 1
else
if $i_n$ = i
    R := $C\hat{}D^2$ mod n
    $i_n$ := 0
else
    R := $C^D$ mod n 2.8 Sixth Interactive Protocol (for Prepaid Card Type Tickets of Throwaway Type; see FIGS. 18, 19, 26)

A sixth interactive protocol according to the present invention allows a privileged verifier to decrement by a value that the verifier designates a use count held in a storage area associated with each ticket. When an updated internal state has exceeded a count limit determined at the time of ticket issuance, the verification device 3 is notified thereof.

The sixth interactive protocol also allows an unprivileged verifier to verify the validity of the ticket and to transmit the count value held in the storage area.

With the sixth interactive protocol in use, the verification device 3 transmits variable instruction information to the proving device 2. In turn, the proving device 2 sends to the verification device 3 variable state information corresponding to the ticket held in the device 2.

The characteristic information (δ, v) for ensuring the privilege of the verification device 3, the corresponding public information (ε, v), and the ticket auxiliary information L are the same as those for the third interactive protocol. It should be noted that the value i need not be included in the information L. The sixth interactive protocol applicable to the verification device 3 will be described below with reference to FIG. 18, and the same protocol in effect for the proving device 2 will be discussed by referring to FIG. 19.

The authentication information generation unit 286 in the verification device 3 generates a challenge C and records it to the authentication information hold unit 287 (step 181 in FIG. 18). The identifier n of the ticket to be verified and the challenge C are combined and transmitted by the transmission unit 281 to the proving device 2 (step 182).

The reception unit 292 in the proving device 2 receives the data (C, n) from the verification device 3 and records what is received to the information hold unit 299 (step 191 in FIG. 19). The ticket retrieval unit 122 retrieves from the ticket hold unit 121 the ticket corresponding to the received identifier n, to see whether the ticket in question is being held (step 192). If the matching ticket is not found, a value 0 is set to the response R which is recorded to the information hold unit 299 (step 197). If the matching ticket is found to exist, then the ticket t, the procedure "Prover$_s$" of the proving device 2 and the ticket added information L are set (step 193).

After the execution of step 193, step 194 is carried out. Detailed stages of step 194 in the sixth interactive protocol are shown in FIG. 26. The authentication information generation unit 296 generates a challenge $\chi$ and records it to the second authentication information hold unit 298 (step 261). The generated value $\chi$ is transmitted by the transmission unit 291 to the verification device 3 (step 262).

The reception unit 282 in the verification device 3 receives the challenge $\chi$ and records what is received to the information hold unit 289 (step 183 in FIG. 18). If the value 0 is received as the challenge $\chi$, that means the proving device 2 holds no valid ticket and has sent 0 as its response R. In that case, the outputting unit 2812 issues an output signifying the invalidity of the ticket, and the interactive protocol is terminated. Using a message $\mu$ that was input from the inputting unit 2813 and recorded beforehand in the input information hold unit 2811, the second computation unit 284 calculates (in step 184) a response $\rho$ as $$\rho:=(\chi\|\mu)^\delta \bmod v \qquad \text{[Expression 15]}$$

The calculated response $\rho$ is transmitted from the transmission unit 281 to the proving device 2 (step 185).

The reception unit 292 in the proving device 2 receives the response $\rho$ and records what is received to the information hold unit 299 (step 263 in FIG. 26). The second computation unit 294 calculates $$\rho:=\rho^\epsilon \bmod v \qquad \text{[Expression 16]}$$

and records the result of the calculation to the information hold unit 299 (step 264). A check is made to see whether the high-order bits of the calculated value $\rho$ matches the value $\chi$ held in the second authentication information hold unit 298 (step 265). In case of a mismatch in step 265, the value of the counter $i_n$ allocated in the internal state hold unit 124 is used to set a message of M:=1$\|i_n$, and the message is recorded to the information hold unit 299 (step 2613). If the values match in step 265, the value $\mu$ is extracted from the low-order bits of the value $\rho$, and the value $i_n$ is decremented as $i_n:=i_n-\mu$ (step 265). Then a message of M:=0$\|i_n$ is set and recorded to the information hold unit 299 (step 267). A check is made to see whether the value $i_n$ is less than 0 (step 268). If the value $i_n$ is found to be less than 0, the value $i_n$ is released from the internal state hold unit 124 (step 2611), and the ticket t is deleted from the ticket hold unit 121 (step 2612). In any case, the first computation unit 293 calculates R:=(C$\|$M)$^D$ mod n, and records the calculated value to the information hold unit 299 (step 269). The foregoing has been a description of the detailed stages constituting step 194 of the sixth interactive protocol.

After the execution of step 194, the ticket t, Prover$_s$ and information L which were set in step 193 are released (step 195 in FIG. 19). With step 195 or 197 carried out, the response R is transmitted from the transmission unit 291 to the verification device 3 (step 196).

In the verification device 3, the reception unit 282 receives the response R from the proving device 2 and records what is received to the information hold unit 289 (step 186 in FIG. 18). The first computation unit 283 calculates R:=R$^E$ mod n, and records the result of the calculation to the information hold unit 299 (step 187). The legitimacy verification unit 285 checks to see whether the high-order bits of the calculated value R matches the value C held in the authentication information hold unit 287 (step 188). In case of a match, the message M is extracted from the low-order bits of the value M (step 189); the extracted message is output from the outputting unit 2812. If the values fail to match, the outputting unit 2812 issues an output signifying the invalidness of the ticket.

The foregoing has been a description of the sixth interactive protocol. When the output of the proving device 3 is other than that which signifies the invalidness of the ticket, the high-order bits of the output is used to ascertain the decrement of the counter or the absence of such decrement, and the low-order bits of the output is used to verify the value of the counter value $i_n$. The unprivileged verification device 3 may check the counter value without varying it by transmitting an appropriate value (e.g., 1) as the response $\rho$. Illustratively, the counter $i_n$ is set to a predetermined value upon initialization of the ticket. Every time a service is utilized, a consideration for the service rendered is deducted from the counter under the sixth interactive protocol, whereby the prepaid card scheme is implemented.

TABLE 7

Verifier
Public information: (n, E)
Input: $\mu$(decrement count)
Output: M or 'invalid'
Characteristic information for ensuring
privilege: ($\delta$, v)
   C := rand
   send (C, n)
   receive x
   $\rho := (x\|\mu)^\delta \bmod v$
   send $\rho$
   receive R
   R := R$^E$ mod n
   if R = C$\|$M
      output M
   else
      output 'invalid'
Prover
   x := rand
   send x
   receive $\rho$
   $\rho := \rho^\epsilon \bmod v$
   if $\rho = x\|\mu$
      $i_n := i_n - \mu$
      M := 0 in
      if $i_n < 0$
         free $i_n$
         delete t
   else
      M := 1$\|i_n$
   R := (C$\|$M)$^D$ mod n 2.9 Seventh Interactive Protocol (for Prepaid Card Type Tickets of Reusable Type; See FIGS. 18, 19, 27)

A seventh interactive protocol according to the present invention is a modification of the sixth interactive protocol. This modified protocol allows the privileged verification unit to designate a value held in a storage area associated with a ticket and to increment or decrement the designated value.

As with the sixth interactive protocol, the seventh interactive protocol allows an unprivileged verifier to verify the validity of the ticket and the internal state corresponding to the ticket.

With the seventh interactive protocol in use, the verification device 3 transmits variable instruction information to the proving device 2. In turn, the proving device 2 sends to the verification device 3 variable state information corresponding to the ticket held in the device 2.

The characteristic information ($\delta$, v) for ensuring the privilege of the verification device 3, the corresponding public information ($\epsilon$, v), and the ticket auxiliary information L are the same as those for the sixth interactive protocol. The seventh interactive protocol applicable to the verification device 3 will be described below with reference to FIG. 18, and the same protocol in effect for the proving device 2 will be discussed by referring to FIG. 19.

The authentication information generation unit 286 in the verification device 3 generates a challenge C and records it to the authentication information hold unit 287 (step 181 in FIG. 18). The identifier n of the ticket to be verified and the challenge C are combined and transmitted by the transmission unit 281 to the proving device 2 (step 182).

The reception unit 292 in the proving device 2 receives the data (C, n) from the verification device 3 and records what is received to the information hold unit 299 (step 191 in FIG. 19). The ticket retrieval unit 122 retrieves from the ticket hold unit 121 the ticket corresponding to the received identifier n, to see whether the ticket in question is being held (step 192). If the matching ticket is not found, a value 0 is set to the response R which is recorded to the information hold unit 299 (step 197). If the matching ticket is found to exist, then the ticket t, the procedure "Prover$_s$" of the proving device 2 and the ticket added information L are set (step 193).

After the execution of step 193, step 194 is carried out. Detailed stages of step 194 in the seventh interactive protocol will now be described with reference to FIG. 27. The authentication information generation unit 296 generates a challenge $\chi$ and records it to the second authentication information hold unit 298 (step 271). The generated value $\chi$ is transmitted by the transmission unit 291 to the verification device 3 (step 272).

The reception unit 282 in the verification device 3 receives the challenge $\chi$ and records what is received to the information hold unit 289 (step 183 in FIG. 18). If the value 0 is received as the challenge $\chi$, that means the proving device 2 holds no valid ticket and has sent 0 as its response R. In that case, the outputting unit 2812 issues an output signifying the invalidity of the ticket, and the interactive protocol is terminated. Using a message $\mu$ that was input from the inputting unit 2813 and recorded beforehand in the input information hold unit 2811, the second computation unit 284 calculates (in step 184) a response $\rho$ as $$\rho(\chi\|\mu)^\delta \bmod v \qquad \text{[Expression 17]}$$

The calculated response $\rho$ is transmitted from the transmission unit 281 to the proving device 2 (step 185).

The reception unit 292 in the proving device 2 receives the response $\rho$ and records what is received to the information hold unit 299 (step 273 in FIG. 27). The second computation unit 294 calculates $$\rho := \rho^\epsilon \bmod v \qquad \text{[Expression 18]}$$

and records the result of the calculation to the information hold unit 299 (step 274). A check is made to see whether the high-order bits of the calculated value $\rho$ matches the value $\chi$ held in the second authentication information hold unit 298 (step 275). In case of a mismatch in step 275, the value of the counter $i_n$ allocated in the second internal state hold unit of the internal state hold unit 124 is used to set a message of M:=1$\|i_n$, and the message is recorded to the information hold unit 299 (step 2712). If the values match in step 275, the value $\mu$ is extracted from the low-order bits of the value $\rho$, and the value $i_n$ is decremented as $i_n:=i_n-\mu$ (step 275). Then a message of M:=0$\|i_n$ is set and recorded to the information hold unit 299 (step 277). A check is made to see whether the value $i_n$ is less than 0 (step 278). If the value $i_n$ is found to be less than 0, the value $i_n$ is set to 0 (step 2711). In any case, the first computation unit 293 calculates R:= $(C\|M)^D \bmod n$, and records the result of the calculation to the information hold unit 299 (step 279). The foregoing has been a description of the detailed stages constituting step 194 of the seventh interactive protocol.

After the execution of step 194, the ticket t, Provers and information L which were set in step 193 are released (step 195 in FIG. 19). With step 195 or 197 carried out, the response R is transmitted from the transmission unit 291 to the verification device 3 (step 196).

In the verification device 3, the reception unit 282 receives the response R from the proving device 2 and records what is received to the information hold unit 289 (step 186 in FIG. 18). The first computation unit 283 calculates R:=$R^E \bmod n$, and records the result of the calculation to the information hold unit 299 (step 187). The legitimacy verification unit 285 checks to see whether the high-order bits of the calculated value R matches the value C held in the authentication information hold unit 287 (step 188). In case of a match, the message M is extracted from the low-order bits of the value R (step 189); the extracted message is output from the outputting unit 2812. If the values fail to match, the outputting unit 2812 issues an output signifying the invalidness of the ticket.

The foregoing has been a description of the seventh interactive protocol.

TABLE 8

Verifier
Public information: (n, E)
Input: $\mu$
Output: M or 'invalid'
Characteristic information for ensuring
privilege: ($\delta$, v)
C := rand
send (C, n)
receive $\chi$
$\rho := (\chi\|\mu)^\delta \bmod v$
send $\rho$
receive R
R := $R^E \bmod n$
if R = C $\|$ M
    output M
else
    output 'invalid'
Prover
v$\|\epsilon$ := L
x := rand
send $\chi$
receive $\rho$
$\rho := \rho^\epsilon \bmod v$
if $\rho = \chi\|\mu$
    $i_n := i_n - \mu$
    M := 0$\|i_n$
    if $i_n < 0$
        $i_n := 0$
else
    M := 1$\|i_n$
R := $(C\|M)^D \bmod n$

2.10 Eighth Interactive Protocol (for Coupon Type Tickets to be Invalidated or Reimbursed; See FIGS. 16, 19, 24)

According to an eighth interactive protocol of the present invention, a flag representing the validness or invalidness of the ticket is arranged to correspond to the internal state of the proving device 2. The protocol enables the privileged verifier to invalidate the ticket using the flag.

The characteristic information ($\delta$, $v$) for ensuring the privilege of the verification device 3, the corresponding public information ($\epsilon$, $v$), and the ticket auxiliary information L are the same as those for the third interactive protocol. The eighth interactive protocol applicable to the verification device 3 will be described below with reference to FIG. 16, and the same protocol in effect for the proving device 2 will be discussed by referring to FIG. 19. It is assumed that prior to the execution of the interactive protocol, the inputting unit 2813 of the verification device 3 receives information designating the performance of either verification of a ticket or its invalidation, the received information being recorded in the input information hold unit 2811.

The authentication information generation unit 286 in the verification device 3 generates a challenge C and records it to the authentication information hold unit 287 (step 161 in FIG. 16). The identifier n of the ticket to be verified and the challenge C are combined and transmitted by the transmission unit 281 to the proving device 2 (step 162).

The reception unit 292 in the proving device 2 receives the data (C, n) from the verification device 3 and records what is received to the information hold unit 299 (step 191 in FIG. 19). The ticket retrieval unit 122 retrieves from the ticket hold unit 121 the ticket corresponding to the received identifier n, to see whether the ticket in question is being held (step 192). If the matching ticket is not found, a value 0 is set to the response R which is recorded to the information hold unit 299 (step 197). If the matching ticket is found to exist, then the ticket t, the procedure "Prover$_s$" of the proving device 2 and the ticket added information L are set (step 193).

After step 193 has been executed, step 194 is carried out. Detailed stages of step 194 in the eighth interactive protocol will now be described with reference to FIG. 24. The authentication information generation unit 296 generates a challenge $\chi$ and records it to the second authentication information hold unit 298 (step 241). The generated value $\chi$ is transmitted by the transmission unit 291 to the verification device 3 (step 242).

The reception unit 282 in the verification device 3 receives the challenge $\chi$ and records what is received to the information hold unit 289 (step 163 in FIG. 16). If the value 0 is received as the challenge $\chi$, that means the proving device 2 holds no valid ticket and has sent 0 as its response R. In that case, the outputting unit 2812 issues an output signifying the invalidness of the ticket, and the interactive protocol is terminated. It is determined in advance that $\mu:=1$ for normal verification and $\mu:=2$ for ticket invalidation, the value $\mu$ being input through the inputting unit 2813 and recorded in the input information hold unit 2811. The second computation unit 284 calculates (in step 164) a response $\rho$ as $$\rho := \chi^{\delta^\mu} \bmod v \qquad \text{[Expression 19]}$$

The calculated response $\rho$ is transmitted from the transmission unit 281 to the proving device 2 (step 165).

The reception unit 292 in the proving device 2 receives the response $\rho$ and records what is received to the information hold unit 299 (step 243 in FIG. 24). The second computation unit 294 calculates $$\rho := \rho^\epsilon \bmod v \qquad \text{[Expression 20]}$$

A check is made to see whether the calculated value $\rho$ matches the value $\chi$ held in the second authentication information hold unit 298 (step 244). In case of a match in step 244, step 245 is reached but replaced by an operation wherein a value 0 is set to the message M which is recorded to the information hold unit 299. If the values fail to match in step 244, the second computation unit 294 calculates $$\rho := \rho^\epsilon \bmod v \qquad \text{[Expression 21]}$$

A check is made to see whether the calculated value $\rho$ matches the value $\chi$ held in the second authentication information hold unit 298 (step 248). In case of a match in step 248, step 249 is reached but replaced by an operation wherein the value of the counter $i_n$ allocated in the second internal state hold unit of the internal state hold unit 124 is set to a value other than 0 (e.g., 1). If the values fail to match in step 248, a value 1 is set to the message M which is recorded to the information hold unit 299 (step 2411). In any case, step 247 is replaced by a check to see whether the counter value $i_n$ is 0. If the value $i_n$ is found to be 0, the first computation unit 293 calculates $R := (C\|M)^D \bmod n$, and records the result of the calculation to the information hold unit 299 (step 248). If the value $i_n$ is other than 0, the value R is set to 1 which is recorded to the information hold unit 299 (step 2410). The foregoing has been a description of the detailed stages constituting step 194 of the eighth interactive protocol.

After the execution of step 194, the ticket t, Provers and information L which were set in step 193 are released (step 195 in FIG. 19). With step 195 or 197 carried out, the response R is transmitted from the transmission unit 291 to the verification device 3 (step 196).

In the verification device 3, the reception unit 282 receives the response R from the proving device 2 and records what is received to the information hold unit 289 (step 166 in FIG. 16). The first computation unit 283 calculates $R := R^E \bmod n$ (step 167) The legitimacy verification unit 285 checks to see whether the high-order bits of the calculated value R matches the value C held in the authentication information hold unit 287 (step 168). A match reveals the proving device 2 to have a valid ticket. In that case, the message M is extracted from the low-order bits of the value R as the information received from the proving device 2 (step 169); the extracted message is output from the outputting unit 2812. If the values fail to match, that means either the ticket is invalidated by current interaction or that the proving device 2 has failed to prove the possession of a valid ticket. In this case, the outputting unit 2812 issues an output signifying the invalidness of the ticket.

The foregoing has been a description of the eighth interactive protocol. If the value of the counter $i_n$ is set to 1, the response cannot be transmitted by use of the value D and thus the ticket is invalidated. The eighth interactive protocol may be applied illustratively where tickets are invalidated after they have been used once or where tickets need to be invalidated upon their reimbursement.

TABLE 9

Verifier
Public information: (n, E)
Input: $\mu$(1: normal, 2: ticket invalidation)
Output: M or 'invalid'
Characteristic information for ensuring privilege: (v, $\delta$)

TABLE 9-continued

```
C := rand
send (C, n)
receive x
ρ := x^δ^μ mod v
send ρ
receive R
R := R^E mod n
if R = C||M
    output M
else
    output 'invalid'
Prover
v||ε := L
x := rand
send x
receive ρ
ρ := ρ^ε mod v
if ρ = x
    M := 0
else
    ρ := ρ^ε mod v
    if ρ = x
        i_n := 1
    else
        M := 1
if i_n = 0
    R := (C||M)^D mod n
else
    R := 1
    free i_n
```

2.11 Ninth Interactive Protocol (for Generating Proof of Ticket Use; See FIG. 18)

A ninth interactive protocol according to the present invention allows the privileged verifier to preserve proofs of the verification carried out on the proving device 2.

The ninth interactive protocol is characterized by two aspects: the authentication information generation unit of the verification device 3 holds a random number r and applies it to a one-way function H to generate a challenge C; and the use proof information hold unit accumulates data (r, R). Regardless of the procedure on the side of the proving device, the ninth interactive protocol can be applied to any of the first through the eighth protocols discussed so far.

The characteristic information (δ, v) for ensuring the privilege of the verification device 3 is the same as that for the sixth interactive protocol. Below is an example in which the ninth interactive protocol is applied to the procedure for the verification device 3 in FIG. 18. It is assumed that prior to the execution of the interactive protocol, the inputting unit 2813 of the verification device 3 receives a message $\mu$ to be sent from the verification device 3 to the proving device 2, the message being recorded in the input information hold unit 2811.

The authentication information generation unit 286 generates a random number r and applies a one-way function to it, for example C:=H(r), to generate a challenge C which is recorded to the authentication information hold unit 287 (step 181 in FIG. 18). The identifier n of the ticket to be verified and the challenge C are combined and transmitted by the transmission unit 281 to the proving device 2 (step 182).

The reception unit 282 receives a value $\chi$ from the proving device 2 and records what is received to the information hold unit 289 (step 183). If a 0 is received as the value $\chi$, that means the proving device 2 holds no valid ticket and has sent 0 as its response R. In that case, the outputting unit 2812 issues an output signifying the invalidness of the ticket, and the interactive protocol is terminated. The second computation unit 284 calculates (in step 184) a response ρ as $$\rho := (\chi \| \mu)^\delta \bmod v \quad \text{[Expression 22]}$$

The transmission unit 281 transmits the calculated response ρ to the proving device 2 (step 185).

The reception unit 282 receives the response R from the proving device 2 and records what is received to the information hold unit 289 (step 186). The first computation unit 283 calculates $R^E$ mod n (step 187). The legitimacy verification unit 285 checks to see whether the high-order bits of the calculated value matches the value C held in the authentication information hold unit 287 (step 188). If the values match in step 188, the random number r generated in step 181 and the value R recorded to the information hold unit 289 in step 186 are recorded in combination to the use proof information hold unit 2814. In addition, a value M is extracted from the low-order bits of the value R as the information received from the proving device 2 (step 189); the extracted value is output from the outputting unit 2812. If the values fail to match in step 188, the outputting unit 2812 issues an output signifying the invalidness of the ticket.

The foregoing has been a description of the example in which the ninth interactive protocol is applied to the procedure of the verification device 3 in FIG. 18.

The ninth interactive protocol envisages implementation of a scheme wherein gift certificates, lottery tickets and the like are sold to users for a consideration by agents (member stores) of the issuing party, and the agents send the sold tickets or report them to the administrator of the ticket issuing party. Because ticket verification corresponds to ticket transfer, preserving the proof of each sold ticket accomplishes the transfer of tickets regardless of the degree of confidence in relations between the agents and the ticket administrator.

The information to be recorded in the use proof information hold unit 2814 may illustratively be information communicated between the verification device 3 and the proving device 2, as in the above example, or part of such information. Alternatively, the communicated information may be subjected to predetermined computation such as a one-way hash function. These variations of information handling may be combined as desired for use.

TABLE 10

```
Public information: (n, E)
Characteristic information for ensuring
privilege: (v, δ)
    Input: μ
    Output: M or 'invalid'
Verifier
    r := rand
    C := H(r)
    send (C, n)
    receive x
    ρ := (x||μ)^δ mod v
    send ρ
    receive R
    if R^E mod n = C||M
        output M
        store (r, R)
    else
        output 'invalid'
```

2.12 Tenth Interactive Protocol (for Prepaid Card Type Tickets of Center-administered Kind; see FIGS. 18, 19, 27)

According to a tenth interactive protocol of the present invention, the proving device 2 has use count hold means that may be operated by an administrative center. Every time a ticket is verified by the privileged verifier, the use count of the ticket is decremented and a proof of decremented count information is retained by the verification device 3.

The verifying procedure of the verification device 3 is the same as that of the ninth protocol. Below is a description of the tenth interactive protocol applicable to the proving device 2.

The characteristic information (δ, v) for ensuring the privilege of the verification device 3, the corresponding public information (ε, v), and the ticket auxiliary information L are the same as those for the sixth interactive protocol. As mentioned above, the tenth interactive protocol of the verification device 3 applies in the same manner as the sixth interactive protocol; the procedure for the verification device 3 will be described below with reference to FIG. 18, and the procedure for the proving device 2 will be discussed by referring to FIG. 19.

The authentication information generation unit 286 generates a random number r and applies it to a one-way function to generate a challenge C which is recorded to the authentication information hold unit 287 (step 181 in FIG. 18). The identifier n of the ticket to be verified and the challenge C are combined and transmitted by the transmission unit 281 to the proving device 2 (step 182).

In the proving device 2, the reception unit 292 receives the data (C, n) from the verification device 3 and records what is received to the information hold unit 299 (step 191 in FIG. 19). The ticket retrieval unit 122 retrieves from the ticket hold unit 121 the ticket corresponding to the received identifier n, to see whether the ticket in question is being held (step 192). If the matching ticket is not found, a value 0 is set to the response R which is recorded to the information hold unit 299 (step 197). If the matching ticket is found to exist, then the ticket t, the procedure "Prover$_s$" of the proving device 2 and the ticket added information L are set (step 193).

After step 193 has been executed, step 194 is carried out. Detailed stages of step 194 in the tenth interactive protocol constitute a modification of the procedure shown in FIG. 27. The authentication information generation unit 296 generates a challenge χ and records it to the second authentication information hold unit 298 (step 271). The generated value χ is transmitted by the transmission unit 291 to the verification device 3 (step 272).

The reception unit 282 in the verification device 3 receives the challenge χ and records what is received to the information hold unit 289 (step 183 in FIG. 18).

If a value 0 is received as the challenge χ, that means the proving device 2 holds no valid ticket and has sent 0 as its response R. In that case, the outputting unit 2812 issues an output signifying the invalidness of the ticket, and the interactive protocol is terminated. Using a message μ that was input from the inputting unit 2813 and recorded beforehand in the input information hold unit 2811, the second computation unit 284 calculates (in step 184) a response ρ as $$\rho := (\chi \| \mu)^\delta \bmod v \qquad \text{[Expression 23]}$$

The calculated response ρ is transmitted from the transmission unit 281 to the proving device 2 (step 185)

The reception unit 292 in the proving device 2 receives the response ρ and records what is received to the information hold unit 299 (step 273 in FIG. 27). The second computation unit 294 calculates $$\rho := \rho^\varepsilon \bmod v \qquad \text{[Expression 24]}$$

and records the result of the calculation to the information hold unit 299 (step 274). A check is made to see whether the high-order bits of the calculated value ρ matches the value χ held in the second authentication information hold unit 298 (step 275). In case of a mismatch in step 275, a message of M:=1∥i$_n$ is set and recorded to the information hold unit 299 (step 2712). If the values match in step 275, the steps 276 and 277 are reached but replaced by operations wherein the value μ is extracted from the low-order bits of the value ρ, the extracted value μ is recorded to the input information hold unit 2911, and a value 0 is set to the message M which is recorded to the information hold unit 299. Instead of step 278, a check is made to see whether the value j recorded in the first internal state hold unit of the internal state hold unit 124 is equal to or greater than the extracted value μ. If the value j is found to be equal to or greater than the value μ, instead of step 2711, an operation is carried out wherein the value j is changed to j:=j−μ and the value M is varied to M:=M∥μ. If the value j is less than the value μ, the value j is set to 0 and the value M is changed to M:=M∥j. In any case, the first computation unit 293 calculates R:=(C∥M)$^D$ mod n, and records the result of the calculation to the information hold unit 299 (step 2710). The foregoing has been a description of the detailed stages constituting step 194 of the tenth interactive protocol.

After the execution of step 194, the ticket t, Provers and information L which were set in step 193 are released (step 195 in FIG. 19). With step 195 or 197 carried out, the response R is transmitted from the transmission unit 291 to the verification device 3 (step 196).

In the verification device 3, the reception unit 282 receives the response R from the proving device 2 and records what is received to the information hold unit 289 (step 186 in FIG. 18). The first computation unit 283 calculates R:=R$^E$ mod n (step 187). The legitimacy verification unit 285 checks to see whether the high-order bits of the calculated value R matches the value C held in the authentication information hold unit 287 (step 188). In case of a match in step 188, the random number r generated in step 181 and the value R recorded to the information hold unit 289 in step 186 are recorded in combination to the use proof information hold unit 2814. In addition, the message M is extracted from the low-order bits of the value R as the information received from the proving device 2 (step 189); the extracted message is output from the outputting unit 2812. If the values fail to match in step 188, the outputting unit 2812 issues an output signifying the invalidness of the ticket.

The foregoing has been a description of the tenth interactive protocol. The seventh interactive protocol described earlier is characterized in that an independent counter value i$_n$ for each ticket is decremented upon use by the value of the message μ. With the tenth interactive protocol, by contrast, an internal state independent of the ticket is decremented at each use. Whereas the seventh protocol applies to tickets each being illustratively an independent prepaid card, the tenth protocol allows services to be offered using a common prepaid card representing a plurality of tickets. For example, in an establishment where services of eating, drinking and amusement are provided by different organizations selling different tickets, the tenth protocol allows the customer having purchased a single prepaid card to make use of any of the different services for a consideration deducted from the card upon use.

TABLE 11

Prover
f‖v‖ϵ := L
if f
    $\chi$ := rand
    send $\chi$
    receive $\rho$
    if $\rho^e$ mod v = $\chi\|\mu$
        M := 0
        if $\mu \leq$ j
            j := j - $\mu$
            M := M‖$\mu$
        else
            M := M‖j
            j := 0
    else
        M := 1‖j
R := (C‖M)$^D$ mod n

2.13 Eleventh Interactive Protocol (Implements Multiple Protocols)

An eleventh interactive protocol according to the present invention permits the proving device 2 to carry out a plurality of predetermined proving procedures. The proving device 2 is equipped with a proving procedure execution unit capable of selectively carrying out one of predetermined multiple procedures for proving. The selection of a procedure is accomplished using part of the ticket added information L.

2.14 Twelfth Interactive Protocol (Provision of Protocols Based on Ticket Added Information; See FIG. 19, 31)

A twelfth interactive protocol according to the present invention provides a proving procedure to the proving device 2.

The proving device 2 is equipped with suitable controlling means. Part of the proving procedure is included in the information L supplied to the device.

One way of furnishing the proving procedure is to permit an entirely free description of the procedure by use of an appropriate description language. Preferably, a fixed procedure with a certain degree of general versatility may be prepared beforehand, and individual blocks of the procedure may later be described in descriptive language in the information L. The latter, preferred method has the advantage of expressing the procedure in relatively small amount of information.

The twelfth interactive protocol applicable to the proving device 2 will be described below with reference to FIGS. 19 and 31. It is assumed that the information L includes: a value f specifying whether verification of the verification device 3 is to be carried out; public information (v, ϵ) necessary for the verification of the verification device 3; and an instruction group $P_?$ of the proving procedure. It is also assumed that the instruction group $P_?$ is capable of accommodating instructions for doing nothing. Illustratively, the information L is supposed to comprise (f, v, ϵ, $P_0$, $P_1$, $P_2$, $P_3$, $P_4$, $P_5$).

The reception unit 292 receives data (C, n) from the verification device 3 and records what is received to the information hold unit 299 (step 191 in FIG. 19). The ticket retrieval unit 122 retrieves from the ticket hold unit 121 the ticket corresponding to the received identifier n, to see whether the ticket in question is being held (step 192). If the matching ticket is not found, a value 0 is set to the response R which is recorded to the information hold unit 299 (step 197). If the matching ticket is found to exist, then the ticket t, the procedure "Prover$_s$" of the proving device 2 and the ticket added information L are set (step 193). With the twelfth interactive protocol, the data items (f, v, ϵ, $P_0$, $P_1$, $P_2$, $P_3$, $P_4$, $P_5$) are extracted from the information L and recorded when the procedure "Prover$_s$" is set.

After step 193 has been executed, step 194 is carried out. Detailed stages of step 194 in the twelfth interactive protocol are depicted in FIG. 31. A check is made to see whether the value f is true (step 3101). If the value is judged to be true, steps 3102 through 3109 are carried out.

The authentication information generation unit 296 generates a random number $\chi$ and records it to the second authentication information hold unit 298 (step 3102). The transmission unit 291 transmits the random number $\chi$ to the verification unit 2 (step 3103). The reception unit 292 receives a value $\rho$ from the verification unit 2 and records what is received to the information hold unit 299 (step 3104).

An expression given as $$\rho_\delta \bmod v \qquad \text{[Expression 25]}$$

is calculated, and a check is made to see whether the high-order bits of the result of the calculation is equal to the value $\chi$ (step 3105). If the two values are found to be equal in step 3105, steps 3106 and 3107 are carried out. Specifically, a value 0 is set to the message M which is recorded to the information hold unit 299 (step 3106), and the instruction or instruction group $P_0$ is executed (step 3107). If the two values are not found to be equal in step 3105, steps 3108 and 3109 are executed. That is, a value 1 is set to the message M which is recorded to the information hold unit 299 (step 3108), and the instruction or instruction group $P_1$ is executed (step 3109).

Thereafter, the instruction or instruction group $P_2$ is carried out (step 3110). With the instruction or instruction group executed, a check is made to see whether the result of the execution is true (step 3111). If the result is found to be true in step 3111, steps 3112 and 3113 are executed. Specifically, the instruction or instruction group $P_4$ is carried out in step 3112. The first computation unit 293 calculates R:=(C‖M)$^D$ mod n, and records the result of the calculation to the information hold unit 299 in step 3113. If the result is not found to be true in step 3111, steps 3114 and 3115 are executed. Specifically, the instruction or instruction group $P_5$ is carried out in step 3114. A value 1 is set to the response R which is recorded to the information hold unit 299 in step 3115. The foregoing has been a description of the detailed stages constituting step 194 of the twelfth interactive protocol.

After the execution of step 194, the ticket t, Prover$_s$ and information L which were set in step 193 are released (step 195 in FIG. 19). With step 195 or 197 carried out, the response R is transmitted from the transmission unit 291 to the verification device 3 (step 196).

The above has been a description of the twelfth interactive protocol applicable to the proving device 2.

TABLE 12

Public information: (n, E)
Characteristic information for ensuring
privilege: (v, δ)
Input: $\mu$
Output: M or 'invalid'
Verifier
    C := rand
    send (C, n)
    receive $\chi$
    $\rho$ := $(\chi\|\mu)^\delta$ mod v
    send $\rho$
    receive R
    if $R^E$ mod n = C‖M
        output M

TABLE 12-continued

```
    else
        output 'invalid'
    Prover
    receive (C, n)
    find (n, t, L)
    f‖v‖ϵ‖P₀‖P₁‖P₂‖P₃‖P₄‖P₅ := L
    if f
    χ := rand
    send χ
    receive ρ
    if ρ^δ mod v = χ‖μ
        M := 0
        P₀
    else
        M := 1
        P₁
        P₂
        if P₃
            P₄
            R := (C‖M)^D mod n
        else
            P₅
            R := undefined
    send R
```

2.15 Thirteenth Interactive Protocol (Constitution of the Verification Device; See FIG. 30)

According to a thirteenth interactive protocol of the present invention, characteristic information for privileging the verification device 3 is provided in the form of tickets. The code based on the characteristic information for ensuring the privilege of the verification device 3 is furnished in the same manner as with the ticket proving device 2 discussed so far.

Figure 30:
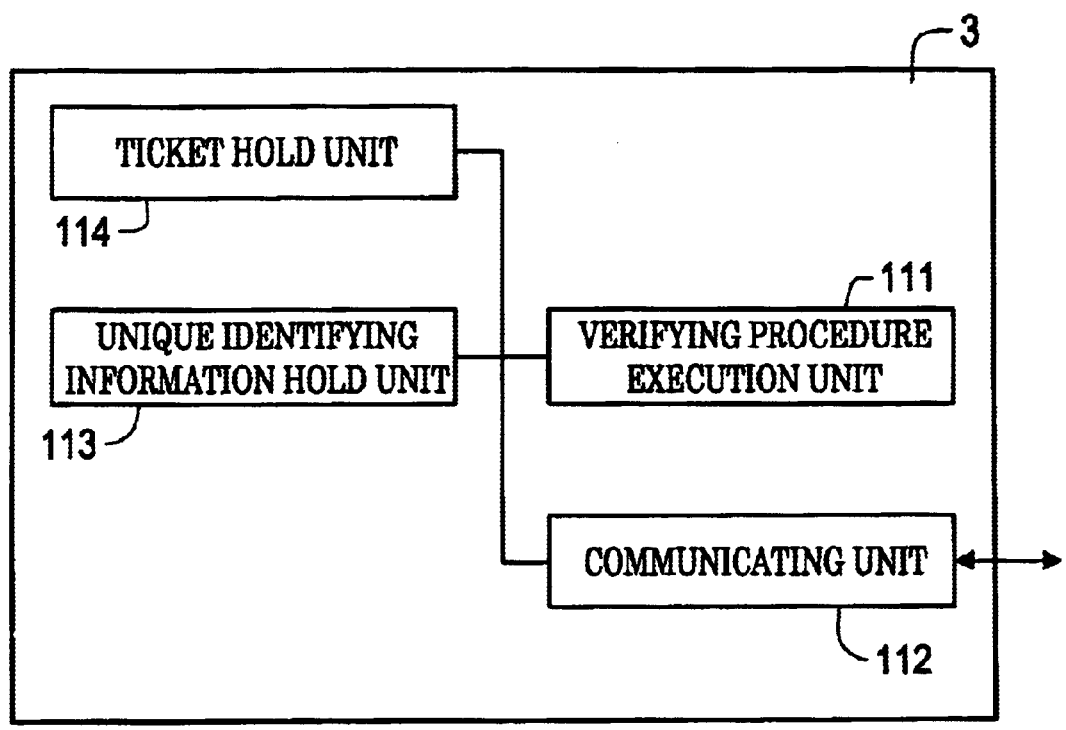
FIG. 30 is a block diagram showing a typical constitution of the ticket verification device.

FIG. 30 is a block diagram showing a typical constitution of the ticket verification device 3 for which this verifying protocol is implemented.

For coding based on secret information 6 ensuring its privilege, the verification device 3 extracts the corresponding ticket from a ticket hold unit 114. The extracted ticket is coded on the basis of unique identifying information held in a unique identifying information hold unit 113

3. Second Embodiment

3.1 Authentication Technique

In a second embodiment of the present invention, ticket characteristic information is provided in the manner described below.

Let p be a prime number; G be a finite group in which discrete logarithm problems are difficult to solve; and g be an element of the order p of the finite group G. When $y=g^x$, the characteristic information for each ticket is given as (p, G, g, y, x). Below is a detailed description of the proving procedure for tickets implemented when public characteristic information is defined as (p, G, g, y) and secret characteristic information as x.

In practice, the finite group G may be constituted as a multiplicative group of finite fields or as an elliptic curve on a finite field.

Illustratively, it is assumed that the information (p, G, g) is common throughout the system in question, y denotes public information, and x represents secret information. A ticket is defined as data calculated from the ticket characteristic information x, information $d_U$ unique to the proving device, and ticket added information L. The proving device 2 is arranged to calculate $\tau(C, y, t, L)=C^x$ given (C, y, t, L) by use of the unique identifying information $d_U$.

As an example, in case that $d_U$ stands for a decryption key of a cryptosystem, $E_U$ is the encryption key corresponding to the decryption key $d_U$, and H is a one-way function, it is possible to define the ticket t as $t:=(E_U(x), H(d_U\|x\|L))$.

When the ticket is defined as shown above, the code $C^x$ based on the secret characteristic information x using the ticket may be calculated inside the proving device 2 as follows. Given the input (C, y, t, L), the proving device 2 restores a value D by decrypting $E_U(D)$ using the information $d_U$ unique to the proving device 2; The value D thus obtained is used to compare the value of the one-way function H with the ticket t, whereby the legitimacy of the value L is ascertained; The restored value D is used inside the proving device 2 to calculate the code $C^x$.

It is also possible to define $d_U$ as a one-way function. In that case, the ticket t may be defined as $t=x-d_U(L, y)$.

Where the ticket is defined as shown above, the coding based on the value D given the input (C, y, t, L) may be accomplished by calculating $C^t C^{d_U(L, y)}$.

What follows is a description of typical interactive protocols utilizing the principle of sharing a secret value. The security of these protocols lies in the difficulty involved in solving their discrete logarithm problems.

3.2 Fourteenth Interactive Protocol (for Commuter Pass Type Tickets, With the Proving Device 2 Incorporating a Clock; See FIGS. 13, 19, 20)

For a fourteenth interactive protocol according to the present invention, the proving device 2 is assumed to have clock information as its internal state. The fourteenth interactive protocol applicable to the verification device 3 will be described below with reference to FIG. 13, and the same protocol in effect for the proving device 2 will be discussed by referring to FIG. 19.

In the proving device 3, the authentication information generation unit 286 generates a random number r and generates a challenge C by calculating $C:=g^r$. The challenge C thus generated is recorded to the authentication information hold unit 287 (step 131 in FIG. 13). Step 132 is then reached but replaced by an operation wherein the challenge C recorded in the authentication information hold unit 287 and public information y are transmitted in combination to the proving device 2 through the transmission unit 281.

Step 191 (in FIG. 19) is replaced by an operation wherein the reception unit 292 of the proving device 2 receives (C, y) from the proving device 2 and records what is received to the information hold unit 299. The ticket retrieval unit 122 retrieves from the ticket hold unit 121 the ticket corresponding to the received public information y, to see whether the ticket in question is being held (step 192). If the matching ticket is not found, a value (0 in this case) representing the absence of the ticket is set to the response R which is recorded to the information hold unit 299 (step 197). If the matching ticket is found to exist as the result of the check in step 192, then the ticket t, the procedure "Prover$_s$" of the proving device 2 and the ticket added information L are set in the controlling unit 2912 (step 193).

After step 193 has been executed, step 194 is carried out. Detailed stages of step 194 in the fourteenth interactive protocol are described below with reference to FIG. 20. The current time "time" retrieved from the second internal state hold unit of the internal state hold unit 124 is compared with the period of validity recorded in the information L about the ticket in question (step 201). If the ticket is judged to be valid as the result of the comparison, the first computation unit 293 calculates a response R as $R:=C^x$ and records the result of the calculation to the information hold unit 299 (step 202). The response R may be calculated entirely by the first computation unit 293 in the proving device 2. If the ticket t is constituted as $t=x-d_U(L, y)$, the calculation of $C^x$ may also be carried out as $C^rC^xd_{t_j}(L, y)$. For that reason, it is possible to calculate $C^x$ outside the proving device 2. The value $C^r$ this acquired may be multiplied, outside the proving device 2, by $C^{d^\wedge}d_{t_j}(L, y)$ calculated by the first computation unit 293 within the proving device 2. This method may be used effectively where the calculating speed of the proving device 2 is slow. If the ticket is judged to be invalid in step 201, the ticket is deleted from the ticket hold unit 121 as needed (step 203), and a value 1 is set to the response R which is recorded to the information hold unit 299 (step 204). The foregoing has been a description of the detailed stages constituting step 194 of the fourteenth interactive protocol.

After step 194 has been executed, the ticket t, Provers and information L which were set in step 193 are released from the controlling unit 2912 (step 195 in FIG. 19). With step 195 or 197 carried out, the response R is transmitted from the transmission unit 291 to the verification device 3 (step 196).

The reception unit 282 in the verification device 3 receives the response R from the proving device 2 and records what is received to the information hold unit 289 (step 133 in FIG. 13). The first computation unit 283 calculates $y^r$, and the legitimacy verification unit 285 checks to see whether the result of the calculation matches the response R (step 134). A match detected in step 134 reveals the proving device 2 to have a valid ticket. In that case, the outputting unit 2812 issues an output signifying the validness of the ticket. A mismatch in step 134 reveals the proving device 2 to have no valid ticket. In this case, the outputting unit 2812 issues an output signifying the invalidness of the ticket.

The above has been a description of the fourteenth interactive protocol. This protocol offers the same functions as those of the simple example of interaction described earlier.

TABLE 13

Verifier
Public information: y
Output: 'valid' or 'invalid'
r := rand
C := $g^r$
send (C, y)
receive R
if $y^x$ = R
    output 'valid'
else
    output 'invalid'
Prover
if time < L
    R = $C^x$
else
    R = 1

Figure 32:
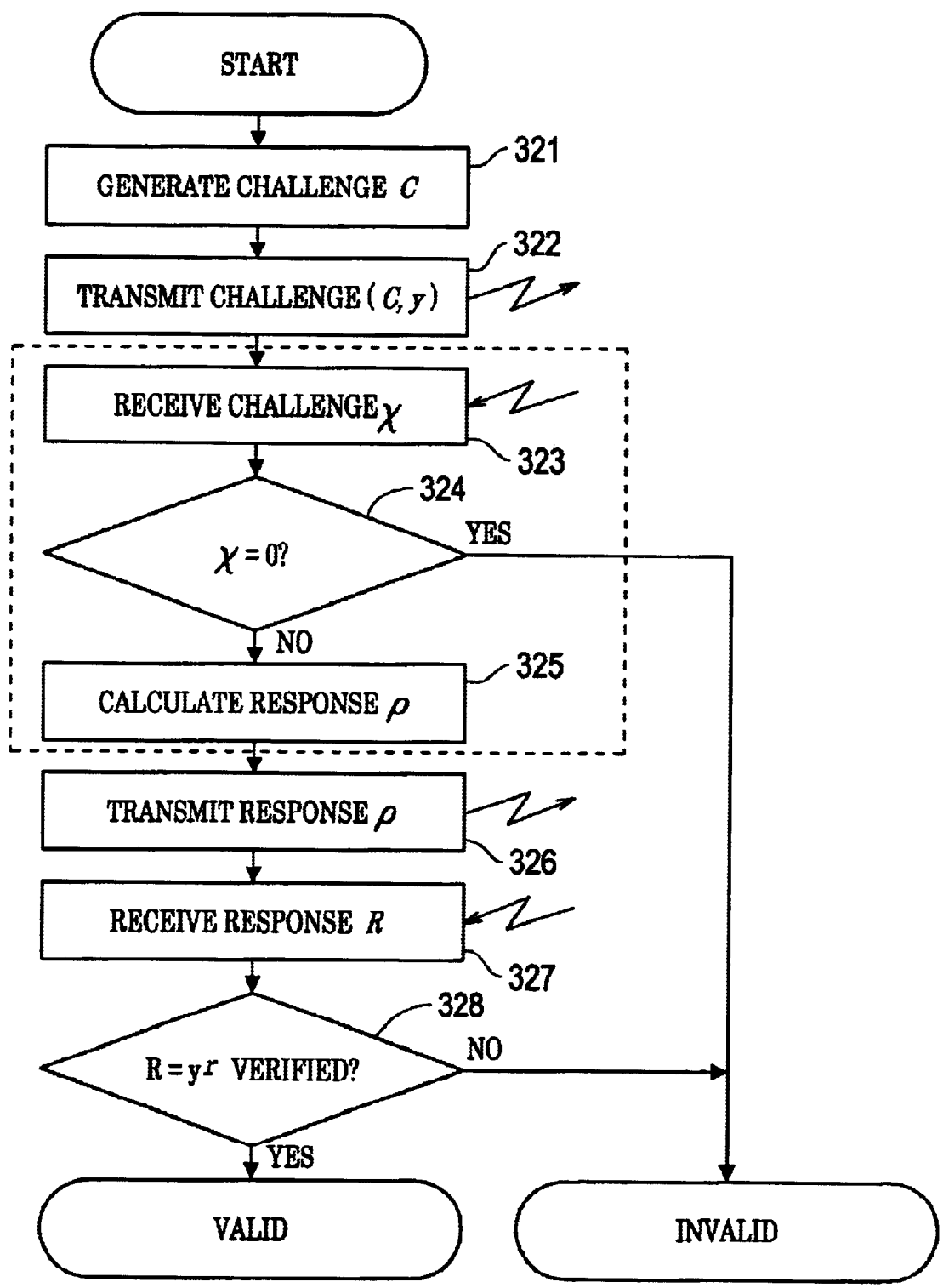
FIG. 32 is a flowchart of steps describing the ticket verifying procedure.
Figure 33:
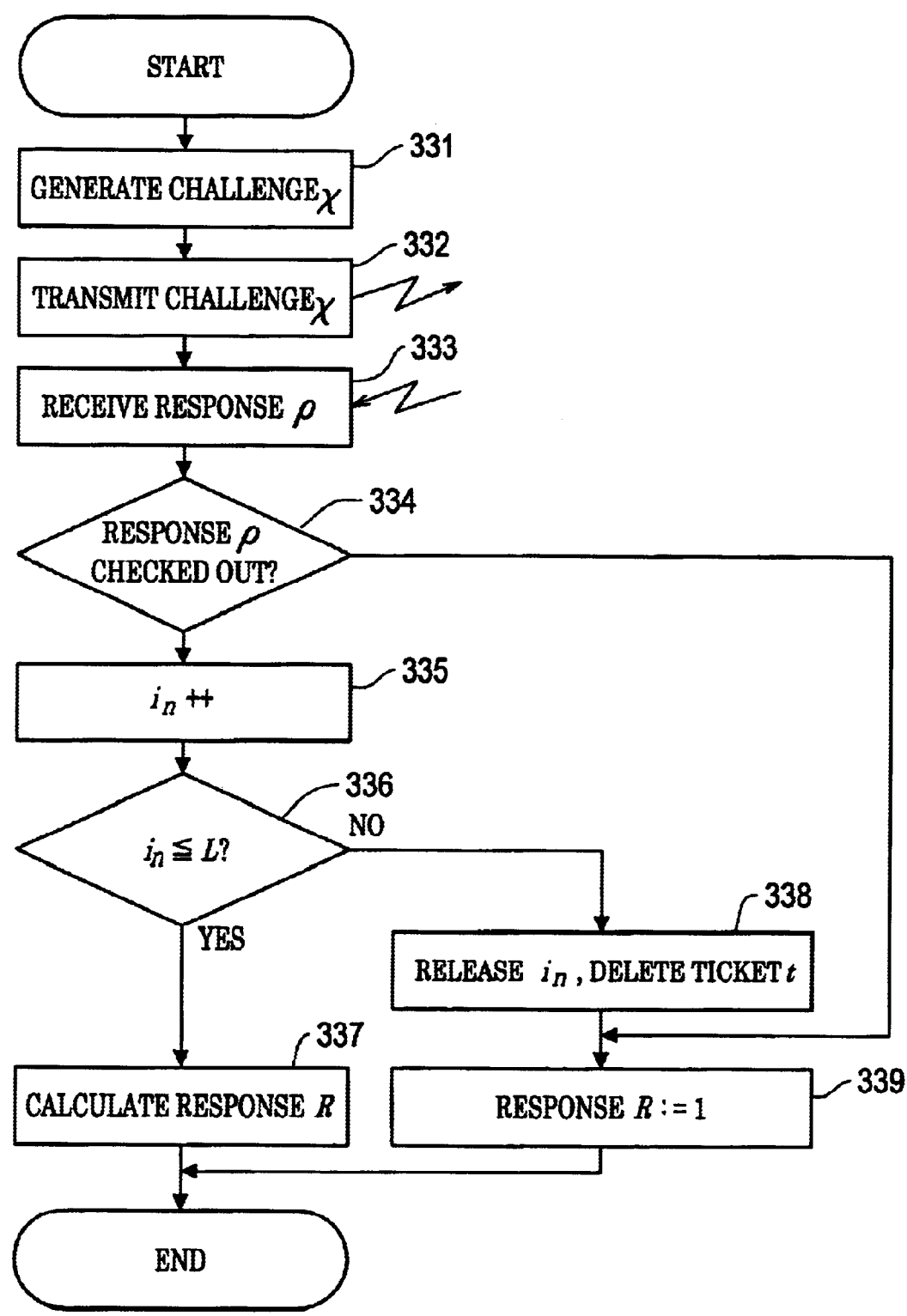
FIG. 33 is a flowchart of steps describing the ticket proving procedure.

3.3 Fifteenth Interactive Protocol (for Coupon Type Tickets of Throwaway Type; see FIGS. 32, 19, 33)

For a fifteenth interactive protocol according to the present invention, it is assumed that the ticket auxiliary information L used by the protocol includes public information η and an upper limit value i of a counter $i_n$. The fifteenth interactive protocol applicable to the verification device 3 will be described below with reference to FIG. 32, and the same protocol in effect for the proving device 2 will be discussed by referring to FIG. 19.

In the proving device 3, the authentication information generation unit 286 generates a random number r and generates a challenge C by calculating C:=$g^r$. The challenge C thus generated is recorded to the authentication information hold unit 287 (step 321 in FIG. 32). The challenge C recorded in the authentication information hold unit 287 and public information y are transmitted in combination to the proving device 2 through the transmission unit 281 (step 322).

Step 191 (in FIG. 19) is replaced by an operation wherein the reception unit 292 of the proving device 2 receives (C, y) transmitted from the verification device 3 and records what is received to the information hold unit 299. The ticket retrieval unit 122 retrieves from the ticket hold unit 121 the ticket corresponding to the received public information y, to see whether the ticket in question is being held (step 192). If the matching ticket is not found, a value 0 is set to the response R which is recorded to the information hold unit 299 (step 197). If the matching ticket is found to exist, the ticket t, the procedure "$Prover_s$" of the proving device 2 and the ticket added information L are set (step 193). At the time the procedure "$Prover_s$" is set, the data (η, i) is extracted from the information L.

After the execution of step 193, step 194 is carried out. Detailed stages constituting step 194 of the fifteenth interactive protocol are described below with reference to FIG. 33. The authentication information generation unit 296 generates a random number s and generates a challenge χ by calculating χ:=$g^s$. The result of the calculation is recorded to the second authentication information hold unit 298 (step 331). The transmission unit 291 transmits the challenge χ to the verification device 2 (step 332).

In the verification device 3, the reception unit 282 receives the challenge χ and records what is received to the information hold unit 289 (step 323). If a value 0 is received as the challenge χ, that means the proving device 2 holds no valid ticket and has sent 0 as its response R. In that case, the outputting unit 2812 issues an output signifying the invalidness of the ticket, and the interactive protocol is terminated (step 324). The second computation unit 284 calculates (in step 325) a response ρ as $$\rho := \chi^\xi \qquad \text{[Expression 26]}$$

The calculated response ρ is transmitted from the transmission unit 281 to the proving device 2 (step 326).

In the proving device 2, the reception unit 292 receives the response ρ and records what is received to the information hold unit 299 (step 333). The second computation unit 294 calculates $\eta^s$. A check is made to see whether the result of the calculation matches the received response ρ (step 334). In case of a match, the value of the counter $i_n$ allocated in the second internal state hold unit of the internal state hold unit 124 is incremented (step 335). With step 335 carried out, the counter value $i_y$ is compared with the upper limit value i obtained from the information L (step 336). If the comparison in step 337 reveals the value $i_n$ to be equal to or smaller than the value i, the first computation unit 293 calculates R:=$C^x$ and records the result of the calculation to the information hold unit 299 (step 337). If the value $i_n$ is found to be greater than the value i, then the counter $i_n$ is released from the second internal state hold unit of the internal state hold unit 124, and the ticket is deleted from the ticket hold unit 121 (step 338). Step 339 is reached either from step 338 or from step 334 wherein the values failed to match. In step 339, a value 1 is set to the response R which is recorded to the information hold unit 299. The foregoing has been a description of the detailed stages constituting step 194 of the fifteenth interactive protocol.

After step 194 has been executed, the ticket t and Provers which were set in step 193 are released (step 195 in FIG. 19). With step 195 or 197 carried out, the response R is transmitted from the transmission unit 291 to the verification device 3 (step 196).

In the verification device 3, the reception unit 282 receives the response R from the proving device 2 and records what is received to the information hold unit 289 (step 327 in FIG. 32). The first computation unit 283 calculates y'$^r$, and the legitimacy verification unit 285 checks to see whether the result of the calculation matches the response R (step 328). A match detected in step 328 reveals the proving device 2 to have a valid ticket. In that case, the outputting unit 2812 issues an output signifying the validness of the ticket. A mismatch in step 328 reveals the proving device 2 to have no valid ticket. In this case, the outputting unit 2812 issues an output signifying the invalidness of the ticket.

The above has been a description of the fifteenth interactive protocol. This protocol offers the same functions as the third interactive protocol of the first embodiment.

TABLE 14

Verifier
r := rand
C := g$^r$
send (C, y)
receive χ
ρ := χ$^e$
receive R
if y$^r$ = R
    output 'valid'
else
    output 'invalid'
Prover
s := rand
χ := g$^s$
send χ
receive ρ
if η$^s$ = ρ
    i$_n$ := i$_n$ + 1
    if i$_n$ ≦ i
        R = C$^x$
    else
        free i$_n$
        delete t
        R := 1
else
    R := 1

4. Third Embodiment (Ticket Initialization; See FIGS. 5 to 12)

In a third embodiment of the present invention, the ticket creating and issuing device 1 and the ticket proving device 2 have ticket counting means i$_U$ so as to avoid multiple initialization of tickets.

In the ticket creating and issuing device 1, the ticket counting means may be included in the database 7 of information unique to the proving device. In the ticket proving device 2, the ticket counting means should preferably be furnished with protective measures to resist attempts to modify its contents.

The overall operation of ticket creation and issuance by the ticket creating and issuing device 1 will be described later in detail in the form of a fourth embodiment.

How a ticket is issued by the third embodiment will now be described with reference to FIG. 5. In step 55 of FIG. 5, a check is made upon issuance of a ticket to see whether the ticket in question is to initialize the internal state of the proving device 2. If the initialization is found to be needed, a counter value is extracted from the ticket counting means of the ticket creating and issuing device 1 and the extracted value is transmitted along with the ticket. If the initialization is found to be unnecessary in step 55, a value i=0 is transmitted. The ticket counter is initially set to 1. In step 56, the counter value is incremented by 1 in preparation for the next request to issue a ticket. Although tickets are made of public information, they need to remain their integrity. For that reason, the administrative center should preferably be provided with signature putting means for putting signatures on the proving device identifier, counter value, ticket identifier, initializing procedure, proving procedure, and ticket added information.

Figure 6:
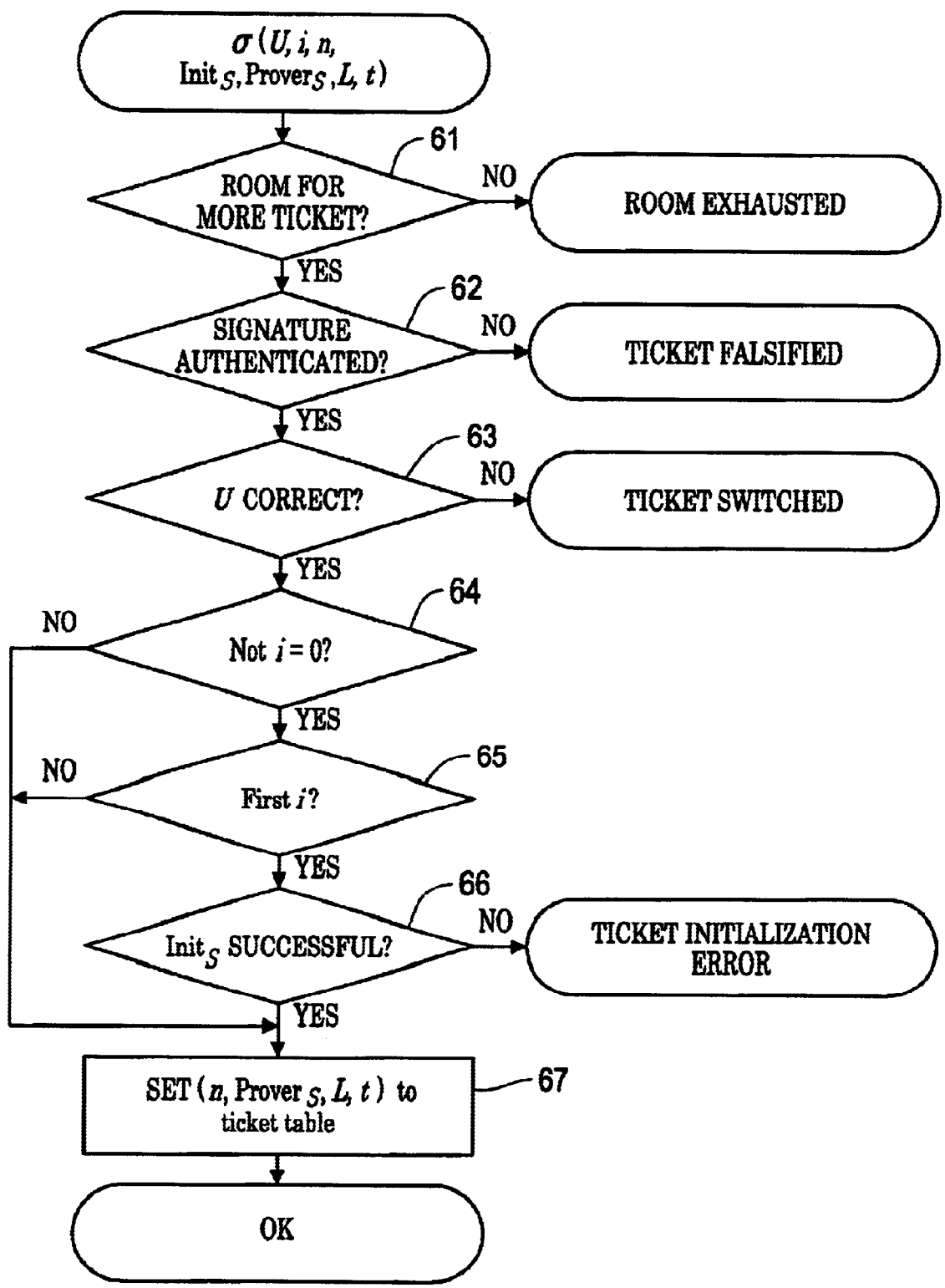
FIG. 6 is a flowchart of steps describing how a ticket is recorded to a ticket proving device.

FIG. 6 is a flowchart of steps describing how an issued ticket is registered to the ticket proving device 2. In step 61 of FIG. 6, a check is made to see whether the ticket hold unit has room to accommodate a ticket. In step 62, a check is made to see whether the signature on the ticket is authentic. In step 63, a check is made to see whether the proving device identifier is correct. In step 64, a check is made to see whether initialization is necessary in view of the value i. If initialization is deemed necessary in step 64, step 65 is reached in which a check is made to see whether the ticket has appeared for the first time as one for which the value i needs to be initialized.

Figure 7:
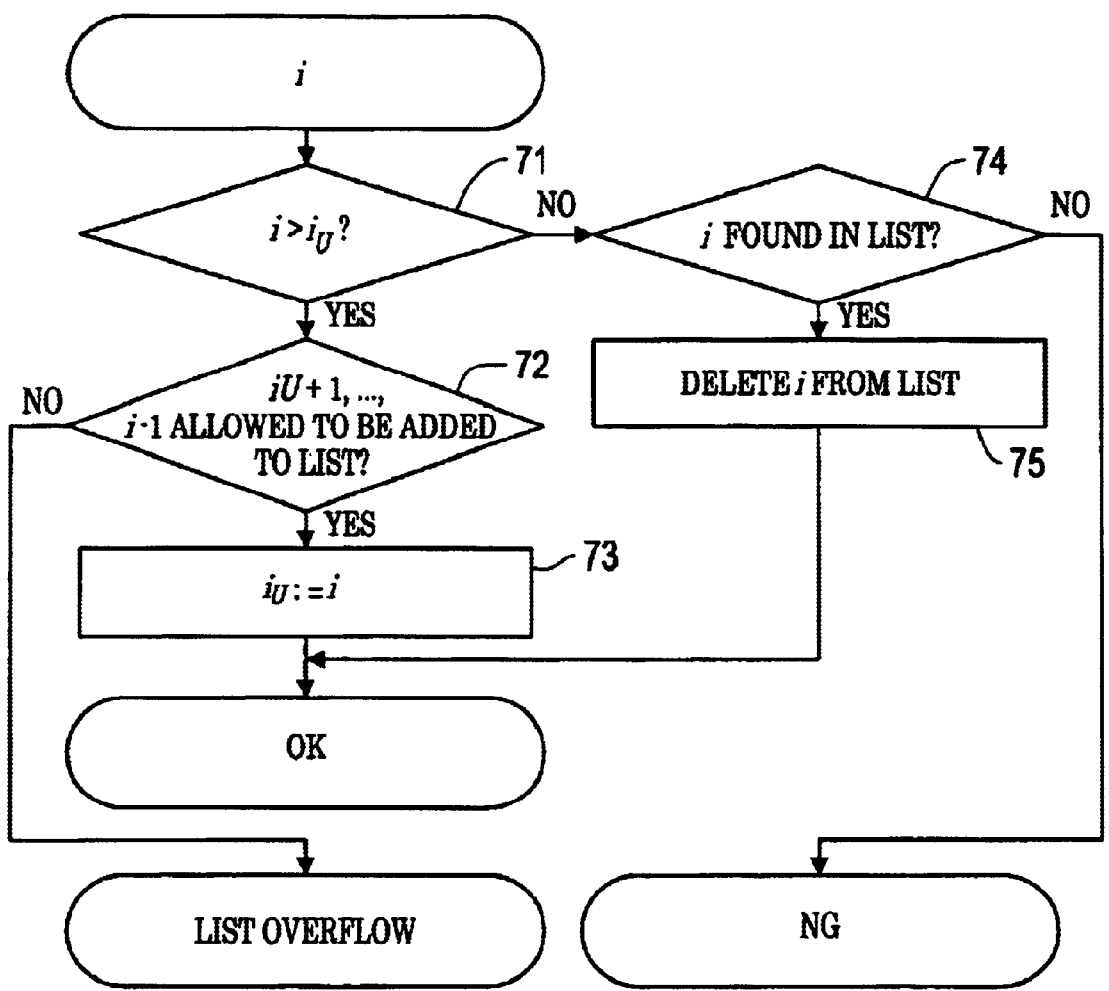
FIG. 7 is a flowchart of steps depicting a routine for making decisions to avert multiple initialization.

The checking procedure of step 65 is elaborated in FIG. 7. If the ticket is found to be one for registration for the first time, step 66 is reached in which initialization is carried out. Examples of initialization will be described later with reference to FIGS. 8 and 9. If initialization is not needed, the ticket entered into the ticket hold means is registered.

FIG. 7 is a flowchart of steps depicting a routine for making decisions to avert multiple initialization. The example here involves furnishing the internal state hold means with means to hold a list of serial numbers.

A value i$_U$ held in the ticket counting means is the highest serial number i among those of the tickets that have been initialized so far. The list held in the internal state hold means comprises serial numbers smaller than the value i$_U$, the numbers corresponding to the tickets that have yet to be initialized.

When a serial number i is input, step 71 is reached in which the value i is compared with the value i$_U$ held in the ticket counting means. If the serial number i is found to be greater than the value i$_U$, initialization corresponding to the serial number i has yet to take place. In that case, step 72 is reached; otherwise step 74 is reached. In step 72, the list is supplemented by serial numbers which are greater than the value i$_U$ and smaller than the value i and for which initialization has yet to be executed. If the list has no more room to which serial numbers are added, that means the list has overflowed and requires exception handling. In step 73, the value i$_U$ is replaced by the value i and an "OK" is output.

In step 74, a check is made to see whether the value i exists in the list held by the internal state hold means. If the value i is found to exist in the list, step 75 is reached in which the value i is deleted from the list and an "OK" is output. If the value i is not found in the list, an "NG" is output.

Figure 8:
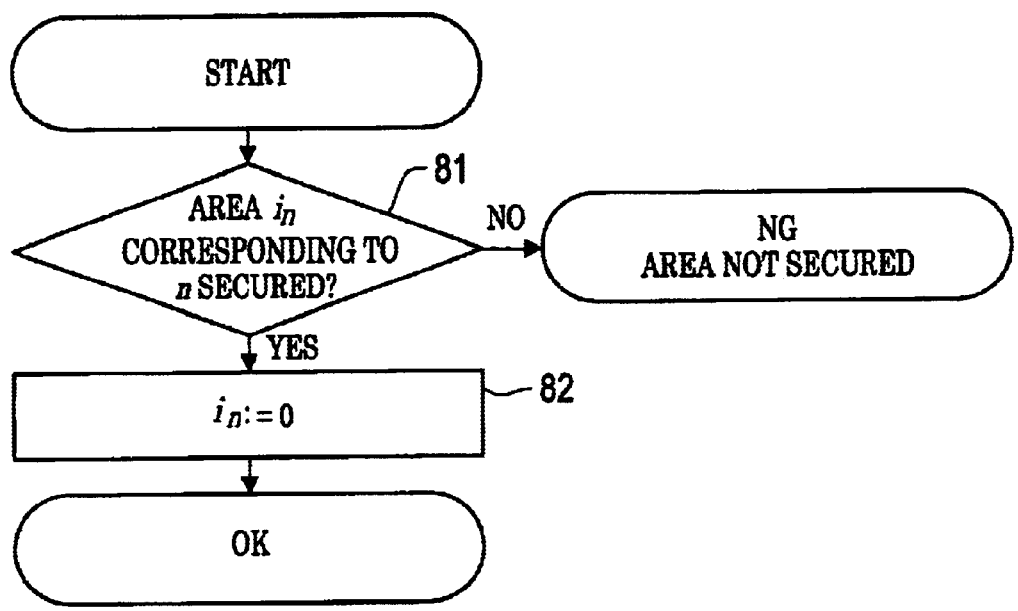
FIG. 8 is a flowchart of steps describing how the internal state of a proving device is initialized.
Figure 9:
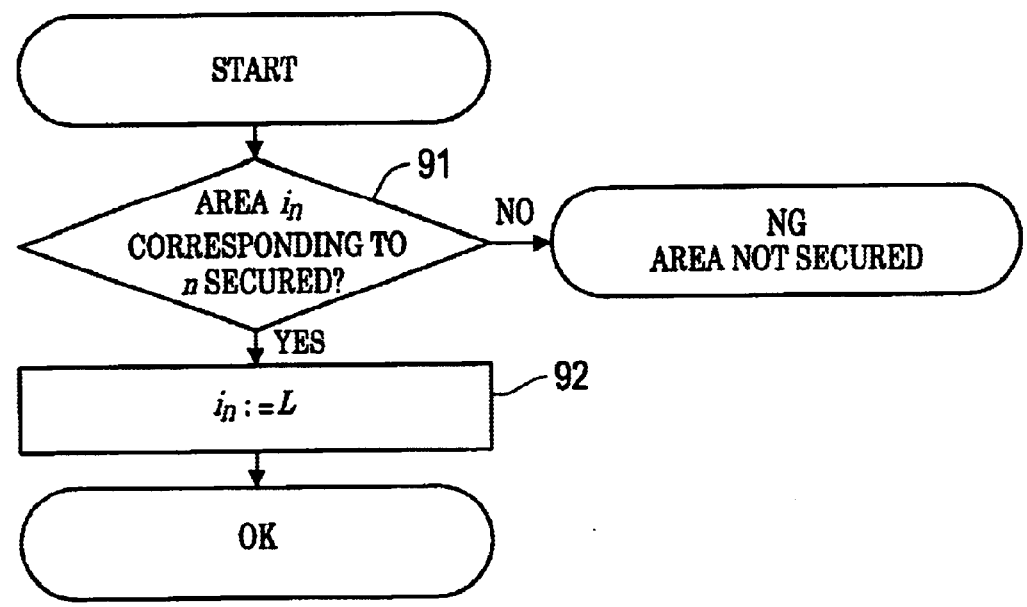
FIG. 9 is another flowchart of steps describing how the internal state of the proving device is initialized.

FIGS. 8 and 9 show procedures for initializing the internal state regarding a ticket. In each of steps 81 and 91 in FIGS. 8 and 9, a check is made to see whether an area can be allocated for initialization. If an area is found to be available for initialization, step 82 or 92 is reached in which the internal state i$_n$ is initialized to 0 or to L.

Figure 10:
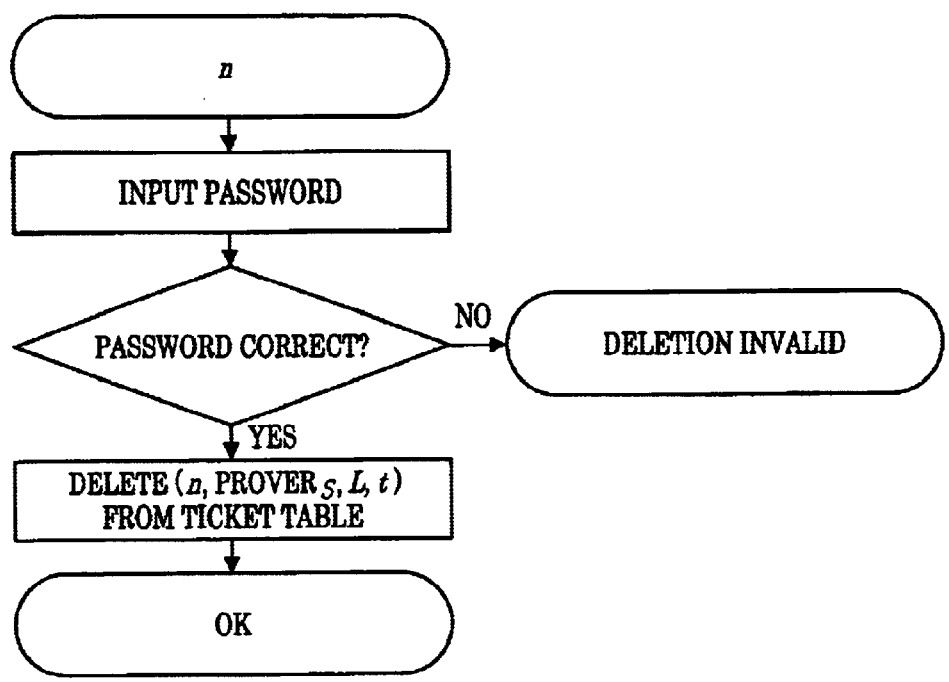
FIG. 10 is a flowchart of steps depicting a procedure for deleting a ticket from the proving device.
Figure 11:
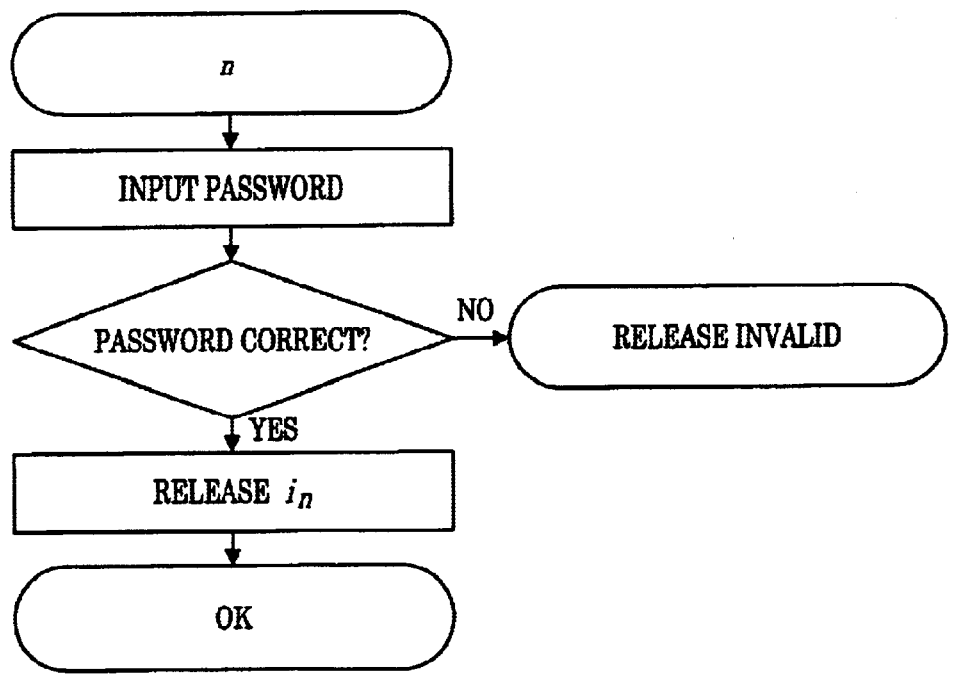
FIG. 11 is a flowchart of steps depicting a procedure for releasing the internal state of the proving device.

Deletion of a ticket from the proving device 2 is executed upon authentication based on a password, as shown in FIG. 10. Whether or not to release the internal state is determined upon authentication also based on a password, as depicted in FIG. 11.

5. Fourth Embodiment (Tickets Created and Issued by Ticket Creating and Issuing Device 1; See FIGS. 2, 3, 4, 5)

The ticket creating and issuing device 1 will now be described in the form of a fourth embodiment. FIG. 4 is a flowchart of steps describing how the ticket creating and issuing device works to create a ticket.

The ticket creation means 4 receives a request to create a ticket designating its specification. The ticket specification is constituted by a ticket verifying procedure, a ticket proving procedure, an initializing procedure, a data type of ticket added information, and qualifying information about a ticket issuance requesting party.

The procedures may be represented by their identifiers which are used to designate necessary procedures. Alternatively, the procedures themselves may be designated. Below is a description of a scheme wherein a specification identifier is used to designate the ticket specification. If a ticket has an internal state and if a privileged verifier can modify that internal state, it is necessary to grant a certificate attesting to the verifier's privilege when the verifying and proving procedures are to be determined.

In FIG. 4, the ticket creation means first receives a request to create a ticket, whereupon step 41 is reached in which the specification of the ticket is retrieved. In step 42, ticket characteristic information is generated. It is assumed here that the characteristic information is made up of a pair of public keys of the RSA public key cryptosystem. The ticket characteristic information may be either created in response to the received ticket creating request or prepared beforehand. In step 43, the characteristic information, specification identifier, data type of ticket added information, and qualifying information about the ticket issuance requesting party (and a certificate of the privileged verification device if necessary) are stored in combination to a ticket prototype database 6. In step 44, signatures are put on the ticket identifier n, ticket public information E, and ticket verifying procedure "Verifier$_s$" corresponding to the ticket specification S; the results are sent to the ticket creation requesting party.

FIG. 5 is a flowchart of steps describing how the ticket is issued. In FIG. 5, the ticket issuance requesting party makes a ticket issuing request by designating the ticket using a ticket identifier, a proving device identifier, a ticket specification identifier and ticket added information. In this example, the ticket issuing means 5 checks the qualification of the ticket issuance requesting party by referring to the qualifying information stored in the ticket prototype database. In step 51, the ticket issuing means 5 retrieves unique identifying information corresponding to the proving device identifier. In step 52, the ticket prototype corresponding to the ticket identifier is retrieved. In step 53, the specification corresponding to the specification identifier is retrieved. In step 54, a check is made to see whether the furnished data type of the ticket added information is correct. In step 55, a check is made to see whether the ticket needs initialization. If the ticket is found in need of initialization, step 56 is reached in which the value $i_U$ stored in the database 7 of information unique to the proving device is set to i. In step 57, the value $i_U$ is incremented. If the ticket is found to have no need for initialization in step 55, step 58 is reached in which the value i is set to 0. In step 59, the ticket t is created on the basis of D, $d_U$ and L as discussed above with respect to the preceding embodiments. In step 510, the ticket issuing means issues the ticket by putting a signature on a combination of the proving device identifier U, serial number i of the ticket requiring initialization, the ticket initializing procedure "Init$_s$," ticket proving procedure "Prover$_s$," ticket added information L, and the ticket t.

As described, to realize an electronic ticket requires implementing the following functions. The first function involves preventing unscrupulous persons from making unauthorized use of tickets. The second function entails allowing users to check the legitimacy of the tickets they possess. The third function is one which proves to a third party the rights conferred to a given ticket in case the legitimacy of the ticket is contested. An additional fourth function may also be required to ensure anonymity of ticket users.

According to the present invention, unauthorized use of ticket is impossible unless there were provided a hard-to-copy proving device and a ticket corresponding thereto. This implements the first function above. Since only public information disclosed harmlessly to anyone may be used to prove the contents of any user's ticket to a third party, the second and third functions above are implemented. Because no information dependent on the user is communicated upon ticket verification, the anonymity of ticket users is ensured, which realizes the fourth function. The present invention thus provides a system of creating, issuing and using tickets in ways that meet all requirements of the above-mentioned four functions. Furthermore, the fact that the communication of information upon issuance and verification of any ticket can be made public allows any user to ascertain the contents of the communication. This feature offers an additional benefit: it proves to any party concerned that no communication infringing on users' rights is carried out.

As many apparently different embodiments of the present invention may be made without departing from the spirit and scope thereof, it is to be understood that the present invention is not limited to the specific embodiments thereof except as defined in the appended claims.

What is claimed is:

1. An electronic ticket system comprising a ticket issuing device, a verification device and a proving device, wherein said ticket issuing device comprises:

ticket characteristic information hold means for holding at least ticket public information and ticket secret information;

proving device unique identifying information hold means for holding proving device unique identifying information;

proving device identifying information hold means for holding proving device identifying information in association with said proving device unique identifying information; and ticket issuing means for creating a ticket made of digital information by combining at least said ticket secret information and said proving device unique identifying information;

wherein said verification device comprises:

authenticating information generating means for generating a value used in an interactive proof; and interactive verification means for verifying interactively whether said proving device has calculated said ticket secret information, and wherein said proving device comprises:

proving device unique identifying information hold means;

ticket hold means; and interactive proof means for proving interactively knowledge about said ticket secret information on the basis of at least said proving device unique identifying information and said ticket.

2. The electronic ticket system according to claim 1, wherein said ticket issuing device has ticket characteristic information creating means for creating ticket characteristic information.

3. The electronic ticket system according to claim 1, wherein said ticket issuing device has proving device identifying information hold means for holding proving device identifying information in association with said proving device unique identifying information.

4. The electronic ticket system according to claim 1, wherein at least said ticket public information and said ticket secret information constitute ticket characteristic information.

5. The electronic ticket system according to claim 4, wherein said ticket public information is made of a finite Abelian group, and said ticket secret information constitutes a annhilator area of said finite Abelian group.

6. The electronic ticket system according to claim 4, wherein said ticket secret information is an integer, and said ticket public information is a finite group, an element of said finite group, an order of said element, and a multiple of the element and secret information.

7. The electronic ticket system according to claim 1, wherein said proving device has internal state hold means for holding a variable internal state.

8. The electronic ticket system according to claim 7, wherein at least part of said variable internal state held by said internal state hold means of said proving device is protected against external attempts at modifying.

9. The electronic ticket system according to claim 7, wherein, during said interactive verification and said interactive proof, redundant information is transmitted at least once with respect to proof of knowledge about secret information.

10. The electronic ticket system according to claim 8, wherein said proving device has ticket counting means for holding information indicating an initialized internal state.

11. The electronic ticket system according to claim 10, wherein said proving device transmits at least once to said verification device information acquired from the internal state information of said proving device.

12. The electronic ticket system according to claim 11, wherein information acquired from that internal state information of said proving device which cannot be modified externally is transmitted at least once from said proving device to said verification device.

13. The electronic ticket system according to claim 8, wherein said internal state hold means of said proving device holds, in association with said ticket, an internal state indicating the validness of said ticket in a way that protects said internal state against external attempts at modifying; and
  wherein, if said internal state indicating the validness of said ticket takes a specific value, the corresponding ticket is judged to be invalid and information indicating invalidness of said ticket is transmitted during said interactive proof.

14. The electronic ticket system according to claim 13, wherein said verification device transmits information at least once to said proving device; and
  wherein, in accordance with the transmitted information from said verification device, said proving device changes the internal state which is associated with said ticket and which indicates the validness of said ticket, in order to either invalidate a valid ticket or validate an invalid ticket.

15. The electronic ticket system according to claim 8, wherein said internal state hold means of said proving device associates said ticket with an internal state acting as a ticket counter, said internal state being held so as to be protected against external attempts at modifying;
  wherein, during said interactive proof, an arithmetic operation is executed by use of said internal state acting as said ticket counter; and
  wherein, if said arithmetic operation results in a specific value, the corresponding ticket is judged to be invalid and information indicating the invalidness of said ticket is transmitted during said interactive proof.

16. The electronic ticket system according to claim 15, wherein said verification device transmits information at least once to said proving device; and
  wherein, in accordance with the transmitted information from said verification device, said proving device sets said internal state which is associated with said ticket and which acts as said ticket counter.

17. The electronic ticket system according to claim 1, wherein said proving device has a proving procedure execution unit capable of executing a plurality of interactive verifying procedures; and
  wherein part of ticket characteristic information in said ticket characteristic information hold means is used to select an appropriate proving procedure from among said plurality of interactive verifying procedures in order to carry out said interactive proof.

18. The electronic ticket system according to claim 1, wherein said proving device has a proving procedure execution unit capable of executing a program in which at least part of steps constituting an interactive verifying procedure is described; and
  wherein said program is extracted from part of ticket characteristic information in said ticket characteristic hold means in order to carry out said interactive proof.

19. The electronic ticket system according to claim 1, wherein said verification device holds one of three kinds of information: information communicated between said verification device and said proving device during said interactive verification, part of the communicated information, and information generated by performing an arithmetic operation on said communicated information either as a whole or in part.

20. The electronic ticket system according to claim 1, wherein said verification device holds a combination of two kinds of information: information used by said verification device to generate information to be transmitted to said proving device during said interactive verification; and information acquired by said proving device having executed computation on the transmitted information from said verification device, the acquired information being returned from said proving device to said verification device.

21. The electronic ticket system according to claim 1, wherein said verification device includes verification device unique identifying information hold means for holding verification device unique identifying information, and ticket hold means for holding a ticket, said verification device further utilizing information acquired from said ticket during said interactive verification.

22. The electronic ticket system according to claim 1, wherein said proving device calculates proof information using a predetermined method based on authenticating information, said ticket public information, said ticket, ticket added information, and said proving device unique identifying information.

23. The electronic ticket system according to claim 22, wherein, given that D stands for said ticket secret information, that (n, E) denotes said ticket public information, that $\lambda(n)$ represents the maximum order of numbers modulo n, such that ED=1 mod $\lambda(n)$, that L indicates said ticket added information, that said proving device unique identifying information constitutes a secret one-way function $d_U(L, n)$, and that said ticket t is defined as t:=D−$d_U(L, n)$, said proving device, upon receipt of authenticating information C, calculates proof information R by obtaining a product of $C^t C \char`\^ d_U(L, n)$ mod n.

24. The electronic ticket system according to claim 22, wherein, given that D stands for said ticket secret information, that (n, E) denotes said ticket public information, that ED=1 mod $\lambda(n)$, that L indicates said ticket added information, that said proving device unique identifying information constitutes a secret value, that $f(d_U, L, n)$ is a one-way function, and that said ticket t is defined as t:=D−$f(d_U, L, n)$, said proving device, upon receipt of authenticating information C, calculates proof information R by obtaining a product of $C^t C \char`\^ f(dU, L, n)$ mod n.

25. The electronic ticket system according to claim 22, wherein, given that x stands for said ticket secret information, that p denotes a prime number, that G represents a finite group of which discrete logarithm problems are difficult to solve, that g stands for an element of the order p of said finite group G, that said ticket public information is given as (p, G, g, y), such that $y=g^x$, that L denotes said ticket added information, that said proving device unique identifying information constitutes a secret one-way function $d_U(L, y)$, and that said ticket t is defined as t:=x−$d_U(L, y)$, said proving device, upon receipt of authenticating information C, calculates proof information R by obtaining a product of $C^t C \char`\^ d_U(L, y)$.

26. The electronic ticket system according to claim 22, wherein, given that x stands for said ticket secret information, that said ticket public information is given as (p, G, g, y), such that $y=g^x$, that L denotes said ticket added information, that said proving device unique identifying information constitutes a secret value $d_U$, that $f(d_U, L, y)$ is a one-way function, and that said ticket t is defined as t:=x−$f(d_U, L, y)$, said proving device, upon receipt of authenticating information C, calculates proof information R by obtaining a product of $C^t C \char`\^ f(d_U, L, y)$.

27. The electronic ticket system according to claim 22, wherein said verification device judges whether said proof information is correct from said authenticating information, said proof information and said ticket public information, said verification device further extracting information from said proof information if said proof information is judged to be correct.

28. The electronic ticket system according to claim 27, wherein said verification device, given authenticating information C, proof information R and ticket public information (n, E), compares said authenticating information C with said proof information R to the power of E modulo n; and
wherein said verification device judges said proof information R to be correct if $R^E$ mod n=C∥M, where M represents a bit string and denotes a bit concatenation of C and M, said bit string M being furnished as information extracted from said proof information R if said proof information R is judged to be correct.

29. The electronic ticket system according to claim 27, wherein said verification device, given authenticating information C, proof information R, ticket public information (n, E) and a value M which is smaller than a predetermined limit I, judges said proof information R to be correct if said proof information R to the power of $E^M$ modulo n is equal to said authenticating information C, said value M being furnished as said information extracted from said proof information R if said proof information R is judged to be correct.

30. The electronic ticket system according to claim 27, wherein said proving device has output information hold means, said proving device further calculating said proof information by use of output information held in said output information hold means and of said authenticating information when calculating with said ticket secret information.

31. The electronic ticket system according to claim 30, wherein said proving device has output information hold means for holding output information M, said proving device further calculating said proof information as $$C \char`\^ D^M \bmod n$$

where D stands for said ticket secret information and C for said authenticating information.

32. The electronic ticket system according to claim 30, wherein said proving device has output information hold means for holding output information, said proving device further updating said authenticating information by use of said output information held in said output information hold means before calculating with said ticket secret information.

33. The electronic ticket system according to claim 32, wherein said proving device has output information hold means for holding output information M, said proving device further updating said authenticating information into $$C \| M$$

where C denotes said authenticating information.

34. The electronic ticket system according to claim 22, wherein said proving device calculates said ticket secret information using a predetermined method based on said ticket, said ticket added information and said proving device unique identifying information, said proving device further generating said proof information by performing on said authenticating information an arithmetic operation involving said ticket secret information.

35. The electronic ticket system according to claim 34, wherein, given that D stands for said ticket secret information, that L denotes said ticket added information, that said proving device unique identifying information constitutes a decryption key $d_U$ of a cryptosystem, that $E_U$ represents an encryption corresponding to said proving device unique identifying information, and that said ticket is defined as t:=$E_U(D\|L)$, said proving device calculates said ticket secret information D and said ticket added information L by decrypting said ticket by use of said decryption key $d_U$.

36. The electronic ticket system according to claim 34, wherein, given that D stands for said ticket secret information, that L denotes said ticket added information, that said proving device unique identifying information constitutes a decryption key $d_U$ of a cryptosystem, that $E_U$ represents an encryption corresponding to said proving device unique identifying information, that h(L) stands for a one-way function, and that said ticket is defined as t:=$E_U(D\|h(L))$, said proving device calculates said ticket secret information D by decrypting said ticket t using said decryption key $d_U$ and then calculates the one-way function value h(L) of said ticket added information L, whereby integrity of said ticket added information L is verified.

37. The electronic ticket system according to claim 34, wherein, given that D stands for said ticket secret information, that L denotes said ticket added information, that said proving device unique identifying information constitutes a decryption key $d_U$ of a cryptosystem, that $E_U$ represents a code corresponding to said proving device unique identifying information, that h(L) stands for a one-way function, and that said ticket is defined as t:=($E_U$(D), h($d_U$∥D∥L)), said proving device calculates said ticket secret information D by decrypting a first component of said ticket t using said decryption key $d_U$, and verifies integrity of said ticket added information L by comparing a second component of said ticket t with the one-way function value h($d_U$∥D∥L).

38. The electronic ticket system according to claim 22, wherein said proving device has second authenticating information generating means for generating second authenticating information, said proving device further checking to see whether second proof information is correct from said second authenticating information, said second proof information and said ticket added information, the internal state of said proving device being updated if said second proof information is judged to be correct.

39. The electronic ticket system according to claim 38, wherein said ticket added information L includes at least part of information v∥ϵ for verifying said verification device, said proving device further judging said second proof information ρ to be correct if said second authenticating information χ and said second proof information ρ satisfy $$\chi = \rho^\epsilon \bmod v$$

where ϵ and λ(v) are mutually prime.

40. The electronic ticket system according to claim 38, wherein said ticket added information L includes at least part of η, said proving device further judging said second proof information ρ to be correct if said second authenticating information $g^s$ and said second proof information ρ satisfy $$\rho = \eta^s \bmod p.$$

41. The electronic ticket system according to claim 38, wherein said proving device has input information hold means, said proving device further extracting input information from said second proof information if said second proof information is judged to be correct, the extracted information being placed into said input information hold means.

42. The electronic ticket system according to claim 41, wherein said ticket added information L comprises at least part of information v∥ϵ, said proving device further judging said second proof information ρ to be correct if said second authenticating information χ, said second proof information ρ and a given bit string μ satisfy $$\chi \| \mu = \rho^\epsilon \bmod v$$

where ϵ and λ(v) are mutually prime, said bit string μ being placed into said input information hold means as the input information embedded in said second proof information.

43. The electronic ticket system according to claim 41, wherein said ticket added information L comprises at least part of information v∥ϵ, said proving device further judging said second proof information ρ to be correct if said second authenticating information χ, said second proof information ρ, and a value μ which is smaller than a predetermined limit I satisfy $$\chi = \rho^\wedge \bmod v$$

said value μ being placed into said input information hold means as the input information embedded in said second proof information.

44. The electronic ticket system according to claim 22, wherein said proving device has input information hold means for holding input information and internal state hold means for holding an internal state, said internal state being updated on the basis of said input information placed in said input information hold means.

45. The electronic ticket system according to claim 22, wherein said proving device checks to see whether said proof information is correctly generated on the basis of said authenticating information and said ticket added information.

46. The electronic ticket system according to claim 22, wherein said proving device checks to see whether said proof information is correctly generated on the basis of an internal state of said proving device and said ticket added information.

47. The electronic ticket system according to claim 22, wherein said proving device has output information hold means, and calculates output information on the basis of an internal state of said proving device and said ticket added information, the calculated output information being placed into said output information hold means.

48. The electronic ticket system according to claim 22, wherein said verification device generates second proof information based on second authenticating information and secret information representing a privilege.

49. The electronic ticket system according to claim 48, wherein, given that δ stands for said secret information representing said privilege, that the corresponding public information is given as (v, ϵ), and that ϵδ↑1 mod λ(v), said verification device generates said second proof information ρ based on said second authenticating information χ as ti $\rho := \chi^\delta \bmod v$.

50. The electronic ticket system according to claim 48, wherein, given that ξ stands for said secret information representing said privilege, that the corresponding public information is given as (p, g, q, η), and that η=$g^\xi$ mod p, said verification device generates said second proof information ρ based on said second authenticating information χ as $$\rho := \chi^\xi \bmod p.$$

51. The electronic ticket system according to claim 48, wherein said verification device has input information hold means, said verification device further calculating said second proof information based on input information held in said input information hold means and on said second authenticating information when calculating with said secret information representing said privilege.

52. The electronic ticket system according to claim 51, wherein, given that δ stands for said secret information representing said privilege, that the corresponding public information is given as (v, ϵ), and that ϵδ≡1 mod λ(v); said verification device generates said second proof information ρ based on said input information μ held in said input information hold means and on said second authenticating information χ as $$\rho := \chi^\wedge \bmod v.$$

53. The electronic ticket system according to claim 48, wherein said verification device has input information hold means, said verification device further updating said second authenticating information by use of input information held in said input information hold means before calculating with said secret information representing said privilege.

54. The electronic ticket system according to claim 53, wherein said verification device has input information hold means for holding input information μ, said verification device further updating said second authenticating information χ into χ∥μ.

* * * * *